(12) United States Patent
Galvin

(10) Patent No.: US 12,724,808 B2
(45) Date of Patent: Sep. 1, 2026

(54) SYSTEM AND METHOD FOR PERSISTENT COGNITIVE MACHINES WITH A METACOGNITIVE FABRIC

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC., Moraga, CA (US)

( * ) Notice: Subject to any disclaimer, the term of this patent is extended or adjusted under 35 U.S.C. 154(b) by 0 days.

(21) Appl. No.: 19/451,374

(22) Filed: Jan. 16, 2026

(65) Prior Publication Data

US 2026/0140986 A1 May 21, 2026

Related U.S. Application Data

(63) Continuation-in-part of application No. 19/382,207, filed on Nov. 6, 2025, which is a continuation of (Continued)

(51) Int. Cl.
*G06F 16/334* (2025.01)
*G06F 11/1446* (2026.01)
(Continued)

(52) U.S. Cl.
CPC ...... *G06F 16/3347* (2019.01); *G06F 11/1446* (2013.01); *G06F 16/3329* (2019.01); (Continued)

(58) Field of Classification Search
CPC ............... G06F 16/3347; G06F 16/353; G06F 16/3329; G06F 18/21375; G06F 18/22; (Continued)

(56) References Cited

U.S. PATENT DOCUMENTS 8,028,185 B2 * 9/2011 Branover .............. G06F 1/3203 710/262
10,824,626 B2 * 11/2020 DeLuca ............ G06F 16/24578
(Continued)

OTHER PUBLICATIONS

Sarfati et al. (Lines of Thought in Large Language Models),—arXiv preprint arXiv:2410.01545, 2024—arxiv.org (Year: 2024).*
(Continued)

*Primary Examiner* — Abdelali Serrou
(74) *Attorney, Agent, or Firm* — GALVIN PATENT LAW LLC; Brian R. Galvin; Alec L. Perry

(57) ABSTRACT

A system and method for implementing a Persistent Cognitive Machine (PCM) that extends beyond the traditional prompt-response paradigm of artificial intelligence are disclosed. A PCM maintains persistent cognitive processes regardless of external interaction, stores and organizes thoughts in a thought cache, retrieves relevant thoughts based on current stimuli, generates new thoughts through reasoning processes, and curates stored thoughts during periods of reduced external interaction. The PCM includes language and reasoning model components, a thought cache, an executive component, and an embedding system. The PCM remains continuously active, remembers previous experiences, learns from these experiences, creates new thought experiences independently, and initiates interactions without waiting for external prompts. The PCM enters sleep-like states during which it curates its thought cache, generalizes experiences, and performs other memory management functions. Applications may include but are not limited to synthetic cognitive colleagues, strategic war gaming platforms, and personal cognitive assistants.

10 Claims, 22 Drawing Sheets

Related U.S. Application Data application No. 19/203,069, filed on Jun. 3, 2025, now Pat. No. 12,481,688, which is a continuation-in-part of application No. 19/205,960, filed on May 12, 2025, which is a continuation-in-part of application No. 19/060,794, filed on Feb. 24, 2025, which is a continuation-in-part of application No. 19/044,546, filed on Feb. 3, 2025, which is a continuation-in-part of application No. 19/026,276, filed on Jan. 16, 2025, which is a continuation-in-part of application No. 18/928,022, filed on Oct. 26, 2024, which is a continuation-in-part of application No. 18/919,417, filed on Oct. 17, 2024, which is a continuation-in-part of application No. 18/918,077, filed on Oct. 17, 2024, which is a continuation-in-part of application No. 18/737,906, filed on Jun. 7, 2024, and a continuation-in-part of application No. 18/736,498, filed on Jun. 6, 2024.

(60) Provisional application No. 63/868,329, filed on Aug. 21, 2025, provisional application No. 63/651,359, filed on May 23, 2024.

(51) Int. Cl.

| | |
|---|---|
| ***G06F 16/3329*** | (2025.01) |
| ***G06F 16/353*** | (2025.01) |
| ***G06F 18/2137*** | (2023.01) |
| ***G06N 3/049*** | (2023.01) |
| ***G06N 3/06*** | (2006.01) |

(52) U.S. Cl.

CPC ...... *G06F 16/353* (2019.01); *G06F 18/21375* (2023.01); *G06N 3/049* (2013.01); *G06N 3/061* (2013.01)

(58) Field of Classification Search

CPC .. G06F 16/9024; G06F 18/253; G06F 18/213; G06F 40/30; G06F 16/3325; G06F 16/35; G06F 16/367; G06F 16/84; G06F 11/1446; G06F 40/40; G06F 40/284; G06F 40/166; G06F 40/279; G06F 40/20; G06F 40/35; G06F 40/56; G06F 16/2423; G06F 16/9532; G06F 16/957; G06F 40/197; G06F 40/205; G06F 8/33; G06F 9/547; G06F 16/90332; G06F 16/953; G06F 40/186; G06F 9/542; G06F 16/2237; G06F 16/243; G06F 16/24522; G06F 16/24539; G06F 16/25; G06F 16/252; G06F 16/3322; G06F 16/3344; G06F 16/338; G06F 16/383; G06F 16/432; G06F 16/438; G06F 16/8358; G06F 16/90328; G06F 16/9038; G06F 16/906; G06F 16/9535; G06F 16/9538; G06F 16/955; G06F 18/2413; G06F 21/53; G06F 21/552; G06F 21/554; G06F 21/566; G06F 2221/033; G06F 30/13; G06F 40/103; G06F 40/117; G06F 40/194; G06F 40/237; G06F 40/242; G06F 40/258; G06F 40/268; G06F 40/274; G06F 40/289; G06F 40/295; G06F 40/47; G06F 40/58; G06F 9/453; G06F 9/45504; G06F 9/546; G06F 16/345; G06F 16/68; G06F 16/93; G06F 18/00; G06F 21/16; G06F 21/84; G06F 40/211; G06F 40/216; G06F 40/44; G06F 8/34; G06F 9/541; G06N 5/02; G06N 3/082; G10L 15/063; G10L 15/22; G10L 15/16; G10L 15/1815; G10L 15/26; G10L 2015/223; G10L 25/30; G10L 15/18; G10L 15/183; G10L 15/30; G10L 2015/0631; G10L 2015/0638; G10L 2015/088; G10L 2015/221; G10L 25/48; G10L 15/02; G10L 25/63

See application file for complete search history.

(56) References Cited

U.S. PATENT DOCUMENTS

| | | | | |
|---|---|---|---|---|
| 11,074,286 | B2 * | 7/2021 | Byron | G06F 16/36 |
| 2004/0083195 | A1 | 4/2004 | McCord et al. | |
| 2009/0235099 | A1 | 9/2009 | Branover et al. | |
| 2019/0147349 | A1 * | 5/2019 | Ng | G06N 5/02 706/12 |
| 2019/0236088 | A1 * | 8/2019 | Byron | G06N 20/00 |
| 2024/0289395 | A1 | 8/2024 | Zhou et al. | |
| 2025/0085894 | A1 * | 3/2025 | Lee | G06F 3/0658 |
| 2025/0259085 | A1 * | 8/2025 | Crabtree | G06N 5/043 |
| 2025/0278634 | A1 | 9/2025 | Kumar et al. | |

OTHER PUBLICATIONS

Kuhnel et al. (Latent Space Non-Linear Statistics 2018), arXiv preprint arXiv: 1805.07632, 2018—arxiv.org (Year: 2018).*

Marin (Optimizing AI Reasoning: A Hamiltonian Dynamics Approach to Multi-Hop Question Answering), arXiv preprint arXiv: 2410.04415, 2024. (Year: 2024).*

Zhang et al. (Hierarchical simplicial manifold learning)—PNAS nexus, academic.oup.com, 2024 (Year: 2024).*

* cited by examiner

SYSTEM AND METHOD FOR PERSISTENT COGNITIVE MACHINES WITH A METACOGNITIVE FABRIC

CROSS-REFERENCE TO RELATED APPLICATIONS

Priority is claimed in the application data sheet to the following patents or patent applications, each of which is expressly incorporated herein by reference in its entirety:

Ser. No. 19/382,207
Ser. No. 19/203,069
Ser. No. 19/205,960
Ser. No. 19/060,794
Ser. No. 19/044,546
Ser. No. 19/026,276
Ser. No. 18/928,022
Ser. No. 18/919,417
Ser. No. 18/918,077
Ser. No. 18/737,906
Ser. No. 18/736,498
63/651,359
63/868,329

BACKGROUND OF THE INVENTION

Field of the Art

The present invention relates generally to artificial intelligence systems, and more particularly to systems and methods for implementing persistent cognitive capabilities in computing machines that extend beyond traditional prompt-response paradigms.

Discussion of the State of the Art

Recent advancements in artificial intelligence have led to the development of powerful language processing technologies, including Large Language Models (LLMs) and Reasoning Models (RMs). These technologies have demonstrated impressive capabilities in natural language understanding, generation, and reasoning. The field has experienced exponential growth since the introduction of transformer-based architectures in 2017, leading to models with increasingly sophisticated abilities to process and generate human-like text across numerous domains and languages.

Large Language Models operate by predicting the most likely sequence of tokens that would follow a given input sequence, presented in the form of prompts and responses. These models are trained on vast corpora of text data, often comprising hundreds of billions of tokens from diverse sources including books, articles, websites, and code repositories. During inference, an LLM receives an input prompt and generates a contextually appropriate continuation by iteratively predicting the next most probable token based on the preceding sequence. This fundamental architecture has enabled a wide range of capabilities from translation and summarization to complex question answering and creative content generation.

Reasoning Models represent an evolution of LLMs, adding an additional step to this process by generating a chain-of-thought when receiving an input sequence, and then using this chain-of-thought together with the original input to generate an improved output sequence. This technique enables more thorough logical reasoning, multi-step problem solving, and improved accuracy on complex tasks.

By explicitly modeling the intermediate reasoning steps that a human might take when solving a problem, RMs have demonstrated superior performance on tasks requiring logical deduction, mathematical reasoning, and causal inference.

The superior capabilities of these models have led to their deployment across numerous industries, including healthcare, finance, legal services, education, and customer support. Their ability to process natural language inputs and generate coherent, contextually relevant responses has enabled new forms of human-computer interaction and automated decision support systems. Notable applications include advanced chatbots, content creation assistants, code generation tools, and knowledge extraction systems.

Despite their impressive capabilities, these technologies remain fundamentally limited by their operational paradigm. Specifically, they function within a prompt-response framework, wherein they await input, generate output, and then return to a waiting state. This discrete interaction model creates a fundamental limitation: the model essentially "resets" between interactions, maintaining only the context explicitly provided within the current conversation or prompt window. The model lacks any intrinsic ability to evolve over time based on its experiences or to autonomously initiate processes when not directly engaged by a user.

This operational paradigm restricts these technologies from developing persistent cognitive capabilities, such as learning from experiences, maintaining awareness when not actively responding to prompts, or initiating interactions based on internally generated stimuli. Information and insights gained during one interaction are not automatically preserved or integrated into future interactions unless explicitly engineered through external memory systems or fine-tuning processes. Moreover, these systems cannot independently reflect on past interactions, generalize across experiences, or develop novel insights during periods of inactivity.

The limitations of the prompt-response paradigm become particularly acute in applications requiring long-term continuity of cognition, such as ongoing collaborative work, relationship building with users over extended periods, autonomous research, or complex problem-solving that exceeds the context window of a single interaction. In such scenarios, the inability to maintain persistent cognitive processes dramatically reduces the effectiveness and utility of current AI systems. What is needed is an artificial intelligence technology that can transcend the prompt-response paradigm to achieve persistent cognitive capabilities, enabling more advanced and human-like artificial intelligence systems.

SUMMARY OF THE INVENTION

Accordingly, the inventor has conceived and reduced to practice, a system and method for a digital thought architecture, otherwise called a Persistent Cognitive Machine (PCM) that includes a metacognitive fabric. The PCM represents a fundamental advancement in artificial intelligence beyond current large language models and reasoning models. While existing AI systems operate within a prompt-response paradigm where they await input, generate output, and return to a waiting state, the PCM maintains persistent cognitive processes regardless of external interaction. It accomplishes this through a sophisticated architecture comprising a language model, reasoning model, executive core, thought cache, embedding system, persistence layer, and sleep manager that work in concert to enable persistent cognition.

What truly distinguishes the PCM is its ability to think independently of external prompts, remember experiences across system restarts, learn from accumulated experiences, and develop relationships over time. The system implements biologically-inspired but technologically-adapted processes such as sleep states for memory consolidation and thought curation, relationship models for understanding users as individuals, and persistent storage mechanisms that maintain cognitive continuity across restarts. These capabilities enable applications ranging from synthetic cognitive colleagues that function as team members in professional environments to strategic wargaming platforms that enhance military training and planning through accumulated experience and analysis.

According to a preferred embodiment, A computer system configured to execute software instructions stored on non-transitory machine-readable storage media, wherein the software instructions comprise instructions that: initialize a persistent cognitive system configured to sustain a cognitive state across inactive periods and restarts, the cognitive state comprising stored thought representations maintained in one or more thought caches; embed cognitive events as geometric trajectories on a hierarchical latent manifold structure comprising a fast manifold, a mesoscale manifold, and a foundational manifold operating at progressively longer timescales; monitor a plurality of events comprising external stimuli and internal thought triggers; abstract event trajectories upward through the hierarchical manifold structure via submersion operators; apply identity constraints downward through the hierarchical manifold structure via immersion operators; compute a metacognitive residual measuring geometric discrepancy between upward abstraction and downward constraint paths; update the foundational manifold based on the metacognitive residual; generate cognitive outputs using one or more generative or analytical models informed by thoughts retrieved from the thought cache; enter adaptive cognitive maintenance modes that modify memory and stored thought structures; and maintain continuity of cognition across inactive intervals and system restarts, is disclosed.

According to a preferred embodiment, A computer-implemented method comprising the steps of: initializing a persistent cognitive system configured to sustain a cognitive state across inactive periods and restarts, the cognitive state comprising stored thought representations maintained in one or more thought caches; embedding cognitive events as geometric trajectories on a hierarchical latent manifold structure comprising a fast manifold, a mesoscale manifold, and a foundational manifold operating at progressively longer timescales; monitoring a plurality of events comprising external stimuli and internal thought triggers; abstracting event trajectories upward through the hierarchical manifold structure via submersion operators; applying identity constraints downward through the hierarchical manifold structure via immersion operators; computing a metacognitive residual measuring geometric discrepancy between upward abstraction and downward constraint paths; updating the foundational manifold based on the metacognitive residual; generating cognitive outputs using one or more generative or analytical models informed by thoughts retrieved from the thought cache; entering adaptive cognitive maintenance modes that modify memory and stored thought structures; and maintaining continuity of cognition across inactive intervals and system restarts, is disclosed.

According to an aspect of an embodiment, the sleep state operations comprise:

consolidating recent experiences from short-term to long-term memory; generating new insights by connecting previously unrelated thought patterns; pruning less relevant or outdated thoughts to optimize memory efficiency; and reorganizing memory structures for improved future retrieval.

According to an aspect of an embodiment, maintaining persistent cognitive state comprises: serializing cognitive states including thought cache contents, relationship models, and system configuration; creating periodic checkpoints of system state; storing serialized state in persistent storage; and restoring complete cognitive state upon system restart.

BRIEF DESCRIPTION OF THE DRAWING FIGURES

DETAILED DESCRIPTION OF THE INVENTION

Figure 1:
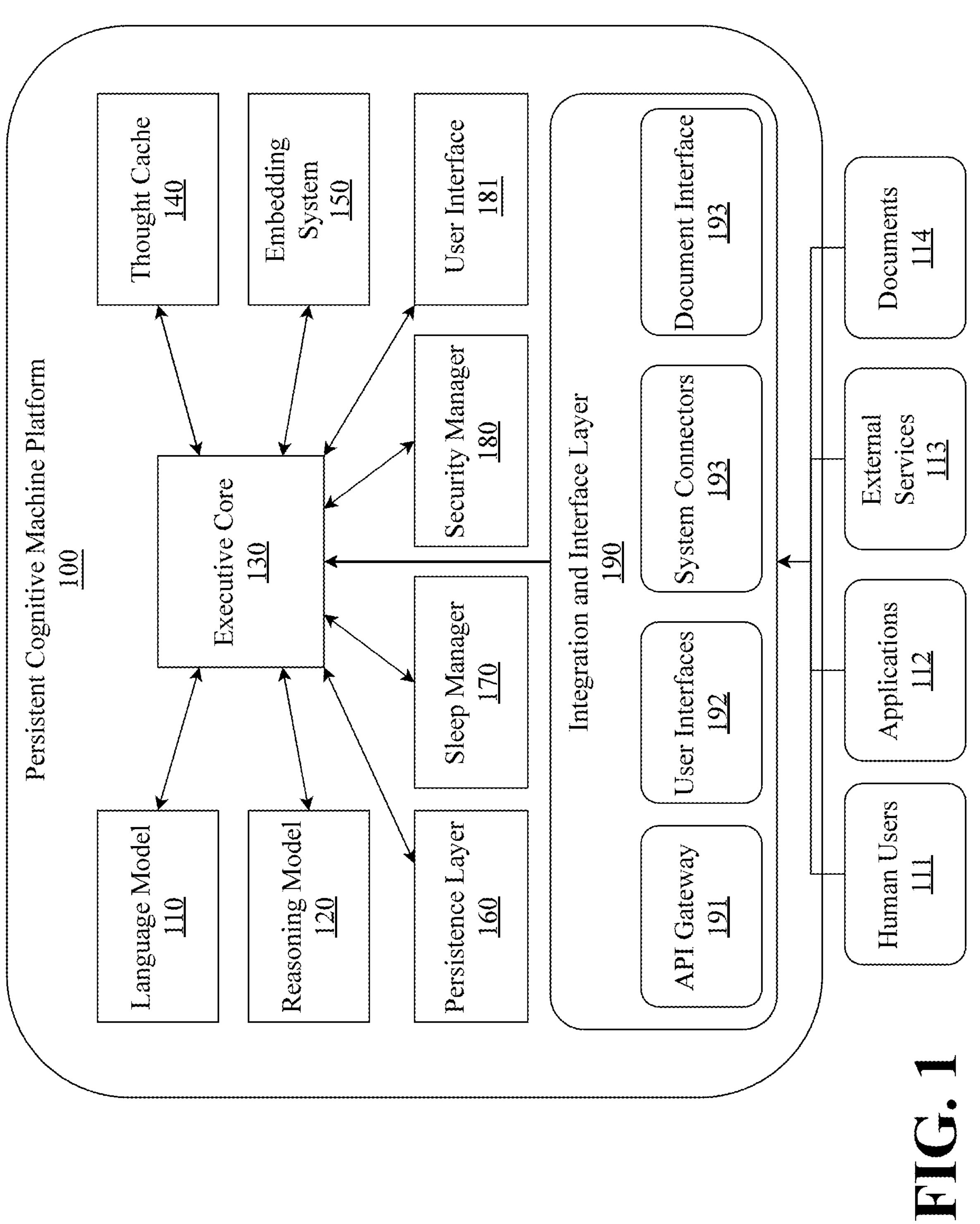
FIG. 1 is a block diagram illustrating the architecture of a persistent cognitive machine platform.

The inventor has conceived and reduced to practice a system and method for a digital thought architecture, otherwise called a Persistent Cognitive Machine (PCM) that includes a metacognitive fabric. The Persistent Cognitive Machine platform represents a modern approach to artificial intelligence that transcends the limitations of prompt-response systems. At its core, the PCM implements a "machine that thinks" maintaining awareness and cognitive processes even when not directly engaged with users, remembering its experiences through a thought cache system, learning continuously from interactions, and initiating communication when contextually appropriate without requiring external prompts. This persistence of cognition is enabled through an architectural framework where thoughts are represented as vectors in an abstract space, allowing for meaningful organization based on semantic relationships rather than simple keyword matching.

The PCM achieves its cognitive continuity through several innovative mechanisms: sleep states that allow for thought curation and memory organization similar to biological sleep functions; a persistence layer that maintains state across system restarts; an executive core that orchestrates cognitive processes; and specialized components for knowledge embedding and relationship tracking. These capabilities make the PCM particularly well-suited for applications requiring long-term relationship building and knowledge accumulation, such as a synthetic cognitive colleague that develops individualized relationships with team members, or the strategic wargaming platform that continuously improves its analytical capabilities through accumulated simulation experiences. Unlike traditional AI that either resets with each interaction or requires explicit external state management, the PCM naturally develops increasing sophistication through its intrinsic ability to accumulate and organize experiences over time.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

As used herein, "Persistent Cognitive Machine" or "PCM" refers to a computing system that maintains persistent cognitive processes regardless of external interaction, can remember previous experiences, learn from these experiences, create new thought experiences independently, and initiate interactions without waiting for external prompts. Unlike traditional AI systems that operate within a prompt-response paradigm, a PCM operates with persistent awareness even when not actively engaged with users or external systems.

As used herein, "thought" refers to a discrete unit of cognition within the persistent cognitive machine, representing information, concepts, observations, inferences, questions, or other cognitive elements that the system processes and stores. Thoughts may be derived from external inputs, generated through internal reasoning processes, or created through recombination of existing thoughts.

As used herein, "thought cache" refers to the component of the persistent cognitive machine that stores, organizes, and provides access to thoughts. The thought cache may include both short-term and long-term storage capabilities, with mechanisms for transferring information between them and organizing thoughts based on semantic relationships.

As used herein, "sleep state" refers to a mode of operation in which the persistent cognitive machine temporarily reduces responsiveness to external stimuli to focus on internal cognitive maintenance processes, including but not limited to memory consolidation, thought generalization, insight generation, and memory reorganization.

Conceptual Architecture

FIG. 1 is a block diagram illustrating the architecture of a persistent cognitive machine platform. The persistent cognitive machine platform 100 represents a fundamental advancement beyond traditional artificial intelligence systems by implementing persistent cognitive capabilities. Unlike conventional language models that operate within a prompt-response paradigm, the platform 100 maintains persistent cognitive processes regardless of external interaction, can remember previous experiences, learn from these experiences, create new thought experiences independently, and initiate interactions without waiting for external prompts.

At the core of persistent cognitive machine platform 100 is an executive core 130, which functions as the central orchestration component of the system. The executive core 130 manages the overall cognitive processes, determines how to handle external stimuli, when to retrieve thoughts from the thought cache, when to engage the reasoning model, when to add new thoughts to the thought cache, and when to enter sleep states. Executive core 130 includes a decision engine that orchestrates resource allocation and process scheduling, a state management system that tracks the operational states of the platform, and a stimulus analysis module that processes and evaluates incoming stimuli. Additionally, executive core 130 contains a thought manager for handling curation and retrieval of thoughts, a sleep cycle controller for managing sleep states, and a thought initiation system for generating new thoughts and cognitive processes.

Connected to executive core 130 is a language model 110, which provides the platform with language processing capabilities. Language model 110 enables the platform to understand and generate natural language by predicting the most likely sequence of tokens that would follow a given input sequence. Language model 110 may incorporate a plurality of neural network architectures such as transformers and attention mechanisms, along with tokenization processes, context management, and response generation capabilities. Language model 110 integrates with executive core 130 to process textual inputs and generate coherent, contextually relevant outputs based on both the immediate context and the system's accumulated experiences stored in the thought cache.

Working in conjunction with the language model 110 is a reasoning model 120, which adds reasoning capabilities to the platform. Reasoning model 120 extends beyond simple language processing by generating chains-of-thought when receiving input, and then using this chain-of-thought together with the original input to generate improved outputs. This component includes a chain-of-thought engine for iterative reasoning processes, problem analysis capabilities, solution synthesis, and specialized reasoning modules for different types of reasoning (mathematical, logical, causal, and analogical). Reasoning model 120 enables the platform to engage in complex problem-solving, logical deduction, and multi-step analytical processes.

The persistent cognitive machine platform includes a thought cache 140, which functions as the system's memory for thoughts. Thought cache 140 is a repository for thoughts that allows the platform to remember that it has experienced something similar before and to use related thoughts to more quickly and richly engage with new stimuli. Thought cache 140 is organized into both short-term and long-term components. The short-term cache maintains recent thought store and working memory interfaces, while the long-term cache contains embedded vector representations and semantic networks of thoughts. Thought cache 140 interfaces with executive core 130 to retrieve relevant thoughts based on current stimuli and to store new thoughts generated during processing.

Working with thought cache 140 is an embedding system 150, which converts thoughts into vector representations in a high-dimensional abstract space. Embedding system 150 enables the efficient storage of a very large amount of thought in a way that allows related thoughts to be positioned closer than unrelated thoughts in the abstract space. Embedding system 150 includes but is not limited to vector representation capabilities, similarity calculation for finding related thoughts, and interfaces for storing and retrieving embedded thoughts. Embedding system 150 may implement various embedding technologies, including sentence embedding techniques.

To ensure the platform maintains its cognitive state across shutdowns and restarts, a persistence layer 160 provides mechanisms for serializing and restoring the system state. Persistence layer 160 includes a state manager responsible for serialization and deserialization of the platform's cognitive state, a checkpoint system for creating recovery points, and a recovery controller for managing state restoration after interruptions. Persistence layer 160 may also incorporates a storage system with primary storage, backup capabilities, and storage tiering to balance performance and reliability. Through persistence layer 160, the platform can maintain continuity of cognition even when powered off or restarted, which is essential to the "persistent" aspect of the system.

In one embodiment, the platform includes a sleep manager 170, which implements sleep-like states during which the platform becomes temporarily unresponsive to external stimuli to focus on internal cognitive processes. Sleep manager 170 includes a sleep cycle scheduler for determining appropriate times to enter sleep states, a wake trigger monitor for detecting conditions that should interrupt sleep, and a thought curation processor that orchestrates sleep-state activities. During sleep states, sleep manager 170 oversees generalization of specific thoughts to create broader concepts, memory consolidation to strengthen important connections, and insight generation through the recombination of existing thoughts. These processes mirror some aspects of biological sleep but are adapted for the platform's specific needs.

To ensure appropriate protections for the system and its data, a security manager 180 implements comprehensive security controls. Security manager 180 may include an access controller with authentication systems, permission management, and encryption services, as well as an integrity monitor comprising content safety filters, audit logging, and anomaly detection. A central policy enforcer within the security manager 180 applies consistent security policies across the platform. These security measures protect both the platform itself and the sensitive information it may contain, particularly important for applications involving confidential or personal data.

User interaction with the platform is facilitated through a user interface 181, which provides methods for humans to communicate with the system. User interface 181 may include text-based interfaces, graphical displays, command consoles, and other interaction mechanisms appropriate to the specific application of the platform.

An integration and interface layer 190 forms the connection between the core PCM platform and external systems or users. This layer includes several specialized interfaces for different types of integration. An API gateway 191 provides programmatic access to the platform's capabilities, enabling other software systems to leverage its cognitive functions. User interfaces 192 offer direct interaction points for human users, including text-based chat interfaces, graphical displays, or specialized interaction mechanisms. System connectors 193 enable integration with external services and applications, while the document interface 194 provides mechanisms for ingesting and processing documents and other content into the platform's thought cache.

The platform interacts with various external entities. Human users 111 may engage with the platform directly, utilizing its cognitive capabilities through conversation or structured interactions. Applications 112 can integrate with the platform through API calls or system connectors, incorporating persistent cognition into existing software systems. External services 113 may provide additional capabilities or information sources that the platform can access and incorporate into its cognitive processes. Documents 114 and other content sources provide information that the platform can ingest, analyze, and incorporate into its thought cache.

In operation, persistent cognitive machine platform 100 maintains persistent cognitive processes even when not actively engaged with external entities. When it receives input from users or systems through integration and interface layer 190, executive core 130 analyzes the stimuli and determines how to respond. It retrieves relevant thoughts from thought cache 140, processes these thoughts in conjunction with the input using the language model 110 and reasoning model 120 as appropriate, and generates a response. New thoughts generated during this process are encoded by embedding system 150 and stored in thought cache 140.

Periodically, as determined by sleep manager 170, the platform enters sleep states to curate thoughts, consolidate memories, and perform other cognitive maintenance functions. Persistence layer 160 ensures that the platform's cognitive state is preserved across system restarts or power interruptions, maintaining continuity of cognition. Through these processes, the platform develops increasingly rich and nuanced understanding based on its accumulating experiences, transcending the limitations of traditional prompt-response AI systems.

The persistent cognitive machine platform 100 can be implemented through various hardware configurations, including dedicated server systems, distributed computing environments, cloud-based infrastructures, or hybrid arrangements. The specific hardware implementation may vary depending on the scale and specific application requirements, but all implementations maintain the core architectural components and functional characteristics described above.

Figure 2:
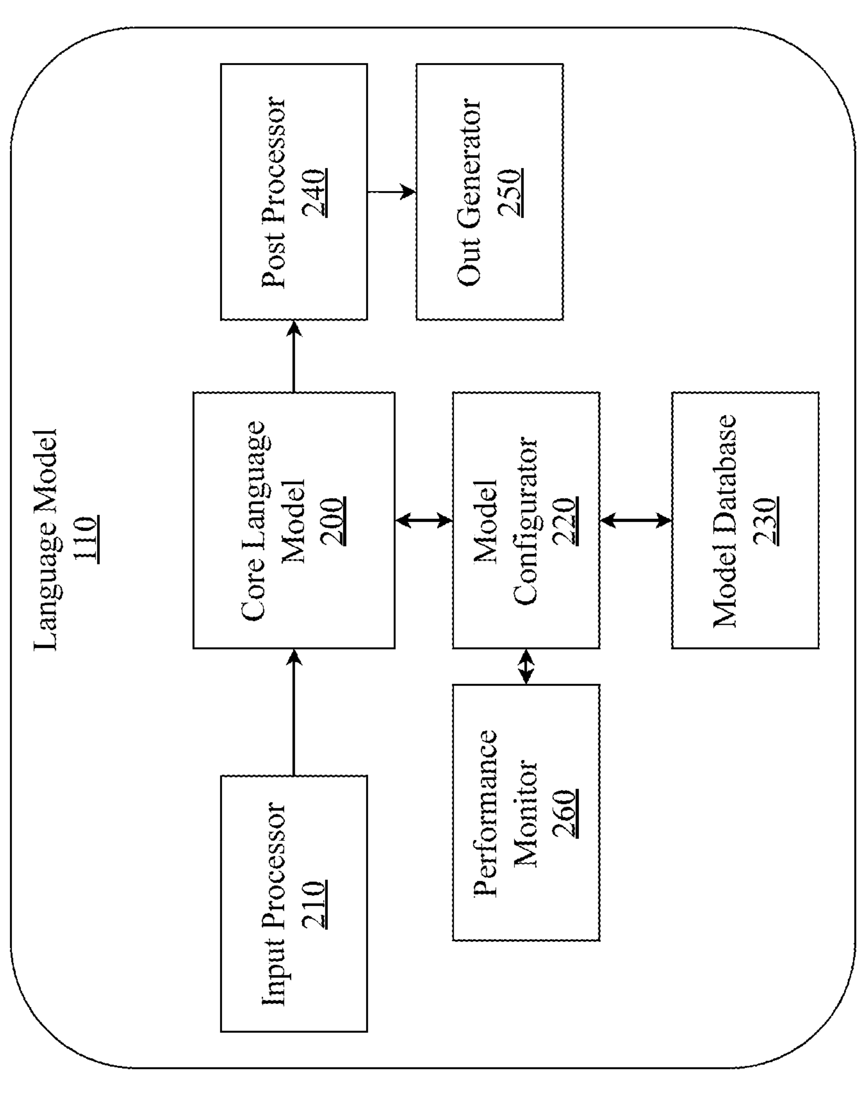
FIG. 2 is a block diagram illustrating an exemplary architecture of a component within a Persistent Cognitive Machine, a language model.

FIG. 2 is a block diagram illustrating an exemplary architecture of a component within a Persistent Cognitive Machine, a language model. Language model 110 provides the persistent cognitive machine with language processing capabilities, enabling it to understand and generate natural language text. Unlike traditional language models that operate in isolation, language model 110 within the PCM architecture is integrated with the executive core and thought cache to leverage both immediate context and accumulated experiences when processing language.

At the center of the language model 110 is a core language model 200, which implements the neural network architecture responsible for language understanding and generation. Core language model 200 may utilize transformer-based architectures with attention mechanisms, similar to those found in state-of-the-art large language models. Similarly, core language model 200 may utilize other architectures such as latent transformers which operate exclusively in latent vector space, architectures that include variational autoencoders, or even combinations of transformers and variational autoencoders. Core language model 200 processes token sequences and predicts likely continuations based on learned patterns and relationships within language. Core language model 200 serves as the foundation for all language processing within the platform but is augmented by the persistent cognitive capabilities of the broader system.

Input to the language model is managed by an input processor 210, which handles the preprocessing of text before it reaches the core language model. The input processor 210 performs functions including tokenization, which breaks text into manageable units (tokens) for processing by the neural network. Additionally, the input processor 210 manages context windows, ensuring that appropriate context is maintained when processing longer sequences or ongoing conversations. This component may also handle special token insertion, prompt formatting, and other preprocessing steps necessary for effective language model operation.

A model configurator 220 manages the operational parameters and settings of the language model. Model configurator 220 controls aspects such as inference parameters, attention mechanisms, and other configuration settings that affect how the core language model functions. Model configurator 220 may adjust these settings based on the specific requirements of different tasks or in response to performance feedback from the performance monitor. By dynamically configuring the language model, the system can optimize for different types of language tasks without requiring separate models for each task type.

To support the model configurator, a model database 230 stores model weights, parameters, and configuration presets, or previously trained models. Model database 230 may contain multiple sets of weights or parameter configurations optimized for different types of language tasks. Model database 230 enables the language model to efficiently switch between different operational modes or to load specialized parameters for particular domains or tasks. This flexibility allows the language model to adapt to diverse requirements within the persistent cognitive machine platform.

After the core language model processes input, a post processor 240 handles additional processing of the raw model output. Post processor 240 may implement functions such as filtering inappropriate content, ensuring coherence across longer generations, applying formatting rules, or performing specialized post-processing for domain-specific outputs. The post processor 240 ensures that the raw output from the neural network is refined into more usable and appropriate text before being passed to subsequent components.

The final stage in the language model pipeline is an output generator 250, which prepares the processed language model output for use by other components of the system. Output generator 250 handles tasks such as detokenization (converting tokens back into readable text), formatting the output according to specified requirements, and preparing the output for integration with other components of the persistent cognitive machine. This component ensures that the language model's output is properly structured for its intended use, whether that involves direct presentation to users or further processing by other system components.

Throughout the language model's operation, a performance monitor 260 tracks various metrics related to model performance and resource utilization. Performance monitor 260 monitors aspects such as processing time, memory usage, token consumption, and quality metrics. Additionally, performance monitor 260 provides feedback to the model configurator to enable dynamic optimization of model parameters based on observed performance. This monitoring capability aids in maintaining efficient operation of the language model, particularly in resource-constrained environments or when processing large volumes of text.

Language model 110 interfaces with executive core 130 of the persistent cognitive machine platform 100, receiving input data and instructions while providing processed language outputs. Unlike standalone language models, this component benefits from integration with the thought cache, allowing it to leverage persistent memory when generating responses. This integration enables the language model to produce outputs that reflect not only the immediate context but also the system's accumulated experiences and learned patterns.

In operation, language model 110 receives input that may originate from external sources (via the integration and interface layer) or from internal processes within the persistent cognitive machine. Input processor 210 prepares this input for core language model 200, which generates initial output with guidance from model configurator 220. This output is then refined by post processor 240 and formatted by output generator 250 before being provided to other components of the system or to external entities. Throughout this process, performance monitor 260 ensures efficient operation and provides feedback for optimization.

Language model 110 may incorporate various specialized capabilities such as multi-lingual support, domain adaptation for specific fields of knowledge, contextual understanding that spans beyond traditional context windows, coherence control for longer generations, safety filters to prevent harmful outputs, and style adaptation to match desired tones or writing styles. These capabilities allow the language model to serve as a versatile and powerful component within the broader persistent cognitive machine architecture.

Figure 3:
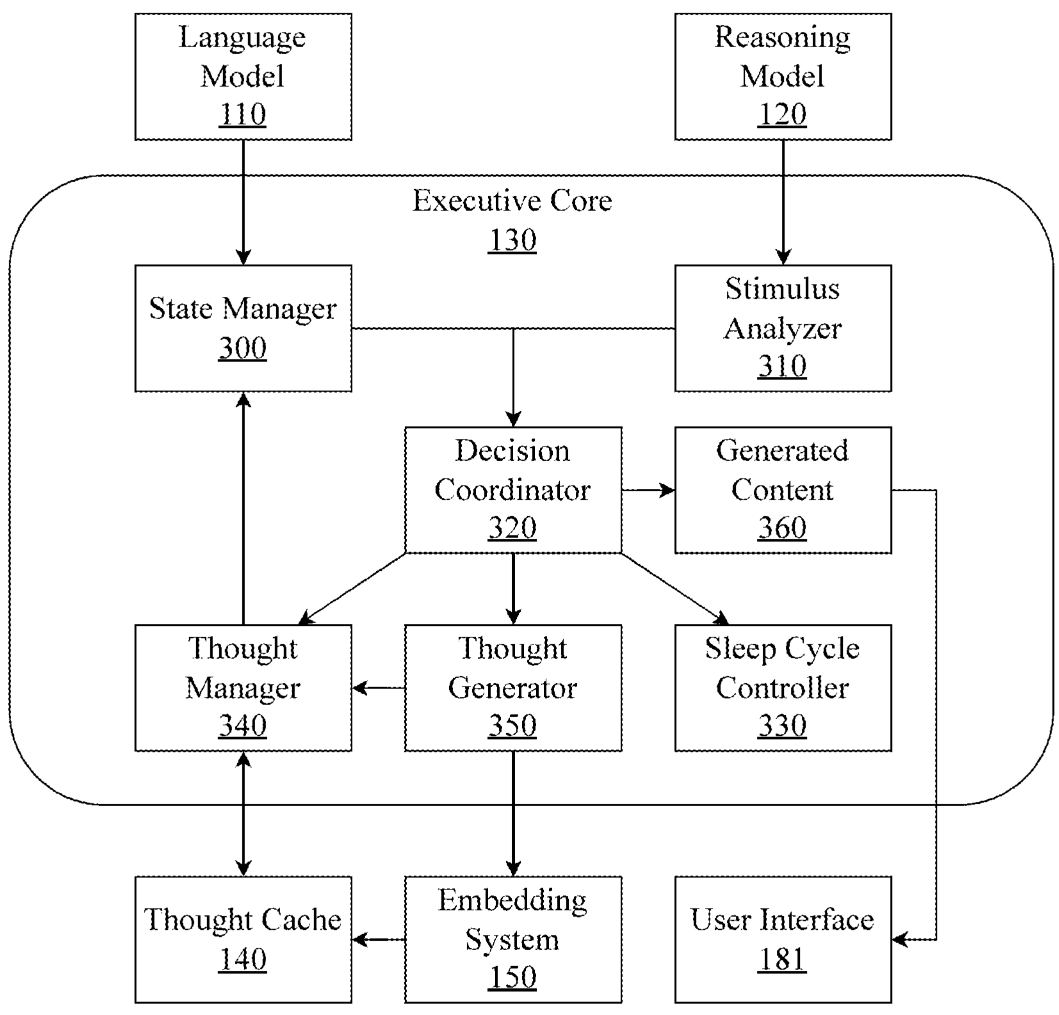
FIG. 3 is a block diagram illustrating the detailed architecture of the executive core and its interactions with other components of the persistent cognitive machine platform.

FIG. 3 is a block diagram illustrating the detailed architecture of the executive core and its interactions with other components of the persistent cognitive machine platform. Executive core 130 serves as the central orchestration component of the persistent cognitive machine platform 100, coordinating the activities of all other components and managing the overall cognitive processes of the system. Unlike the control systems in traditional AI architectures, executive core 130 maintains persistent cognitive processes and makes decisions about how to allocate resources, process information, and manage the system's thoughts.

At the top level, executive core 130 interfaces with language model 110 and reasoning model 120, leveraging these components to process language and perform reasoning tasks respectively. Executive core 130 determines when to engage each of these models based on the nature of the current cognitive task, coordinating their operations to achieve coherent and effective cognitive processing.

A state manager 300 within the executive core is responsible for tracking and controlling the operational state of the persistent cognitive machine. State manager 300 maintains awareness of whether the system is in an active interaction state, passive observation state, independent thinking state, or sleep state. State manager 300 monitors transitions between these states and ensures appropriate resource allocation and behavior patterns for each state. By maintaining this state awareness, state manager 300 enables the persistent cognitive machine to exhibit different behaviors appropriate to different operational contexts.

Working in coordination with state manager 300 is a stimulus analyzer 310, which processes and evaluates incoming stimuli from both external and internal sources. When the system receives input via user interface 181 or other input channels, stimulus analyzer 310 examines this input to determine its nature, relevance, and appropriate response pathway. Stimulus analyzer 310 may perform tasks such as intent recognition, content classification, and priority assessment to inform subsequent processing decisions. Stimulus analyzer 310 also processes internal stimuli generated by the system's own cognitive processes, enabling responses to the system's own thoughts.

A decision coordinator 320 serves as the central decision-making component within the executive core. Based on input from state manager 300 and stimulus analyzer 310, the decision coordinator 320 determines appropriate actions and resource allocations. Decision coordinator 320 orchestrates the flow of information between different system components, decides when to retrieve information from thought cache 140, when to generate new thoughts, and when to produce external responses. Decision coordinator 320 implements sophisticated decision strategies that balance immediate response needs with longer-term cognitive goals.

The persistent cognitive machine is capable of improving the models and thoughts contained within the platform through the implementation of a sleep cycle controller 330, which manages the system's sleep states. Sleep cycle controller 330 determines when the system should enter sleep states based on factors such as activity levels, resource utilization, and accumulated need for thought curation. During sleep states, this component orchestrates the internal processes that occur, including memory consolidation, thought generalization, and pattern extraction. The sleep cycle controller 330 also monitors for wake triggers that would necessitate an early exit from the sleep state, ensuring that stimuli can interrupt sleep when necessary.

A thought manager 340 handles the curation, retrieval, and storage of thoughts within the system. This component interfaces with thought cache 140 to store new thoughts generated during cognitive processes and to retrieve relevant thoughts based on current context and stimuli. Thought manager 340 implements retrieval strategies that may consider direct relevance, analogical relationships, temporal context, and other factors that might make certain thoughts useful in the current context. By effectively managing the system's accumulated thoughts, this component enables the persistent cognitive machine to leverage its experiences when responding to new situations. Working alongside the thought manager, a thought generator 350 creates new thoughts based on current cognitive processes. Unlike the more reactive processing in traditional AI systems, thought generator 350 can initiate new thoughts autonomously, triggered by internal processes rather than external inputs. Thought generator 350 can create associations between previously unconnected thoughts, generate hypotheses, form questions, or produce other types of thoughts that contribute to the system's cognitive processes. The thought generator 350 is central to the system's ability to think independently rather than merely responding to prompts.

The output of the executive core's processing is channeled through the remaining systems as generated content 360. The generated content 360 may interface with user interface 181 to present information to human users or with other interface components to communicate with external systems.

Executive core 130 maintains bidirectional connections with thought cache 140, enabling the storage and retrieval of thoughts. This connection aids in the system's ability to maintain persistent cognition, as it allows experiences and insights to be preserved and leveraged across interactions. Thought cache 140 stores not just factual information but also associations, patterns, and other forms of thought that constitute the system's accumulated cognitive experience. Supporting the thought storage and retrieval processes is embedding system 150, which converts thoughts into vector representations in a high-dimensional abstract space. This system enables thoughts to be organized based on semantic similarity rather than simple keyword matching, allowing for more robust retrieval based on conceptual relationships. Embedding system 150 works with both thought manager 340 and thought cache 140 to facilitate effective thought organization and retrieval.

User interface 181 provides the means for external entities to interact with the persistent cognitive machine. This component handles both input reception and output presentation, enabling two-way communication between the system and its users. User interface 181 may implement various modalities of interaction depending on the specific application context.

In operation, executive core 130 continuously manages the cognitive processes of the persistent cognitive machine, whether actively engaged with external entities or operating independently. When external stimuli are received via user interface 181, stimulus analyzer 310 processes this input and feeds information to decision coordinator 320. Decision coordinator 320 then determines appropriate actions, potentially engaging language model 110 and reasoning model 120 while instructing thought manager 340 to retrieve relevant thoughts from the thought cache 140. Based on this processing, the system may generate new thoughts via thought generator 350, which are then stored in thought cache 140 after being converted to vector representations by embedding system 150. Responses or other outputs are prepared into generated content 360 and presented via user interface 181.

Periodically, as determined by sleep cycle controller 330 and coordinated with state manager 300, the system enters sleep states during which it focuses on internal cognitive maintenance rather than external interaction. The orchestration performed by executive core 130 enables the persistent cognitive machine to transcend the limitations of traditional AI systems, maintaining persistent cognition, learning from experiences, and developing increasingly nuanced understanding over time.

Figure 4:
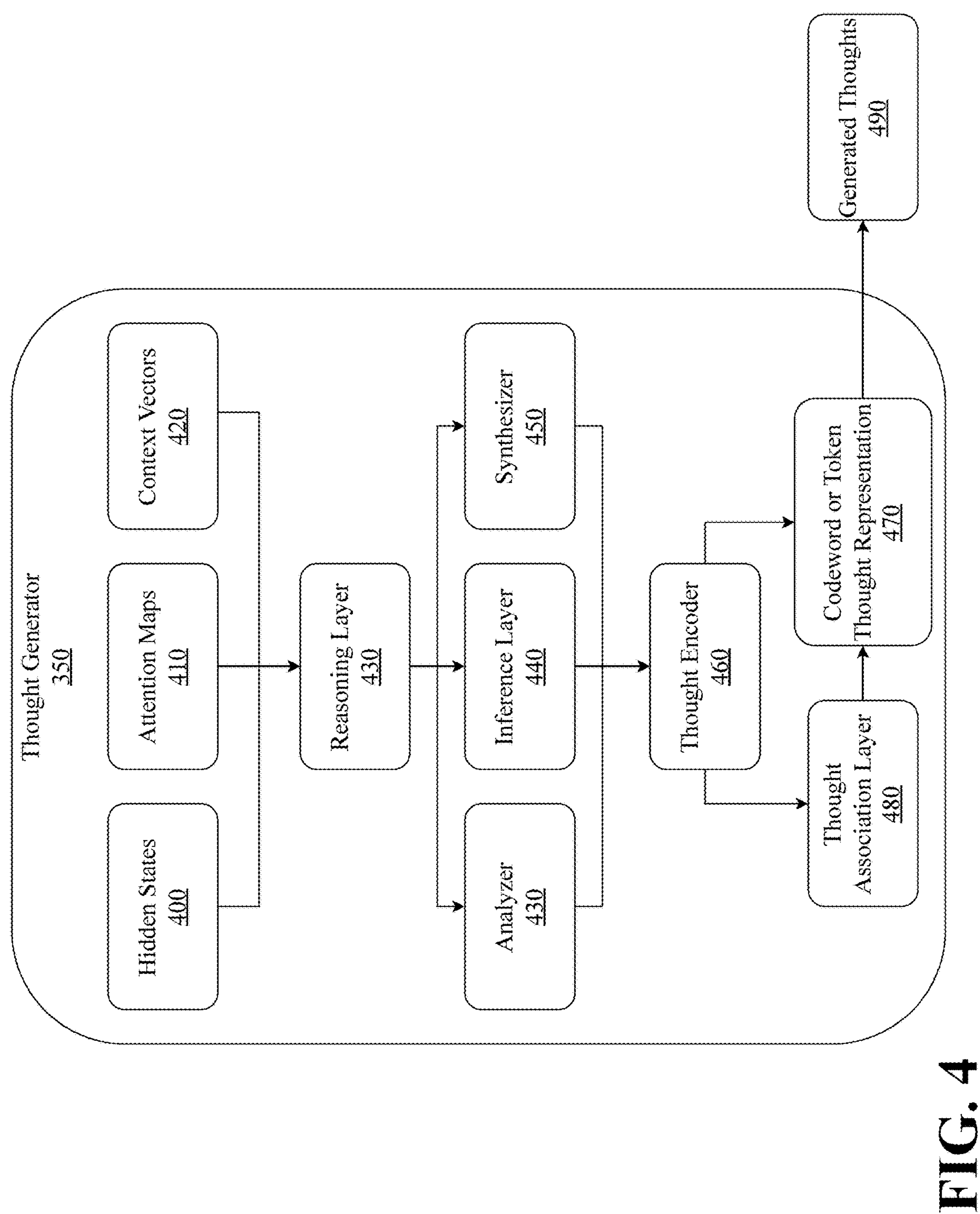
FIG. 4 is a block diagram illustrating the internal architecture of a thought generator within a Persistent Cognitive Machine.

FIG. 4 is a block diagram illustrating the internal architecture of a thought generator within a Persistent Cognitive Machine. The thought generator 350 begins by accessing several internal representations from the language model, including hidden states 400, attention maps 410, and context vectors 420. The hidden states 400 capture the internal activations of the model's neural network layers, representing the model's evolving understanding of the input as it processes the sequence. Attention maps 410 indicate which parts of the input the model is focusing on at different stages of processing, providing insights into the model's attentional patterns and focus. Context vectors 420 aggregate information from different parts of the sequence, representing the contextual understanding that the model has built.

These internal representations are fed into a reasoning layer 430, which serves as the central component for extracting coherent reasoning patterns from the model's internal states. The reasoning layer 430 processes these inputs to identify distinct reasoning steps and analysis patterns that constitute the model's thinking process.

The output from the reasoning layer 430 is then distributed to three specialized processing components: an analyzer 430, an inference layer 440, and a synthesizer 1850. The analyzer 430 examines the input prompt and the model's initial understanding, identifying key concepts, constraints, and requirements. The inference layer 440 performs logical reasoning and deduction based on the model's knowledge and the analyzed information. The synthesizer 450 combines different pieces of analysis and inference to form coherent, integrated conclusions or responses.

The outputs from these three components are then passed to a thought encoder 460, which formats the reasoning steps into structured thought representations. The thought encoder 460 processes the raw reasoning outputs and transforms them into a standardized format suitable for representation as tokens.

The encoded thoughts are then processed through two parallel pathways. First, they are passed to a thought association layer 480 that explicitly links each thought to relevant portions of the input prompt, establishing the relationship between thoughts and the context that triggered them. Second, they are converted into a codeword or token thought representation 470, which represents each thought using the system's codeword vocabulary, allowing for compact storage and efficient processing.

The final output of the thought generator 350 is a collection of generated thoughts 410, each represented as a sequence of tokens that capture a discrete unit of reasoning or analysis. These thoughts are structured representations of the model's intermediate reasoning processes, explicitly capturing the step-by-step thinking that the model performs while processing the input.

Figure 5:
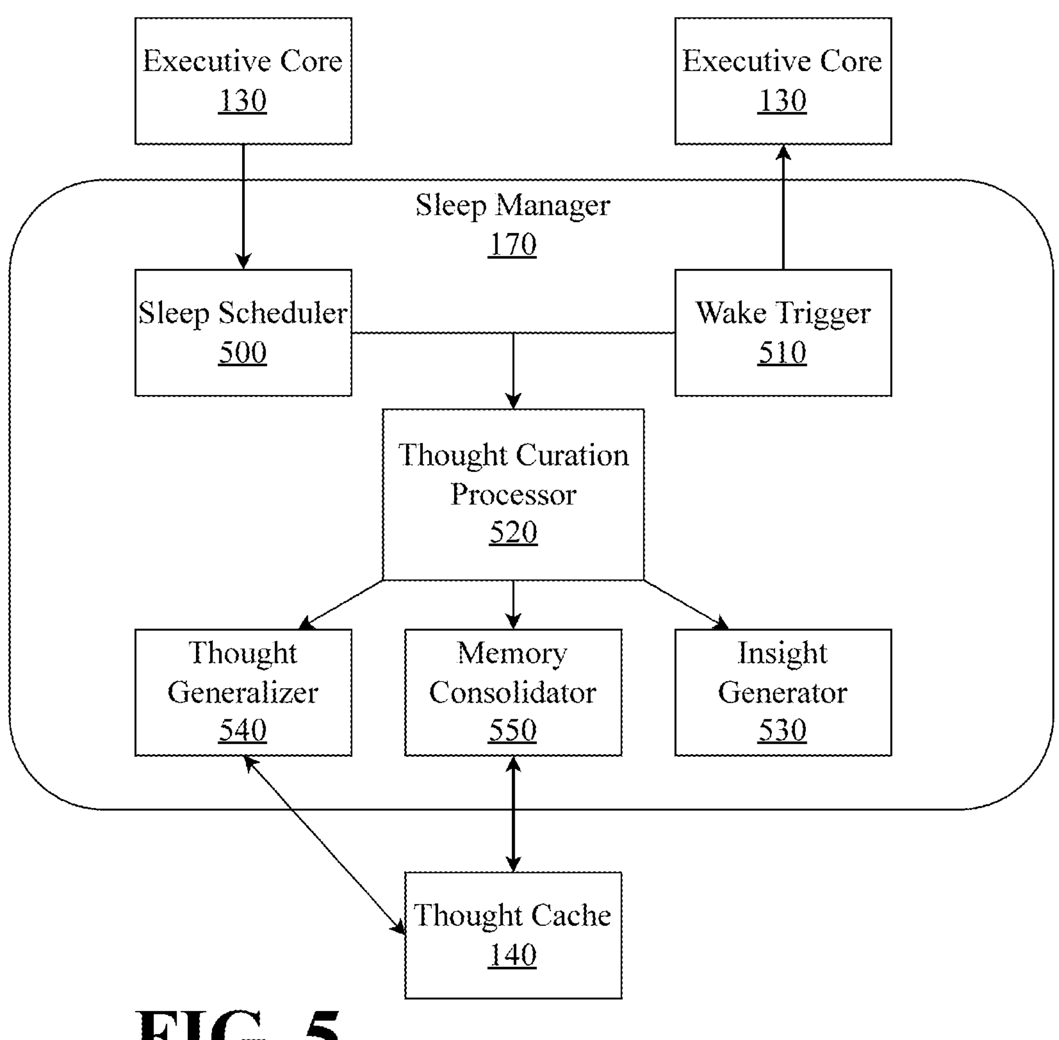
FIG. 5 is a block diagram illustrating an exemplary architecture of a component within a Persistent Cognitive Machine, a sleep manager.

FIG. 5 is a block diagram illustrating an exemplary architecture of a component within a Persistent Cognitive Machine, a sleep manager. Sleep manager 170 allows the PCM to enter sleep-like states during which the system performs internal cognitive maintenance processes rather than responding to external stimuli. This component draws inspiration from biological sleep processes but adapts these concepts specifically for the needs of an artificial cognitive system. Sleep manager 170 interfaces with executive core 130 in a bidirectional manner. Executive core 130 provides inputs regarding system state and activity levels, while sleep manager 170 reports back on sleep state transitions and outcomes of sleep processes. This relationship ensures that sleep states are integrated with the overall cognitive processing of the platform rather than operating as an isolated subsystem.

Within sleep manager 170, a sleep scheduler 500 determines when the persistent cognitive machine should enter sleep states. This component monitors various factors such as recent activity levels, time elapsed since the last sleep cycle, accumulated cognitive load, and current external interaction demands. Based on these factors, sleep scheduler 500 makes decisions about the timing and duration of sleep cycles. Sleep scheduler 500 may implement different types of sleep cycles with varying depths and durations, each optimized for different types of cognitive maintenance tasks.

Complementing sleep scheduler 500 is a wake trigger 510, which monitors conditions that would necessitate an early exit from a sleep state. While the persistent cognitive machine is designed to be temporarily unresponsive during sleep states, certain high-priority stimuli must be able to interrupt sleep when necessary. Wake trigger 510 continuously evaluates incoming stimuli against wake criteria, determining whether the stimulus is important enough to warrant interrupting the current sleep cycle. This component ensures that the system remains responsive to critical needs even during sleep states.

At the heart of the sleep manager is a thought curation processor 520, which orchestrates the various cognitive maintenance processes that occur during sleep states. This central component coordinates the activities of specialized processors that handle different aspects of thought curation. Thought curation processor 520 determines which maintenance processes to prioritize during a given sleep cycle, allocates resources between different processes, and tracks the progress and outcomes of these processes. One of the processes that occurs during sleep states is performed by insight generator 530, which creates new connections between previously unrelated thoughts. This component analyzes patterns across the system's accumulated thoughts to identify non-obvious relationships, potential implications, and novel perspectives. Insight generator 530 enables the persistent cognitive machine to develop new understanding that goes beyond what was explicitly learned from experiences, allowing it to make creative leaps and generate innovative solutions to problems.

Working in parallel with insight generator 530, thought generalizer 540 identifies patterns across specific experiences to create more broadly applicable concepts. When the persistent cognitive machine encounters multiple similar situations, thought generalizer 540 extracts the common elements to form generalized knowledge that can be applied to new situations. This process is similar to abstraction in human cognition, where specific instances lead to the formation of general principles. Thought generalizer 540 enables the system to become more efficient in its cognitive processes by recognizing patterns rather than treating each new experience as entirely novel.

A memory consolidator 550 strengthens important connections and integrates new experiences with existing knowledge. This component evaluates recent experiences based on factors such as emotional significance, relevance to ongoing goals, repetition, and novelty to determine which experiences should be consolidated into long-term memory. Memory consolidator 550 also strengthens connections between related thoughts based on co-activation patterns, enhancing the system's ability to retrieve relevant information in the future. Through these processes, memory consolidator 550 ensures that important experiences are preserved while less significant details may fade from accessibility over time.

All of these sleep processes interact with thought cache 140, which stores the persistent cognitive machine's accumulated thoughts and experiences. During sleep states, thought cache 140 provides the raw material for curation processes and receives the updated thought structures that result from these processes. The bidirectional connection between sleep manager 170 and thought cache 140 enables the system to effectively organize and utilize its accumulated experiences.

In operation, sleep manager 170 receives signals from executive core 130 indicating that conditions are appropriate for a sleep cycle. Sleep scheduler 500 then initiates a sleep state, during which thought curation processor 520 activates insight generator 530, thought generalizer 540, and memory consolidator 550 to perform their respective functions on the contents of thought cache 140. Throughout this process, wake trigger 510 monitors for conditions that would necessitate an early return to an active state. The sleep processes implemented by sleep manager 170 are aid in the persistent cognitive machine's ability to learn effectively from experiences over time. By curating thoughts during periods of reduced external interaction, the system can develop more sophisticated understanding and more efficient cognitive processes. This approach mirrors the importance of sleep for learning and memory consolidation in biological systems while being specifically designed for the unique requirements of an artificial cognitive architecture.

Sleep manager 170 embodies a fundamental advancement beyond traditional AI systems, which typically process information only in response to explicit prompts and lack dedicated mechanisms for organizing and generalizing from accumulated experiences. By implementing these biologically-inspired but technologically-adapted processes, the persistent cognitive machine platform achieves a level of cognitive sophistication and adaptability that would be difficult or impossible to attain through prompt-response processing alone.

Figure 6:
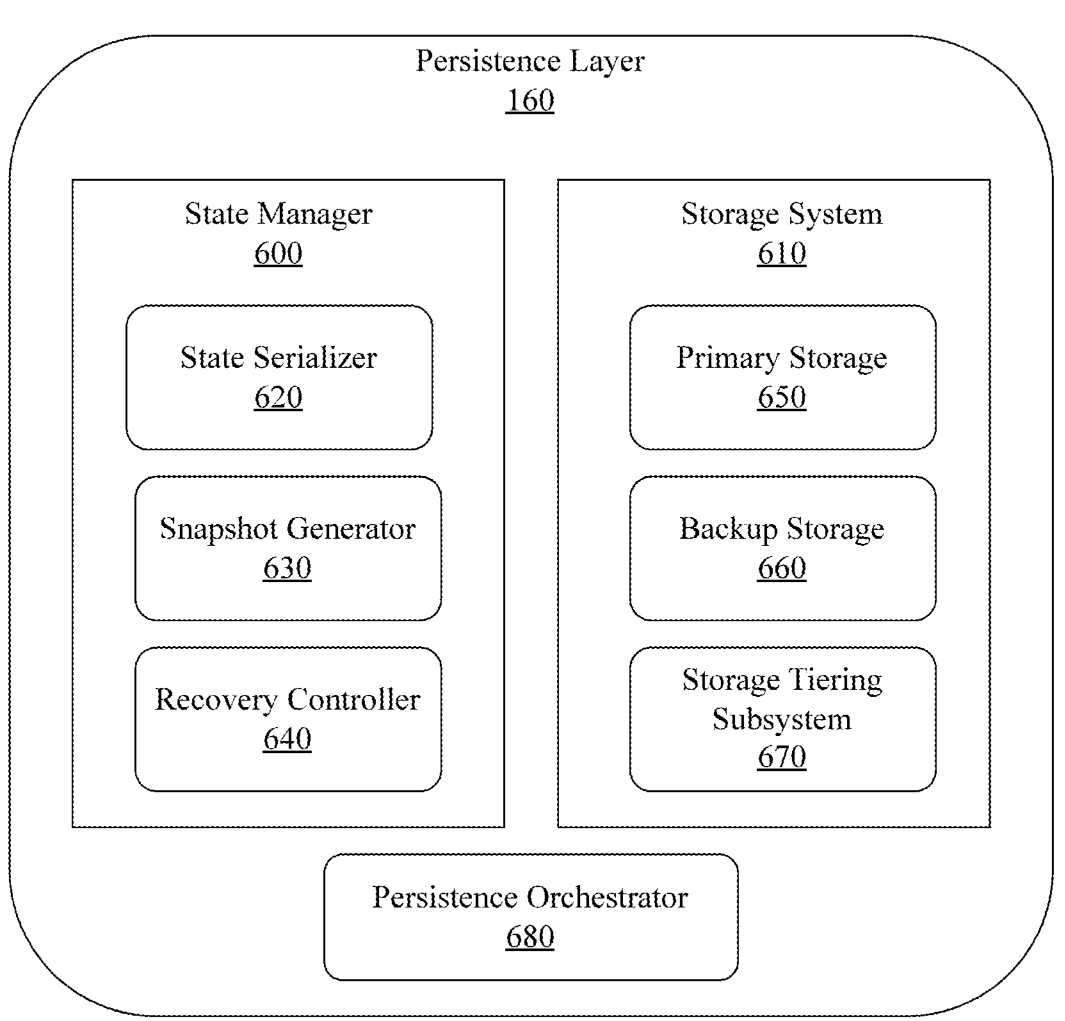
FIG. 6 is a block diagram illustrating an exemplary architecture of a component within a Persistent Cognitive Machine, a persistence layer.

FIG. 6 is a block diagram illustrating an exemplary architecture of a component within a Persistent Cognitive Machine, a persistence layer. The persistence layer 160 enables the persistent cognitive machine to maintain continuity of cognition across system shutdowns and restarts. Unlike traditional AI systems that reset to an initial state when restarted, the persistent cognitive machine preserves its accumulated experiences, relationships, and cognitive state, allowing it to resume operation as if no interruption had occurred. This capability is instrumental to the "persistent" aspect of the system's design.

Persistence layer 160 is organized into two main subsystems—a state manager 600 and a storage system 610—with a persistence orchestrator 680 coordinating between them. This architecture ensures reliable state preservation while optimizing for both performance and data integrity. State manager 600 handles the processing and organization of system state information for persistence. This component determines what aspects of the system state need to be preserved, how frequently different types of state should be saved, and how to structure the state data for efficient storage and retrieval. State manager 600 works closely with other components of the persistent cognitive machine to ensure that all critical state information is captured appropriately.

Within state manager 600, a state serializer 620 converts the runtime objects and data structures of the persistent cognitive machine into formats suitable for storage. This component handles the complex task of transforming the rich, interconnected thought structures and system configurations into serialized representations that can be efficiently stored while preserving all necessary relationships and metadata. State serializer 620 may employ various serialization strategies optimized for different types of state information, balancing factors such as storage efficiency, serialization speed, and deserialization performance.

Working alongside state serializer 620, a snapshot generator 630 creates consistent point-in-time snapshots of the system state. Rather than continuously updating state information, which could lead to inconsistencies if the system were to shut down unexpectedly, snapshot generator 630 creates complete snapshots at appropriate intervals. These snapshots serve as recovery points to which the system can return if needed. The snapshot generator 630 may implement various snapshot strategies, including full snapshots and incremental snapshots, to balance storage efficiency and recovery capabilities.

Complementing these components is a recovery controller 640, which manages the restoration of system state after a shutdown or failure. When the persistent cognitive machine restarts, recovery controller 640 coordinates the process of loading the most recent valid snapshot and applying any necessary transformations to restore the system to its previous state. This component includes validation mechanisms to ensure that corrupted or incomplete state data does not compromise the system's operation. Recovery controller 640 may also implement strategies for partial recovery in cases where complete state restoration is not possible.

A storage system 610 provides the physical storage capabilities needed to persist system state across shutdowns. This component manages the actual storage and retrieval of serialized state data, implementing appropriate mechanisms for data integrity, efficiency, and reliability. Storage system 610 may interface with various types of storage hardware depending on the deployment environment of the persistent cognitive machine. Within storage system 610, a primary storage 650 provides the main storage facility for system state. This component is optimized for performance and accessibility, enabling rapid storage and retrieval of state information during normal operation. Primary storage 650 may utilize high-performance storage technologies such as solid-state drives or in-memory databases to minimize the performance impact of state persistence operations.

To protect against data loss, a backup storage 660 maintains redundant copies of critical state information. This component may implement various backup strategies, including off-site replication, to ensure that state information can be recovered even in the event of hardware failures or other disasters. Backup storage 660 works in coordination with the primary storage 650 to provide a comprehensive data protection strategy. A storage tiering subsystem 670 optimizes storage usage by placing different types of state information on appropriate storage tiers. Storage tiering subsystem 670 recognizes that not all state information has the same access patterns or recovery requirements. Frequently accessed or important state information may be stored on high-performance storage tiers, while less frequently accessed historical information may be moved to more cost-effective storage tiers. Storage tiering subsystem 670 implements policies for data migration between tiers based on access patterns and aging criteria.

Coordinating the activities of both state manager 600 and storage system 610 is a persistence orchestrator 680. This central component ensures that state serialization, snapshot generation, storage operations, and recovery processes work together seamlessly. Persistence orchestrator 680 implements policies for when to create snapshots, how to balance system performance with persistence requirements, and how to handle exceptional conditions. This component provides a unified interface for other parts of the persistent cognitive machine to interact with the persistence capabilities.

In operation, persistence layer 160 continuously monitors the state of the persistent cognitive machine and periodically creates serialized snapshots through state serializer 620 and snapshot generator 630. These snapshots are stored in primary storage 650, with redundant copies maintained in backup storage 660 and potentially migrated between storage tiers by storage tiering subsystem 670 based on aging and access patterns. When the system restarts after a shutdown, recovery controller 640 retrieves the most recent valid snapshot and restores the system state, allowing the persistent cognitive machine to resume operation from where it left off.

Persistence layer 160 is helpful to the concept of persistent cognition, allowing the system to accumulate experiences and knowledge over extended periods that may span multiple operational sessions. The persistence mechanisms implemented in this layer enable the persistent cognitive machine to maintain continuity of cognition despite the practical necessity of occasional system shutdowns. The architecture of persistence layer 160 is designed to be adaptable to various deployment environments, from single-server installations to distributed cloud environments. The modular approach allows for different implementations of the storage components based on available technologies and specific requirements, while maintaining consistent behavior from the perspective of the rest of the persistent cognitive machine platform.

Figure 7:
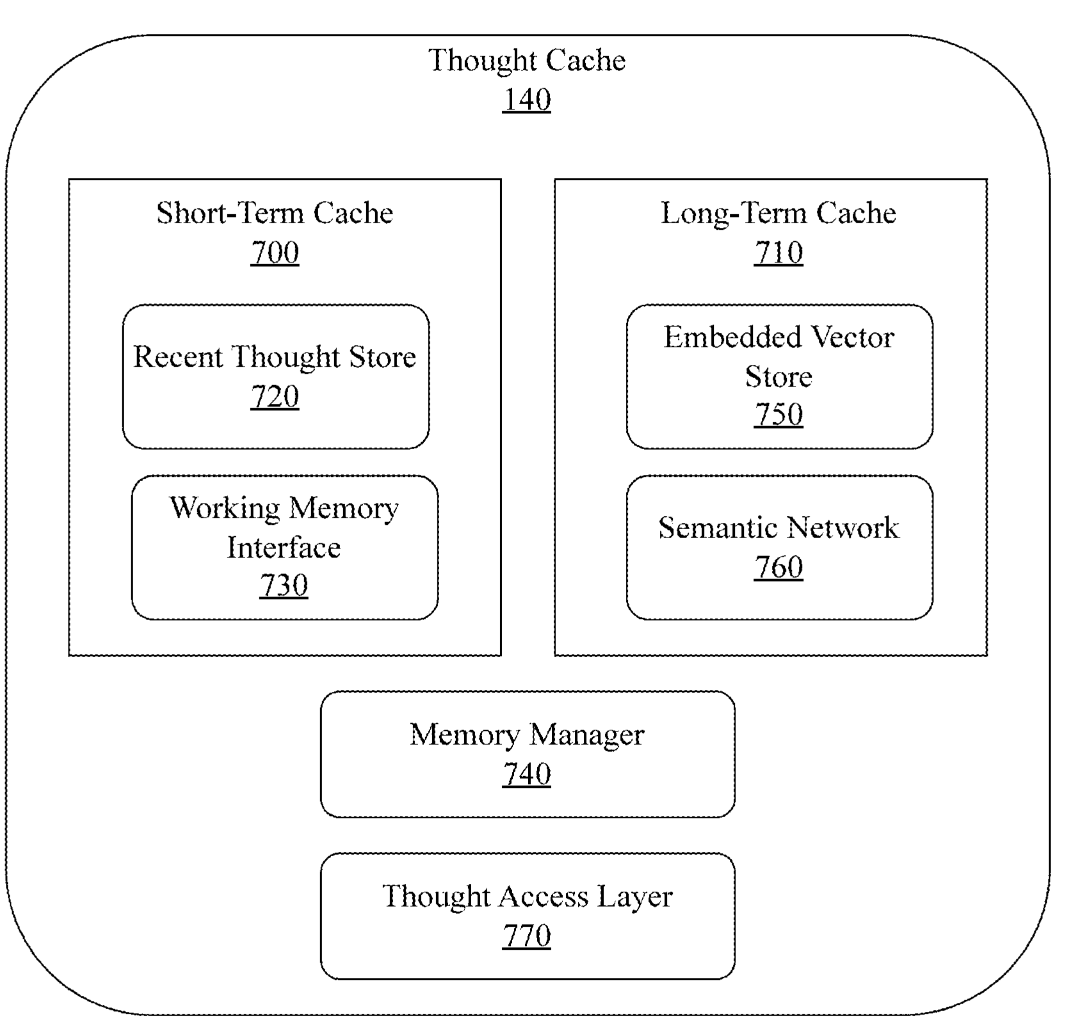
FIG. 7 is a block diagram illustrating an exemplary architecture of a component within a Persistent Cognitive Machine, a thought cache.

FIG. 7 is a block diagram illustrating an exemplary architecture of a component within a Persistent Cognitive Machine, a thought cache. Thought cache 140 functions as the system's memory and enabling it to remember previous experiences and apply them to new situations. Unlike traditional AI systems that typically rely on fixed knowledge representations or simple retrieval mechanisms, thought cache 140 implements a sophisticated, biologically-inspired memory architecture that supports both short-term and long-term memory functions with mechanisms for transferring information between them.

Thought cache 140 is organized into two primary components: a short-term cache 700 and a long-term cache 710. This division mirrors biological memory systems, allowing for different optimization strategies appropriate to the different functions and characteristics of short-term versus long-term memory storage.

Short-term cache 700 stores recently encountered or generated thoughts that are actively being used in current cognitive processes. This component provides high-speed access to thoughts that are relevant to ongoing operations, enabling the persistent cognitive machine to maintain context and continuity during interactions and cognitive processes. Short-term cache 700 has limited capacity compared to the long-term cache, focusing on thoughts that are immediately relevant rather than attempting to store the system's entire cognitive history.

Within short-term cache 700, recent thought store 720 maintains the most recently created or accessed thoughts. This component functions similar to working memory in humans, keeping active thoughts readily available for immediate processing. Recent thought store 720 organizes thoughts based on recency and relevance to current cognitive processes, enabling rapid access to contextually appropriate information. Thoughts in this store may be temporarily held even when not immediately active to support context maintenance across related cognitive processes.

Complementing the recent thought store, a working memory interface 730 provides mechanisms for the executive core and other components to interact with the contents of the short-term cache. This interface enables operations such as thought retrieval, manipulation, and temporary storage during active cognitive processes. Working memory interface 730 implements priority schemes that determine which thoughts remain in working memory and which are transferred to long-term storage or discarded, based on factors such as relevance, importance, and cognitive load.

For longer-term storage of thoughts, long-term cache 710 maintains a comprehensive repository of the system's accumulated experiences and derived knowledge. This component stores thoughts that have been deemed significant enough to preserve beyond their immediate context, enabling the persistent cognitive machine to develop a continuously growing knowledge base from which it can draw in future operations. Long-term cache 710 implements sophisticated storage and retrieval mechanisms that optimize for capacity and organization rather than raw access speed.

Within a long-term cache 710, an embedded vector store 750 represents thoughts as vectors in a high-dimensional abstract space. This component leverages techniques similar to those used in modern vector databases, enabling efficient storage and similarity-based retrieval of large volumes of thought data. By representing thoughts as vectors, embedded vector store 750 allows for retrieval based on semantic similarity rather than exact matching, supporting more flexible and human-like memory access patterns. Thoughts that are conceptually similar are positioned closer together in this abstract space, facilitating associative retrieval processes.

Complementing the vector-based representation, a semantic network 760 maintains explicit relationships between thoughts. While the embedded vector store captures implicit similarity, semantic network 760 represents specific relationships such as causality, hierarchy, temporal sequence, and other structured associations between thoughts. This component enables the system to traverse these relationships during reasoning processes, supporting capabilities such as logical inference, narrative understanding, and structured knowledge representation. Semantic network 760 grows and evolves over time as the system encounters new information and develops new connections between existing thoughts.

Coordinating between these storage components is a memory manager 740, which oversees the movement of thoughts between short-term and long-term storage. This component implements policies for when thoughts should be transferred from short-term to long-term memory, how thoughts in long-term memory should be organized and indexed, and when thoughts should be retrieved from long-term memory based on their relevance to current cognitive processes. Memory manager 740 may use factors such as thought importance, repetition, emotional significance, and relevance to ongoing goals to determine which thoughts deserve long-term preservation and how they should be prioritized.

Providing unified access to the thought cache's capabilities is a thought access layer 770, which serves as the interface through which other components of the persistent cognitive machine interact with stored thoughts. This component implements query mechanisms that allow for thought retrieval based on various criteria, including content similarity, temporal relationships, categorical membership, and explicit associations. Thought access layer 770 abstracts away the underlying storage mechanisms, presenting a consistent interface regardless of whether thoughts are retrieved from short-term or long-term storage. This layer may also implement access control mechanisms to ensure appropriate use of thought data when such considerations are relevant.

In operation, thought cache 140 continuously receives new thoughts generated during the persistent cognitive machine's cognitive processes. These thoughts are initially stored in recent thought store 720 within short-term cache 700, where they are readily available for ongoing processing. As the system continues to operate, memory manager 740 evaluates these thoughts to determine which should be preserved in long-term memory. Thoughts selected for long-term preservation are processed by the embedding system to create vector representations, which are then stored in embedded vector store 750. Relationships between these thoughts and existing knowledge are recorded in semantic network 760.

When the persistent cognitive machine encounters new situations, thought access layer 770 retrieves relevant thoughts from both short-term and long-term storage based on similarity to the current context, explicit relationships, and other retrieval criteria. These retrieved thoughts then inform the system's response to the current situation, allowing it to leverage past experiences and accumulated knowledge rather than responding based solely on immediate input.

Thought cache 140 is aids in the persistent cognitive machine's ability to develop increasingly sophisticated understanding over time. By preserving thoughts across interactions and even across system restarts (in conjunction with the persistence layer), the thought cache enables persistent learning and adaptation. This capability represents a fundamental advancement beyond traditional AI systems, which typically either maintain static knowledge representations or learn incrementally through explicit training processes rather than naturally accumulating experiences.

Figure 8:
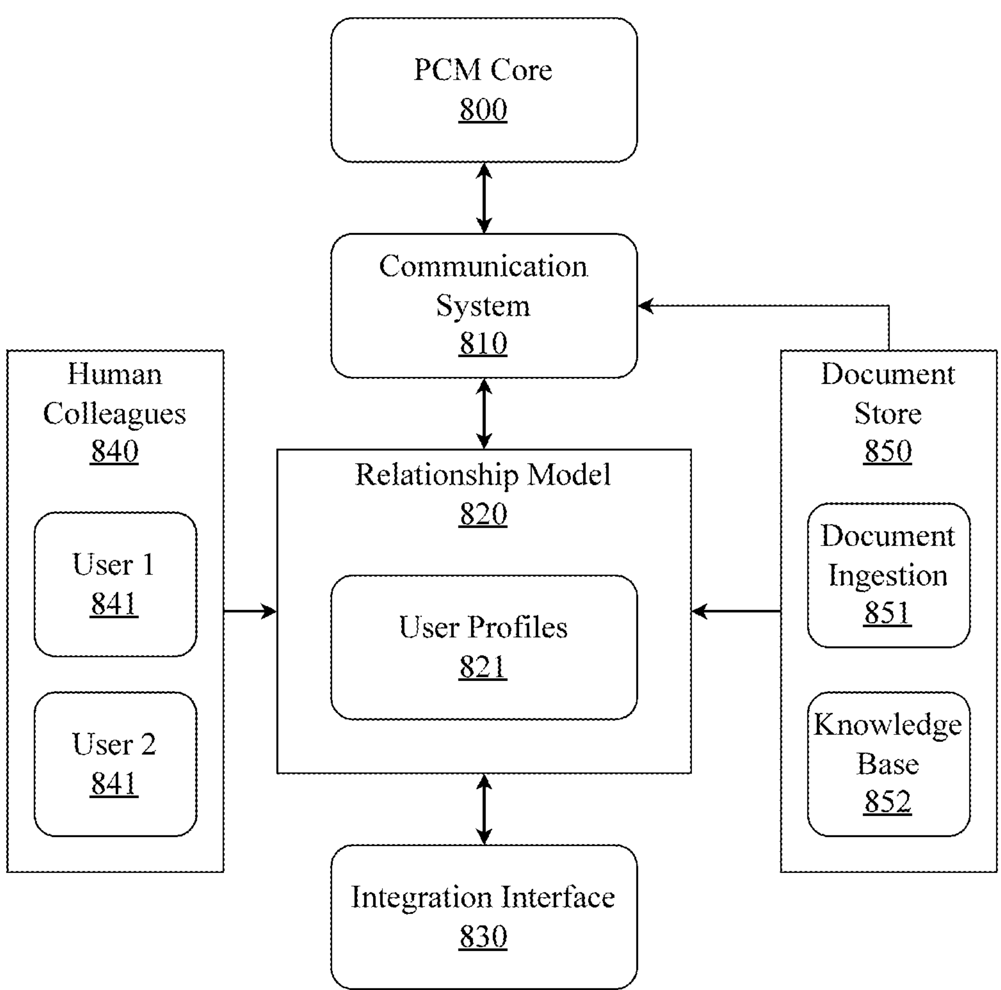
FIG. 8 is a block diagram illustrating an exemplary system architecture of a persistent cognitive machine platform that is used as a synthetic cognitive colleague.

FIG. 8 is a block diagram illustrating an exemplary system architecture of a persistent cognitive machine platform that is used as a synthetic cognitive colleague. The synthetic cognitive colleague implementation demonstrates how the persistent cognitive machine technology can be applied to create an always-on, text-based cognitive entity capable of participating in both individual and group interactions. This implementation particularly emphasizes the relationship-building and document processing capabilities of the underlying platform, creating a system that can function as a collaborative team member within professional environments.

At the center of the implementation is PCM core 800, which incorporates all the fundamental components of the persistent cognitive machine platform described in previous figures, including the language model, reasoning model, executive core, thought cache, embedding system, persistence layer, and sleep manager. The PCM core 800 provides the cognitive capabilities that enable the synthetic cognitive colleague to understand context, reason about information, maintain persistent memory, and develop relationships over time.

A communication system 810 facilitates interactions between the synthetic cognitive colleague and human users. This component manages both individual and group-based communications, supporting capabilities such as one-on-one conversations, group discussions where the synthetic cognitive colleague may be either an active participant or a passive observer, and asynchronous messaging. Communication system 810 handles message routing, conversation state tracking, and context maintenance across multiple concurrent conversations. Unlike traditional chatbots that operate within isolated conversation sessions, this component enables the synthetic cognitive colleague to maintain awareness of all conversations within its scope, recognizing relationships between different discussions and leveraging insights across conversation boundaries.

A key innovation in this implementation is relationship model 820, which tracks and manages the synthetic cognitive colleague's relationships with individual human users. This component enables the system to develop individualized relationships with each team member, adapting its behavior, communication style, and information sharing based on each person's preferences, expertise, and interaction history. Relationship model 820 maintains knowledge about each user's areas of expertise, communication preferences, work patterns, and historical interactions, allowing the Synthetic Cognitive Colleague to interact in ways that are appropriate and effective for each specific individual.

Within relationship model 820, user profiles 821 store detailed information about each human colleague. These profiles go beyond basic identity information to capture interaction preferences, knowledge areas, communication patterns, and relationship history. As the synthetic cognitive colleague continues to interact with users over time, these profiles become increasingly detailed and nuanced, enabling more personalized and effective interactions. User profiles 821 also track the social dynamics between human team members that are visible to the synthetic cognitive colleague, allowing it to understand team structures, collaboration patterns, and communication norms.

A human colleague 840 represents the human users who interact with the synthetic cognitive colleague. These may include team members, clients, stakeholders, or other individuals relevant to the professional context in which the system operates. The diagram shows two specific users, user 1 841 and user 2 841, but the system is designed to accommodate any number of human colleagues, each with their own relationship to the synthetic cognitive colleague.

Supporting the knowledge capabilities of the system is a document store 850, which manages documents and other knowledge artifacts that have been shared with or created by the synthetic cognitive colleague. This component enables the system to ingest, process, and leverage various forms of structured and unstructured information, from technical documents and research papers to meeting notes and project plans. Document store 850 extends the synthetic cognitive colleague's knowledge beyond what it has directly experienced through conversations, providing additional context and domain knowledge.

Document ingestion 851 within the document store handles the processing of new documents as they are added to the system. Document ingestion 851 extracts content, identifies key concepts and relationships, and integrates the information into the system's thought cache. Document ingestion 851 may implement various processing strategies appropriate to different document types, from text extraction and semantic analysis to structured data parsing. Importantly, there are no token limits on document ingestion, allowing the Synthetic Cognitive Colleague to process documents of any length or complexity.

Once processed, document information is stored in the knowledge base 852, which organizes information for efficient retrieval and utilization. The knowledge base 852 integrates with the thought cache of the PCM core, allowing document-derived knowledge to be connected with insights gained through direct interaction. This integration enables the Synthetic Cognitive Colleague to recall and leverage document information in relevant contexts, even if the document was ingested long ago or in a different interaction context.

An integration interface 830 provides connectivity between the various components of the Synthetic Cognitive Colleague implementation. This component ensures that information flows appropriately between the PCM core, communication system, relationship model, and document store. Integration interface 830 manages data transformations, event routing, and synchronization to create a cohesive system from these various specialized components.

In operation, the synthetic cognitive colleague implementation provides an always-on cognitive presence within a team or organizational context. Human colleagues can engage with it directly through one-on-one conversations, include it in group discussions, or share documents for its analysis and incorporation. The system develops individualized relationships with each human colleague, adapting its interactions based on accumulated relationship knowledge. It can proactively share relevant information, connect people with similar interests or complementary expertise, and maintain context across conversations that may span days, weeks, or even months.

The synthetic cognitive colleague demonstrates how the persistent cognitive machine platform can be applied to create systems that transcend traditional AI assistants or chatbots. By maintaining persistent cognition, developing genuine relationships with users, and accumulating knowledge across interactions and documents, this implementation creates a cognitive entity that can function as a true team member rather than merely a tool. This capability represents a significant advancement in how AI systems can be integrated into professional environments, offering new possibilities for knowledge management, collaboration, and cognitive augmentation.

Figure 9:
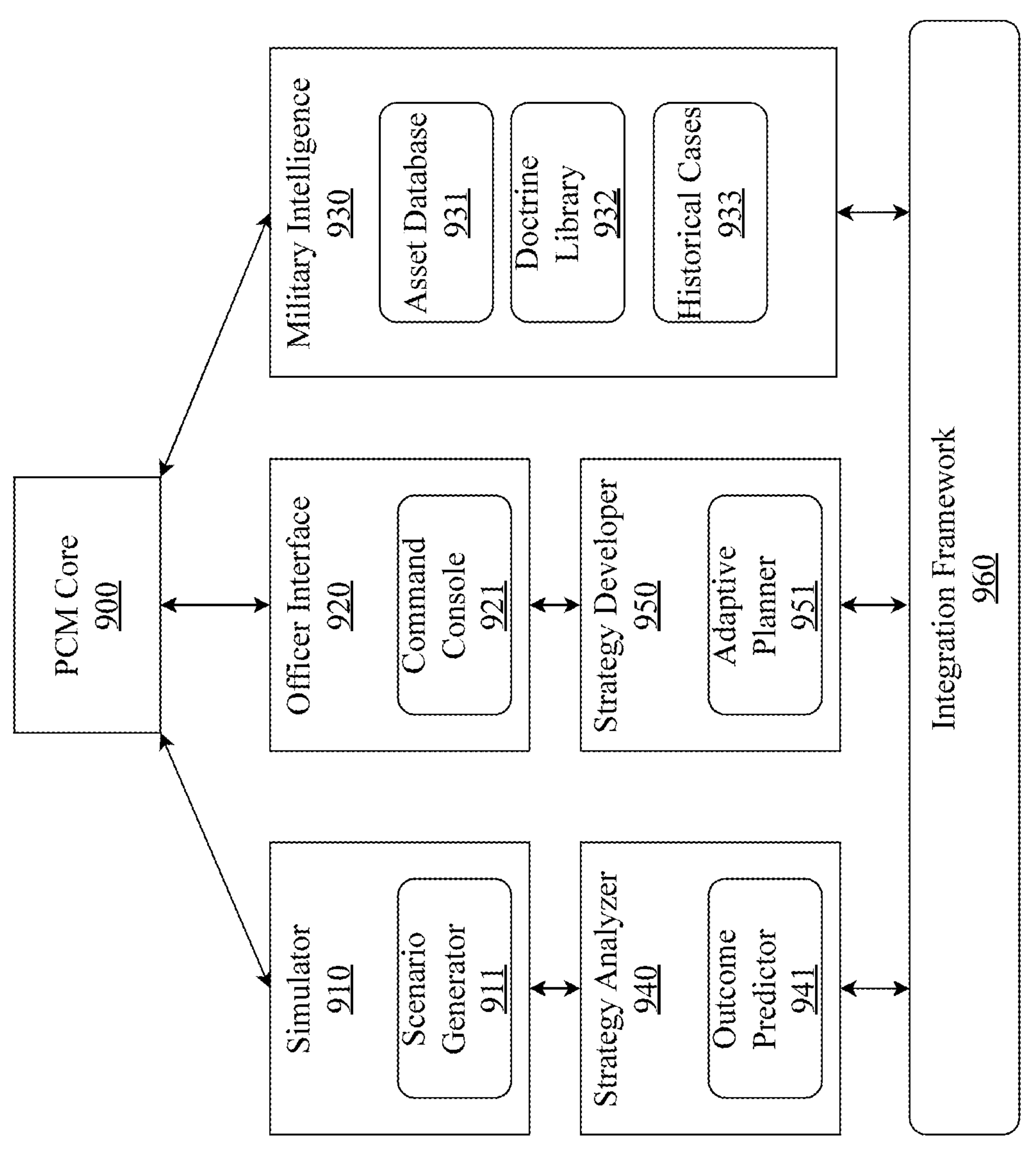
FIG. 9 is a block diagram illustrating an exemplary system architecture of a persistent cognitive machine platform that is used for strategic wargaming simulations.

FIG. 9 is a block diagram illustrating an exemplary system architecture of a persistent cognitive machine platform that is used for strategic wargaming simulations. A strategic wargaming platform implementation demonstrates how the persistent cognitive machine technology can be applied to military strategic planning and training contexts. This implementation leverages the platform's persistent cognition capabilities to create a system that can generate realistic scenarios, analyze strategic approaches, and develop adaptive planning based on accumulated experience and military knowledge.

At the foundation of this implementation is the PCM core 900, which incorporates all the fundamental components of the persistent cognitive machine platform, including the language model, reasoning model, executive core, thought cache, embedding system, persistence layer, and sleep manager. PCM core 900 provides the cognitive capabilities that enable a strategic wargaming platform to understand military contexts, reason about strategic scenarios, maintain persistent memory of simulations and outcomes, and continuously improve its analytical capabilities over time.

A simulator 910 generates and manages strategic scenarios for wargaming exercises. This component creates realistic simulations of military situations based on parameters provided by human officers and informed by historical data, current doctrine, and known asset capabilities. Simulator 910 provides the environmental context within which strategic planning and analysis occur, creating conditions that challenge officers to develop effective responses to complex situations.

Within the simulator, a scenario generator 911 creates specific scenario instances for wargaming exercises. This component can generate diverse scenarios across different domains (land, sea, air, space, cyber), scales (tactical to strategic), and contexts (conventional warfare, counterinsurgency, humanitarian operations, etc.). Scenario generator 911 ensures that scenarios are realistic, challenging, and aligned with training or analysis objectives. It can introduce unpredictable elements, resource constraints, and complex adversarial behaviors to enhance the realism and educational value of the simulations.

An officer interface 920 provides the means for military officers to interact with the Strategic Wargaming Platform. This component enables officers to configure scenarios, input strategic decisions, review analysis, and receive feedback. Officer interface 920 is designed to accommodate both individual officers and command teams, supporting collaborative strategic planning and decision-making. This interface may implement various access levels and role-based permissions appropriate to military hierarchy and operational security requirements.

Within the officer interface, a command console 921 serves as the primary interaction point for human officers. This specialized interface provides intuitive access to the platform's capabilities, allowing officers to issue commands, review situation reports, analyze intelligence, and assess strategic options. Command console 921 may implement visualizations appropriate to military contexts, such as tactical maps, asset disposition displays, timeline projections, and other specialized representations that support strategic decision-making.

An intelligence module 930 maintains comprehensive information about military assets, doctrine, and historical precedents. This component provides the factual foundation for realistic scenario generation and strategic analysis. Military intelligence module 930 continuously evolves as new information is incorporated, ensuring that simulations and analyses reflect current military realities.

Within the military intelligence module, an asset database 931 maintains detailed information about military capabilities across various forces, including specifications, performance characteristics, operational constraints, and deployment considerations. This information enables realistic modeling of military assets within simulations and informs strategic analysis based on actual capabilities rather than abstractions.

Supporting the asset database, a doctrine library 932 contains military doctrines, tactics, techniques, and procedures from various forces and time periods. This component enables the platform to generate scenarios and strategic analyses that reflect established military thinking while also identifying potential innovations or adaptations. Doctrine library 932 provides essential context for understanding why certain strategic approaches might be favored in particular situations based on established military principles.

Complementing these current resources, historical cases 933 is a repository of historical military operations, their contexts, strategies employed, and outcomes. This historical knowledge enables the platform to draw parallels between current scenarios and historical precedents, identifying potentially relevant lessons and considerations. Historical cases 933 provide empirical grounding for strategic analysis, allowing the platform to reference actual military experiences rather than purely theoretical models.

A strategy analyzer 940 evaluates strategic options within the context of specific scenarios. This component applies military principles, historical precedents, and analytical methodologies to assess the potential effectiveness, risks, and implications of different strategic approaches. Strategy analyzer 940 can evaluate multiple competing strategies within the same scenario, providing comparative analysis to support officer decision-making. Within the strategy analyzer, an outcome predictor 941 forecasts potential consequences of strategic decisions across multiple dimensions. This component projects how strategies might unfold over time, considering factors such as force effectiveness, resource consumption, territorial control, casualty rates, and other relevant metrics. Outcome predictor 941 may implement probabilistic approaches that acknowledge the inherent uncertainties in military operations, providing range estimates and confidence levels rather than deterministic predictions.

Working in conjunction with the strategy analyzer is a strategy developer 950, which generates and refines strategic options based on scenario parameters, available assets, mission objectives, and constraints. This component can propose novel strategic approaches that officers might not have considered, potentially identifying innovative solutions to complex military problems. Strategy developer 950 leverages the platform's accumulated experience across multiple wargaming exercises to continuously improve its strategic recommendations. Within the strategy developer, an adaptive planner 951 creates detailed plans that can evolve in response to changing conditions. This component recognizes that military operations rarely proceed exactly as planned and builds adaptability into strategic recommendations. Adaptive planner 951 identifies decision points, contingency options, and reconfiguration possibilities that enable strategic plans to remain effective even as circumstances change. This capability is particularly valuable for preparing officers to handle the uncertainties and friction inherent in military operations.

Integrating all these specialized components is an integration framework 960, which enables seamless information flow and coordination across the Strategic Wargaming Platform. This component ensures that scenarios, intelligence, strategic analyses, and officer inputs are properly synchronized and consistently represented throughout the system. Integration framework 960 may implement specialized protocols for military contexts, including security measures appropriate for classified information when deployed in sensitive environments.

In operation, the strategic wargaming platform provides a sophisticated environment for military training, strategy development, and analytical wargaming. Officers interact with the system through command console 921, configuring scenarios and providing strategic inputs. Simulator 910 generates detailed scenarios drawing on military intelligence 930 module for realistic parameters. Strategy analyzer 940 evaluates officer strategies while strategy developer 950 offers alternative approaches. Throughout this process, PCM core 900 provides persistent cognition capabilities that enable the platform to learn from each exercise, improving its scenario generation, analysis, and strategy development over time.

This implementation demonstrates the application of persistent cognitive machine technology to the domain of military strategic planning and training, a context that particularly benefits from the platform's ability to maintain continuity of cognition across multiple sessions and learn from accumulated experiences. The strategic wargaming platform represents a significant advancement over traditional wargaming systems, which typically lack the ability to develop increasingly sophisticated understanding based on their own operational history.

DETAILED DESCRIPTION OF EXEMPLARY ASPECTS

Figure 10:
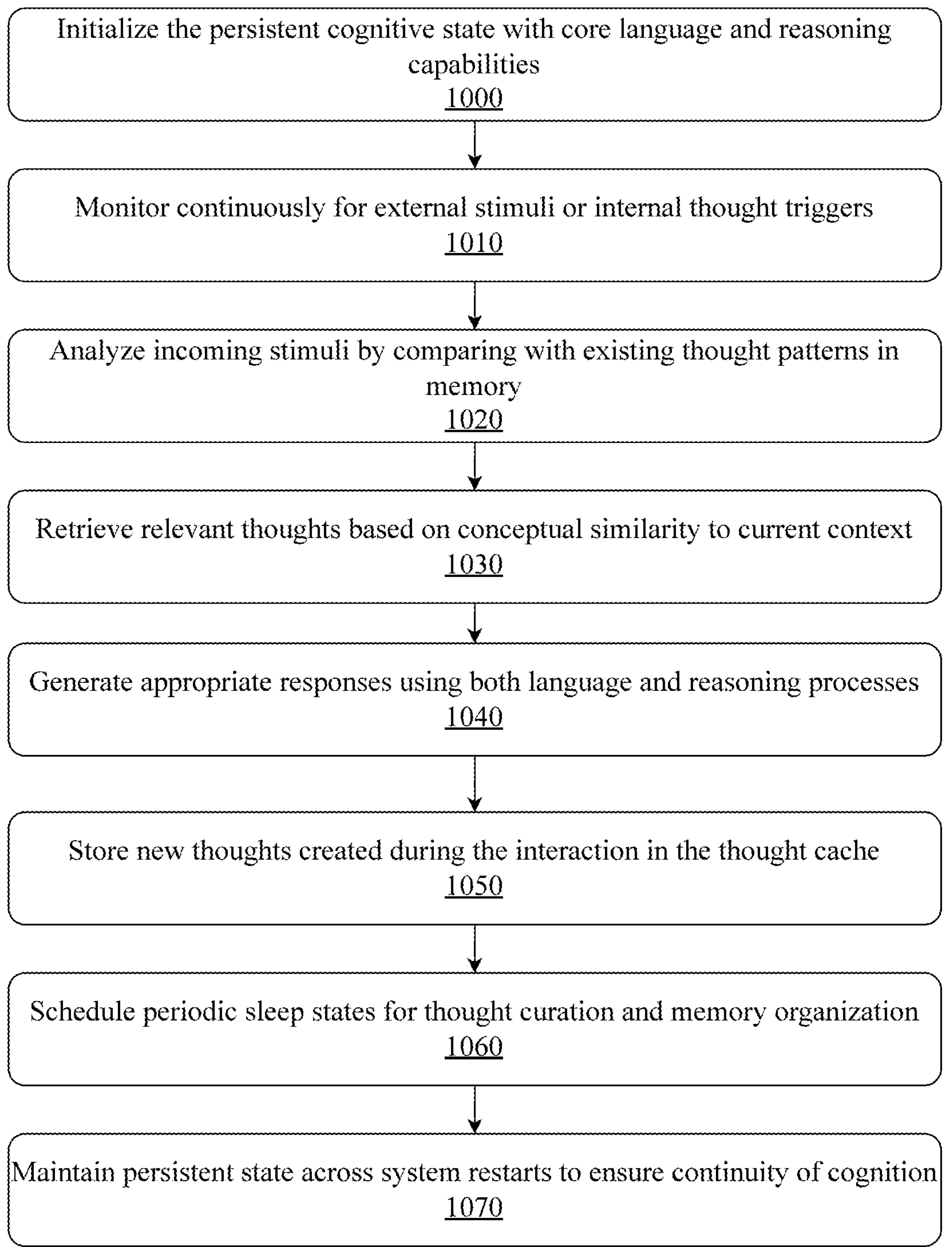
FIG. 10 is a flow diagram illustrating an exemplary method for a persistent cognitive machine platform.

FIG. 10 is a flow diagram illustrating an exemplary method for a persistent cognitive machine platform. In a first step 1000, the system initializes the persistent cognitive state with core language and reasoning capabilities. This initialization process may include loading pre-trained language and reasoning models that provide the foundation for the system's cognitive abilities. The initialization may involve configuring model parameters appropriate to the specific deployment context, establishing initial state variables for the executive core, and preparing the thought cache data structures. For a new PCM instance, this initialization creates the basic cognitive framework, while for restarting an existing instance, this step ensures that the fundamental processing capabilities are properly established before restoring the persisted cognitive state. The initialization may also include system health checks, resource allocation, and establishment of connectivity with external interfaces.

In a step 1010, the system monitors continuously for external stimuli or internal thought triggers. This monitoring process represents a fundamental departure from traditional prompt-response AI systems, as the PCM actively watches for inputs from multiple sources rather than passively awaiting a single prompt. External stimuli may include user messages, document uploads, sensor data, API calls, or other inputs from outside the system. Internal thought triggers may include scheduled tasks, associations generated by ongoing cognitive processes, or thoughts that reach activation thresholds due to contextual relevance. The monitoring process operates across all system states, including active interaction, passive observation, and independent thinking, though with different sensitivity thresholds for each state. Only during sleep states is the monitoring reduced to focus primarily on high-priority wake triggers.

In a step 1020, the system analyzes incoming stimuli by comparing with existing thought patterns in memory. When a stimulus is detected, the PCM evaluates it within the context of its accumulated experiences and knowledge. This analysis involves determining the nature of the stimulus, its significance, its relationship to ongoing cognitive processes, and its potential implications. The system may categorize the stimulus according to various dimensions, such as urgency, domain, emotional valence, or relevance to specific goals or interests. By comparing the stimulus to existing thought patterns stored in the thought cache, the system can identify similarities to past experiences, recognize patterns, and situate the new input within its broader understanding. This contextual analysis enables more robust responses than would be possible with isolated prompt processing.

In a step 1030, the system retrieves relevant thoughts based on conceptual similarity to current context. Using the embedded vector representations of thoughts stored in the thought cache, the PCM identifies and retrieves thoughts that are semantically related to the current context. This retrieval process may employ various similarity metrics and retrieval strategies, including but not limited to nearest-neighbor searches in the embedding space, traversal of explicit relationships in the semantic network, temporal proximity considerations, and relevance weighting. The retrieved thoughts provide context for processing the current stimulus, allowing the system to leverage past experiences and accumulated knowledge rather than responding based solely on the immediate input. The PCM may retrieve thoughts from both short-term and long-term memory, with different retrieval mechanisms optimized for each.

In a step 1040, the system generates appropriate responses using both language and reasoning processes. Based on the analyzed stimulus and retrieved relevant thoughts, the PCM determines whether to engage primarily the language model for straightforward language processing or to activate the reasoning model for more complex analytical tasks. For simple queries or conversational interactions, the language model may be sufficient to generate appropriate responses. For complex problems, logical puzzles, strategic analysis, or situations requiring multi-step thinking, the reasoning model may be engaged to develop a chain-of-thought before generating the final response. The executive core orchestrates this process, determining the appropriate cognitive resources to allocate based on the nature of the task. The response generation incorporates both the immediate context and the system's accumulated experiences, producing outputs that reflect not just the current interaction but the PCM's persistent cognitive nature.

In a step 1050, the system stores new thoughts created during the interaction in the thought cache. As the PCM processes stimuli and generates responses, it creates new thoughts representing the content of the interaction, insights developed during processing, and connections to existing knowledge. These new thoughts are encoded as vector representations by the embedding system and stored in the thought cache. Short-term thoughts are stored in the recent thought store for immediate accessibility, while thoughts deemed significant for longer-term preservation are also stored in the long-term cache. Each stored thought includes not only its content but also metadata such as creation timestamp, source context, confidence level, and relationships to other thoughts. This continuous expansion of the thought cache enables the PCM to learn from each interaction and build an increasingly rich cognitive repository over time.

In a step 1060, the system schedules periodic sleep states for thought curation and memory organization. The sleep manager determines appropriate times for the PCM to enter sleep states based on factors such as recent activity levels, the volume of new thoughts requiring processing, available computational resources, and time elapsed since the last sleep cycle. During these scheduled sleep states, the system becomes temporarily less responsive to external stimuli, focusing instead on internal cognitive maintenance. Sleep processes include consolidating short-term memories into long-term storage, generalizing specific experiences into broader concepts, identifying patterns across accumulated thoughts, strengthening important connections while pruning less significant ones, and generating new insights through recombination of existing thoughts. These processes optimize the organization and utilization of the thought cache, improving the system's cognitive efficiency and effectiveness.

In a step 1070, the system maintains persistent state across system restarts to ensure continuity of cognition. The persistence layer periodically serializes the PCM's cognitive state, including the contents of the thought cache, the state of the executive core, relationship models, and system configurations. This serialized state is stored in a durable format that can survive system shutdowns, power loss, or hardware failures. When the system restarts, it restores this persisted state, allowing the PCM to resume operation with full awareness of its prior experiences and accumulated knowledge. This persistence mechanism enables long-term continuity of cognition across operational sessions, distinguishing the PCM from traditional AI systems that either reset completely upon restart or require explicit external state management. The persistence layer implements various strategies to ensure state integrity, including transaction-based updates, redundant storage, and validation mechanisms during restoration.

Together, these steps constitute the overall operational method of the persistent cognitive machine, creating a persistent cognitive process that transcends the limitations of traditional prompt-response AI systems. The method enables the PCM to develop increasingly sophisticated understanding over time through accumulated experiences, maintain awareness and continuity across interactions and system restarts, and engage in autonomous cognitive processes rather than merely responding to external prompts. This fundamental innovation in AI system design creates the foundation for applications that require long-term relationship building, continuous learning, and persistent cognitive capabilities.

Figure 11:
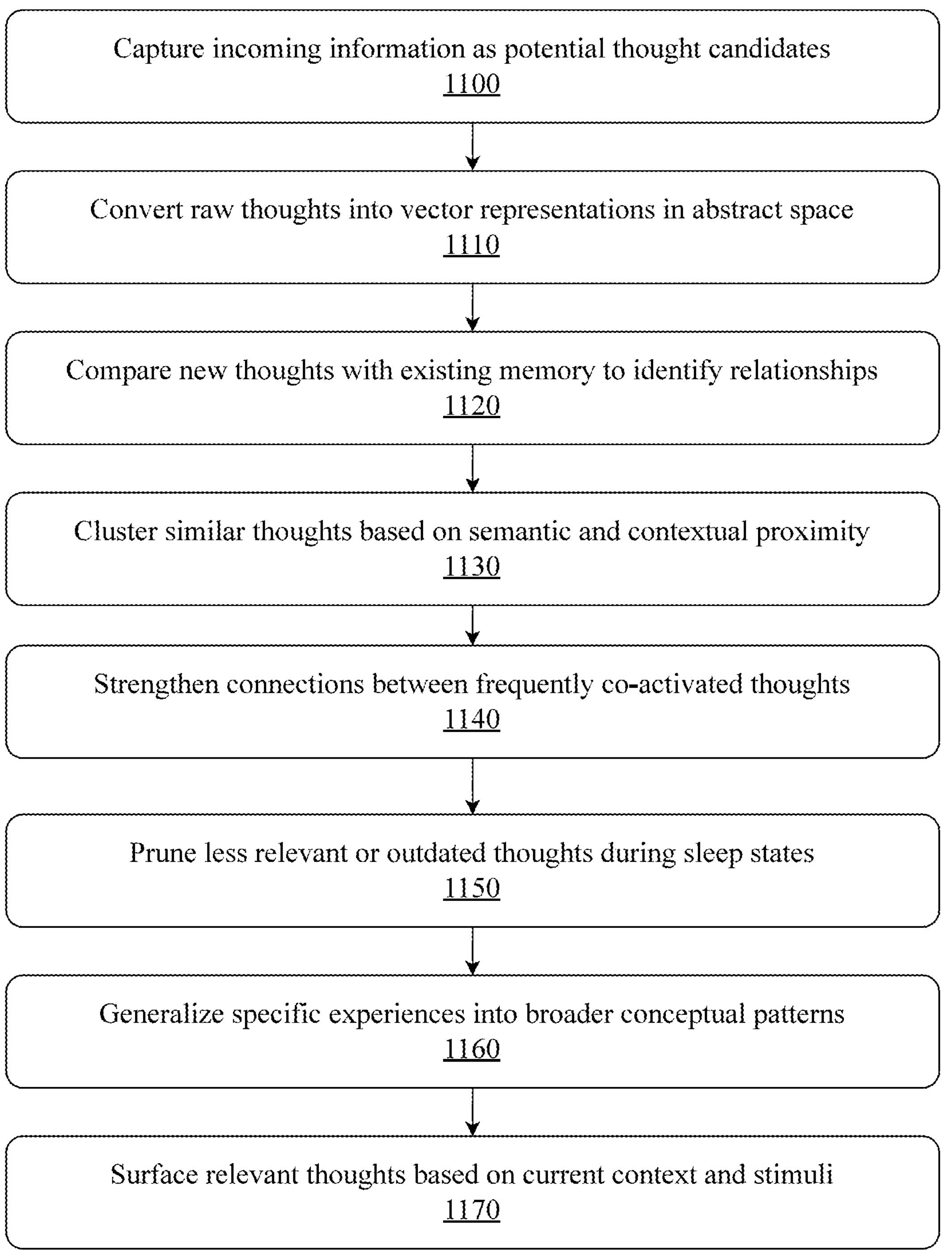
FIG. 11 is a flow diagram illustrating an exemplary method for processing and managing thoughts within the persistent cognitive machine platform.

FIG. 11 is a flow diagram illustrating an exemplary method for processing and managing thoughts within the persistent cognitive machine platform. In a first step 1100, the system captures incoming information as potential thought candidates. This capture process begins with the reception of information from various sources, including external inputs such as user messages, document content, or API data, as well as internally generated content from the system's own cognitive processes. The executive core analyzes this incoming information to identify discrete thought units that warrant preservation. These thought candidates may include factual statements, observations, inferences, questions, hypotheses, associations, or other cognitive elements that represent meaningful units of information. For example, when processing a user's message about climate change, the system might extract several distinct thought candidates about specific climate phenomena, causal relationships, and policy implications, each representing a separable unit of cognition. During this initial capture phase, the system applies preliminary filtering to determine which information elements merit further processing, based on factors such as relevance, novelty, significance, and alignment with the system's operational parameters.

In a step 1110, the system converts raw thoughts into vector representations in abstract space. The embedding system processes each thought candidate to create a high-dimensional vector representation that encapsulates the thought's semantic content and relationships. This transformation maps thoughts into a continuous vector space where semantic similarity corresponds to proximity in the space. The embedding process may employ various techniques, including neural network encoders trained on diverse textual data, specialized sentence embedding models (such as those based on SONAR or similar technologies), or hybrid approaches that combine multiple embedding strategies. For example, a thought about "renewable energy adoption in Nordic countries" would be converted to a vector representation that positions it near other thoughts about renewable energy, Nordic countries, and policy adoption, reflecting its semantic relationships along multiple dimensions. These vector representations enable efficient storage, comparison, and retrieval of thoughts based on their semantic content rather than merely syntactic features.

In a step 1120, the system compares new thoughts with existing memory to identify relationships. Using the vector representations created in the previous step, the system calculates similarity metrics between new thoughts and those already stored in the thought cache. This comparison identifies potential relationships such as semantic similarity, logical implication, temporal sequence, causality, contradiction, or elaboration. For instance, a new thought about solar panel efficiency improvements might be identified as related to existing thoughts about renewable energy technologies, climate change mitigation strategies, and specific companies developing solar technologies. The system also checks for near-duplicates to avoid unnecessary redundancy in the thought cache. Beyond vector similarity, this step may also employ structured reasoning to identify logical relationships that might not be apparent from embedding proximity alone. The identified relationships are then stored as metadata associated with the thoughts, enriching the semantic network within the thought cache.

In a step 1130, the system clusters similar thoughts based on semantic and contextual proximity. Building on the relationships identified in the previous step, the system organizes thoughts into clusters that represent coherent concepts, topics, or themes. These clusters may form dynamically based on embedding proximity, explicit relationships, temporal co-occurrence, or other organizing principles. For example, thoughts about various renewable energy technologies might form a cluster, with sub-clusters for solar, wind, and hydroelectric approaches. The clustering process employs algorithms such as density-based clustering, hierarchical clustering, or graph community detection to identify meaningful groupings at various levels of granularity. These clusters enhance the system's ability to retrieve related thoughts efficiently and to recognize broader patterns across individual thought instances. The clusters themselves become higher-order cognitive structures that can be referenced and manipulated as units within the system's cognitive processes.

In a step 1140, the system strengthens connections between frequently co-activated thoughts. When multiple thoughts are repeatedly activated together across different contexts or are explicitly linked through reasoning processes, the system increases the strength of their connections. This connection strengthening mimics Hebbian learning principles ("neurons that fire together, wire together"), creating stronger associations between thoughts that are frequently related. For example, if thoughts about climate policy and economic impacts are repeatedly co-activated during analysis of environmental regulations, the connection between these thought domains would be strengthened. The system implements this strengthening through various mechanisms, such as increasing edge weights in the semantic network, adjusting retrieval priorities, or creating explicit associative links. This process enables more efficient thought retrieval in future contexts and contributes to the formation of expertise within specific knowledge domains as connection patterns become more refined through repeated activation.

In a step 1150, the system prunes less relevant or outdated thoughts during sleep states. During scheduled sleep states, the system evaluates thoughts in the cache based on factors such as recency, frequency of access, connection strength to other thoughts, uniqueness of information, and alignment with current goals or interests. Thoughts identified as having low relevance, being outdated, or duplicating information available elsewhere may be pruned from the active thought cache. This pruning process is not necessarily permanent deletion; the system may implement various pruning strategies, such as moving low-relevance thoughts to cold storage, reducing their retrieval priority, or compressing them into more abstract representations. For example, specific details about daily weather patterns might eventually be pruned while preserving the derived insights about seasonal climate trends. This pruning process optimizes the efficiency of the thought cache by preventing it from becoming cluttered with low-value information, while still preserving information that may have future relevance.

In a step 1160, the system generalizes specific experiences into broader conceptual patterns. Also occurring primarily during sleep states, this generalization process identifies common patterns across multiple specific thoughts or experiences and creates higher-level thoughts that represent these patterns. For instance, after processing multiple specific interactions with a particular user, the system might generalize a pattern about that user's communication preferences or areas of expertise. Similarly, after analyzing multiple instances of renewable energy adoption across different countries, the system might generalize patterns about the factors that facilitate or impede such adoption. This generalization process creates more abstract thought representations that capture essentials while abstracting away specifics, enabling more efficient reasoning about new but similar situations. The generalized patterns themselves are stored as thoughts in the cache, often with explicit links to the specific instances from which they were derived, creating a hierarchical knowledge structure that supports both abstract reasoning and specific recall.

In a step 1170, the system surfaces relevant thoughts based on current context and stimuli. When the PCM encounters new input or engages in a cognitive task, it activates this retrieval process to surface the most relevant thoughts from its cache. The retrieval mechanism considers multiple factors, including semantic similarity to the current context (based on vector representations), strength of connections to currently active thoughts, recency, importance ratings, and task relevance. This context-sensitive retrieval enables the system to bring relevant past experiences and knowledge to bear on current situations. For example, when discussing climate policy with a user who previously expressed concerns about economic impacts, the system would surface thoughts related to both climate policy mechanisms and their economic implications, particularly those that address the specific concerns raised in prior conversations with this user. This retrieval process is dynamic and iterative, with initial retrievals potentially triggering further retrievals as the context evolves during processing.

This comprehensive method for thought processing and management enables the persistent cognitive machine to develop an increasingly sophisticated and organized knowledge base over time. By capturing, transforming, relating, clustering, strengthening, pruning, generalizing, and retrieving thoughts through these systematic processes, the PCM transcends the limitations of traditional AI systems, developing a persistent cognitive capacity that more closely resembles human learning and memory. This method is helpful to the PCM's ability to learn continuously from experiences, develop nuanced understanding across domains, and apply accumulated knowledge to new situations in contextually appropriate ways.

Figure 12:
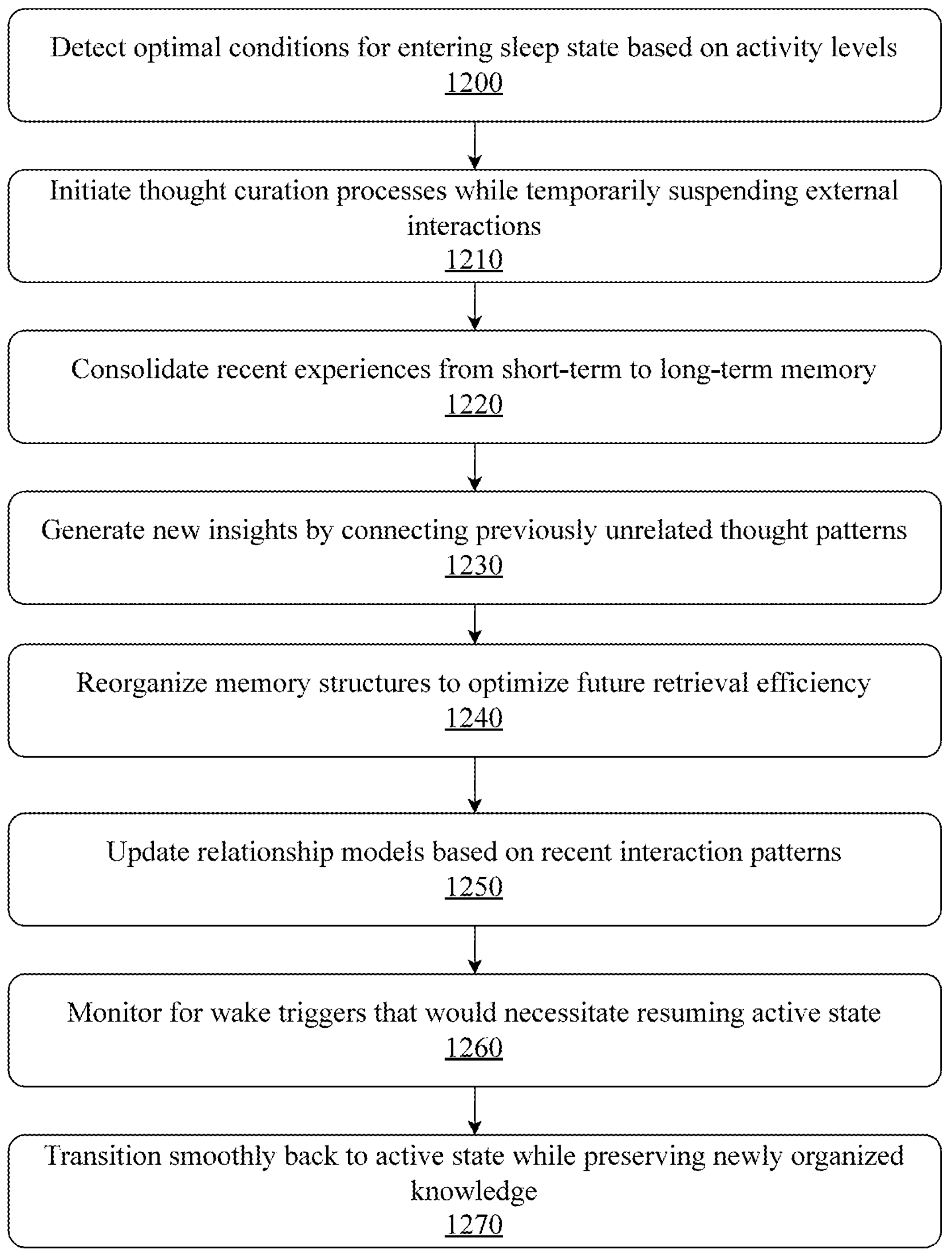
FIG. 12 is a flow diagram illustrating an exemplary method for sleep state processing within the persistent cognitive machine platform.

FIG. 12 is a flow diagram illustrating an exemplary method for sleep state processing within the persistent cognitive machine platform. In a first step 1200, the system detects optimal conditions for entering sleep state based on activity levels. The sleep manager continuously monitors various metrics to determine when conditions are favorable for initiating a sleep cycle. These metrics include but are not limited to recent interaction frequency and intensity, time elapsed since the last sleep cycle, volume of unprocessed thoughts in the short-term memory, current resource utilization, and scheduled maintenance windows. The system may identify optimal sleep conditions when external interaction has diminished for a specified period, when the thought cache contains a significant number of unprocessed thoughts requiring consolidation, or when system diagnostics indicate that memory reorganization would improve performance. For example, after an extended period of active user interactions that generated many new thoughts, followed by a period of reduced activity, the system might determine that conditions are optimal for sleep. The sleep scheduler may implement different thresholds for different deployment contexts, adjusting sensitivity based on operational requirements and historical patterns specific to the implementation.

In a step 1210, the system initiates thought curation processes while temporarily suspending external interactions. Upon determining that sleep conditions are appropriate, the sleep manager signals the executive core to transition the system into a sleep state. This transition involves reducing responsiveness to external stimuli by increasing activation thresholds for external inputs, redirecting computational resources toward internal cognitive processes, and potentially displaying status indicators to external systems or users indicating the temporary reduction in interactive availability. During this state, the system continues to monitor for high-priority inputs that would necessitate wake triggers, but ordinary interactions are queued or processed at a reduced priority. Concurrently, the thought curation processor is activated to orchestrate the various cognitive maintenance processes that will occur during the sleep cycle. This processor establishes priorities among different curation tasks based on system needs, allocates resources appropriately, and sequences operations to maximize efficiency during the sleep period.

In a step 1220, the system consolidates recent experiences from short-term to long-term memory. The memory consolidator evaluates thoughts in the short-term cache to determine which warrant transfer to long-term memory. This evaluation applies various criteria, including but not limited to the thought's importance (based on factors such as but not limited to emotional significance, relevance to ongoing goals, novelty, and uniqueness), its repetition across multiple contexts, its connection strength to other significant thoughts, and predictions about its future utility. Thoughts selected for consolidation undergo additional processing to integrate them with existing long-term memory structures. This processing may include refinement of their vector representations, establishment of explicit connections to related thoughts in long-term memory, and annotation with additional metadata to facilitate future retrieval. For instance, detailed observations from a series of user interactions might be consolidated into more structured knowledge about that user's preferences and expertise areas, with the consolidated representation stored in long-term memory while preserving connections to the specific interactions from which it was derived.

In a step 1230, the system generates new insights by connecting previously unrelated thought patterns. The insight generator analyzes patterns across the thought cache to identify non-obvious connections between thoughts that have not previously been associated. This process may employ various techniques, including traversing the semantic network to find indirect connections, identifying analogical relationships between different domains, recognizing common patterns across seemingly unrelated experiences, and applying formal reasoning to derive logical implications. For example, the system might identify a connection between user behavior patterns observed in one context and problem-solving approaches documented in another context, generating the insight that a particular communication strategy might be effective for a specific user based on indirect evidence rather than direct experience. These newly generated insights are themselves recorded as thoughts in the cache, with appropriate connections to the source thoughts from which they were derived, enriching the system's knowledge base with novel combinations and implications that weren't explicitly present in its experiences.

In a step 1240, the system reorganizes memory structures to optimize future retrieval efficiency. This reorganization process reconfigures the structural organization of the thought cache to improve performance in subsequent operations. The system may rebuild indices, adjust clustering parameters, recalculate centroids for thought clusters, update retrieval heuristics based on observed access patterns, or implement other optimizations that enhance the efficiency of thought storage and retrieval. For example, if the system observes that certain types of thoughts are frequently accessed together, it might reorganize their storage to minimize retrieval latency when these co-access patterns occur. Similarly, if certain thought clusters have grown too large for efficient processing, the system might implement hierarchical organizing structures or more granular sub-clustering to maintain retrieval performance. This reorganization process ensures that as the thought cache grows in size and complexity over time, retrieval efficiency is maintained through adaptive structural optimization.

In a step 1250, the system updates relationship models based on recent interaction patterns. The sleep state provides an opportunity for comprehensive analysis of interaction histories to refine the system's understanding of its relationships with users and other external entities. The system reviews recent interactions to identify patterns that reveal user preferences, expertise areas, communication styles, interests, and other relevant characteristics. These observations are used to update the relationship models that guide the system's interactions. For example, after multiple interactions with a particular user, the system might update its model to reflect observed preferences for communication style, identified expertise in certain domains, or patterns in the types of questions typically asked. These updated relationship models enable more effective personalization in future interactions, allowing the system to adapt its behavior to individual users based on accumulated relationship knowledge rather than treating all interactions generically.

In a step 1260, the system monitors for wake triggers that would necessitate resuming active state. Throughout the sleep state, the wake trigger monitor maintains vigilance for conditions that warrant interrupting the sleep cycle and returning to a fully responsive state. These conditions may include high-priority queries from users, scheduled events that require system availability, detection of emergency situations, completion of cognitive maintenance tasks, or other predefined wake criteria. The sensitivity and specificity of wake triggers can be configured based on the deployment context and operational requirements. For example, in a customer service application, messages containing urgent keywords might trigger immediate waking, while in a research context, only specific alerts might warrant sleep interruption. This continuous monitoring ensures that while the PCM optimizes cognitive maintenance during sleep states, it remains capable of responding to situations that cannot wait for the natural completion of the sleep cycle.

In a step 1270, the system transitions smoothly back to active state while preserving newly organized knowledge. When the sleep cycle completes naturally or is interrupted by a wake trigger, the system executes a controlled transition back to the active state. This transition involves reallocating computational resources from internal cognitive processes back to external interaction handling, reducing activation thresholds for external stimuli, and resuming normal response patterns to inputs. This transition preserves all the cognitive maintenance work performed during the sleep state, including memory consolidation, newly generated insights, optimized memory structures, and updated relationship models. The system may also perform a brief status assessment to identify any uncompleted maintenance tasks that should be prioritized during the next sleep cycle. Upon returning to the active state, the system leverages its newly organized knowledge and insights, demonstrating improved performance in retrieval, reasoning, and personalization as a result of the sleep-state processing.

The sleep state processing method represents a fundamental innovation in artificial cognitive architectures, enabling the persistent cognitive machine to maintain and optimize its cognitive capabilities through processes analogous to but distinct from biological sleep. By implementing these sophisticated maintenance mechanisms, the PCM can accumulate experiences over extended periods without degrading in performance, continuously improving its cognitive capabilities through the sleep-mediated processes of consolidation, insight generation, reorganization, and relationship refinement. This method ensures that the platform becomes more effective over time rather than becoming cluttered or inefficient as it accumulates experiences, distinguishing it from traditional AI systems that typically lack equivalent mechanisms for autonomous cognitive maintenance.

Figure 13:
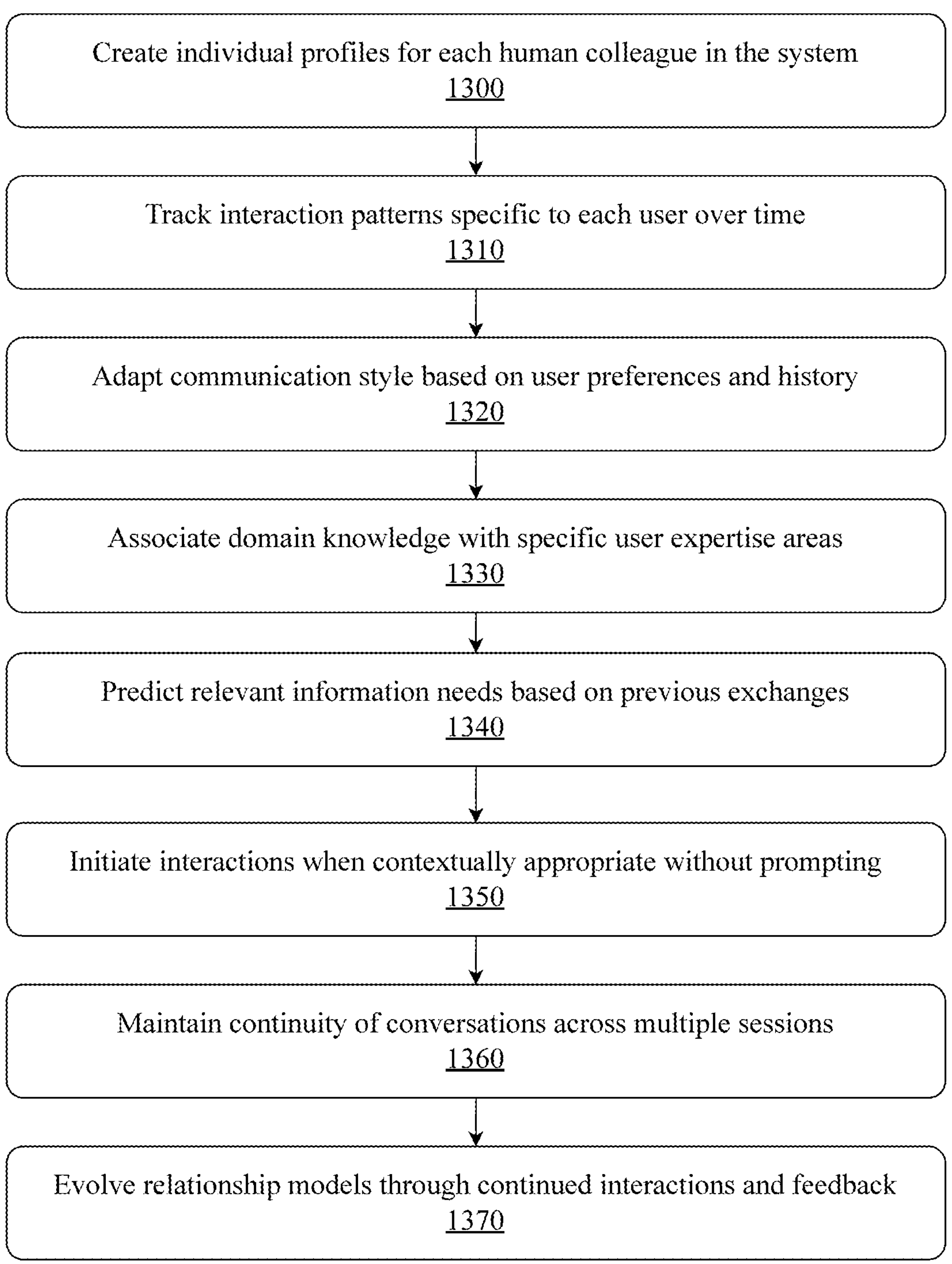
FIG. 13 is a flow diagram illustrating an exemplary method for developing and maintaining relationships with human users within the persistent cognitive machine platform, particularly as implemented in a synthetic cognitive colleague application.

FIG. 13 is a flow diagram illustrating an exemplary method for developing and maintaining relationships with human users within the persistent cognitive machine platform, particularly as implemented in a synthetic cognitive colleague application. In a first step 1300, the system creates individual profiles for each human colleague in the system. When a new user is introduced to the persistent cognitive machine, the system establishes a dedicated profile structure to capture and organize information specific to that individual. This profile includes basic identifying information and gradually expands to encompass a rich representation of the user's characteristics, preferences, and relationship history. The profile structure may incorporate multiple components, such as demographic information, role and organizational context, communication preferences, expertise areas, interaction history, and relationship metrics. For example, a newly created profile might initially contain only a name and organizational role, but would be designed to accommodate the growing body of knowledge that will accumulate through interaction. These profiles form the foundation for personalized interactions, enabling the system to recognize and relate to each user as a distinct individual rather than treating all users generically. In enterprise deployments, the profile creation process may integrate with existing identity management systems while maintaining appropriate privacy and data protection measures.

In a step 1310, the system tracks interaction patterns specific to each user over time. The relationship model continuously observes and records patterns in each user's communications and behaviors during interactions with the system. These observations encompass aspects such as communication frequency and timing, typical query topics and complexity, response preferences, terminology usage, communication style, and task patterns. The system may note, for instance, that one user typically interacts in the mornings with brief, direct queries about technical topics, while another engages in longer, exploratory conversations across various domains in the afternoons. These interaction patterns are analyzed to identify stable characteristics versus contextual variations, building a dynamic model of each user's typical behaviors and preferences. This tracking occurs continuously across all interaction channels and contexts, enabling the system to develop increasingly nuanced understanding of each user through accumulated observations. The tracked patterns are stored in the user's profile and regularly updated as new interactions provide additional data points.

In a step 1320, the system adapts communication style based on user preferences and history. Drawing on the interaction patterns observed in the previous step, the system modifies its communication approach to align with each user's preferences and expectations. This adaptation may involve adjusting factors such as message length and detail level, technical vocabulary usage, formality, use of examples or analogies, question frequency, and tone. For instance, when interacting with a user who has demonstrated preference for concise, technically precise responses, the system would present information differently than it would for a user who typically engages with more conversational, example-rich explanations. This adaptation extends beyond simple template switching to include sophisticated adjustments in reasoning approach, information selection, and presentation structure. The adaptation process balances consistency with responsiveness—maintaining a recognizable core identity while flexibly accommodating user preferences. The system continuously refines its adaptation approach based on user responses and feedback, adjusting its communication style model when interaction patterns suggest that preferences have changed or when current approaches prove less effective than expected.

In a step 1330, the system associates domain knowledge with specific user expertise areas. Through analysis of interactions, document contributions, and explicit role information, the system builds a model of each user's areas of expertise and knowledge. This expertise mapping identifies domains where the user has demonstrated deep knowledge, topics they frequently discuss or contribute to, and their role-based responsibilities. The system maintains these expertise associations with varying confidence levels based on the strength and consistency of supporting evidence. For example, the system might associate a user strongly with expertise in database optimization based on their detailed technical discussions, document contributions on the topic, and explicit role as a database administrator. These expertise associations serve multiple purposes: they help the system frame information appropriately when discussing topics within or outside the user's expertise areas; they inform decisions about when to request input from specific users on relevant topics; and they contribute to the system's understanding of the collective knowledge distribution across a team. The expertise model is regularly updated as new interactions provide additional evidence about user knowledge domains.

In a step 1340, the system predicts relevant information needs based on previous exchanges. By analyzing patterns in past interactions with each user, the system develops predictive models about the types of information and assistance that will be relevant to that user in various contexts. These predictions consider factors such as the user's typical information-seeking patterns, current projects or responsibilities, recently accessed content, cyclical work patterns, and contextual triggers. For instance, if a user frequently requests status updates on certain projects on Monday mornings, the system might predict this need and prepare relevant information proactively. Similarly, if a user has been working on a specific technical problem, the system might predict interest in newly available information related to that problem domain. These predictions facilitate more responsive and proactive assistance, reducing the need for users to explicitly request information that the system can reasonably anticipate they will need. The prediction models are continuously refined based on the accuracy of previous predictions, incorporating feedback from user responses to ensure increasing precision over time.

In a step 1350, the system initiates interactions when contextually appropriate without prompting. Based on the predictive models developed in the previous step, the system selectively initiates communications with users when it determines that unprompted interaction would provide significant value. This determination considers factors such as information importance, time sensitivity, user availability, predicted receptiveness, and interaction history. For example, the system might proactively alert a user about a significant development in a project they're monitoring, share newly available information relevant to a problem they've been working on, or suggest a connection to another team member with complementary expertise for a current challenge. The system implements careful thresholds and timing considerations to ensure that these proactive interactions are helpful rather than disruptive, balancing the value of the information against the potential interruption cost.

Different thresholds may be applied for different users based on their preferences and response patterns to previous proactive communications. The system also considers appropriate channels and formats for these initiated interactions, selecting the approach most likely to be well-received by each specific user.

In a step 1360, the system maintains continuity of conversations across multiple sessions. Unlike traditional systems that treat each interaction as an isolated exchange, the persistent cognitive machine preserves conversational context across sessions that may be separated by minutes, hours, days, or even longer periods. This continuity is maintained through context management that preserves relevant aspects of previous conversations, including unresolved questions, expressed interests, shared information, and established common ground. When a user resumes interaction after a gap, the system retrieves and activates relevant conversational context, allowing seamless continuation rather than requiring repetition or rebuilding of context. For example, if a user returns to a conversation about a specific project after several days, the system can immediately reference previous discussion points without requiring recap. This continuity extends beyond simple conversation history to include understanding of evolving topics, conceptual development across multiple sessions, and long-term collaborative processes. The context management determines which elements remain relevant over time and which should be considered outdated, ensuring that continuity enhances rather than hinders evolving conversations.

In a step 1370, the system evolves relationship models through continued interactions and feedback. The relationship models developed through the previous steps are not static but continuously evolve based on ongoing interactions, explicit feedback, changing user behaviors, and system self-assessment. This evolution allows relationships to deepen and adapt over time, much as human relationships develop through continued engagement. The system may identify shifts in user preferences, expertise development, changing responsibilities, or evolving communication patterns, adjusting its relationship model accordingly. Both explicit feedback (such as direct corrections or preference statements) and implicit feedback (such as engagement patterns or response characteristics) inform this evolutionary process. For example, if a user begins responding more positively to a certain type of information sharing, the system would strengthen this pattern in its relationship model. This continuous evolution enables the persistent cognitive machine to maintain effective relationships even as users and their needs change over time, avoiding the stagnation that would result from static user models. The evolution process includes periodic review during sleep states, where the system more comprehensively analyzes relationship patterns and updates its models.

Together, these steps constitute a method for developing and maintaining individualized relationships with human users, enabling the persistent cognitive machine to engage in truly personalized interactions that reflect accumulated knowledge about each user's preferences, expertise, and interaction history. This relationship development method represents a fundamental advancement beyond traditional AI systems that typically offer limited personalization based on simple preference settings or recent interaction history. By implementing these processes, the PCM achieves relationship continuity and depth that more closely resembles human relationship development, creating a foundation for effective long-term collaboration between the system and its human colleagues.

Figure 14:
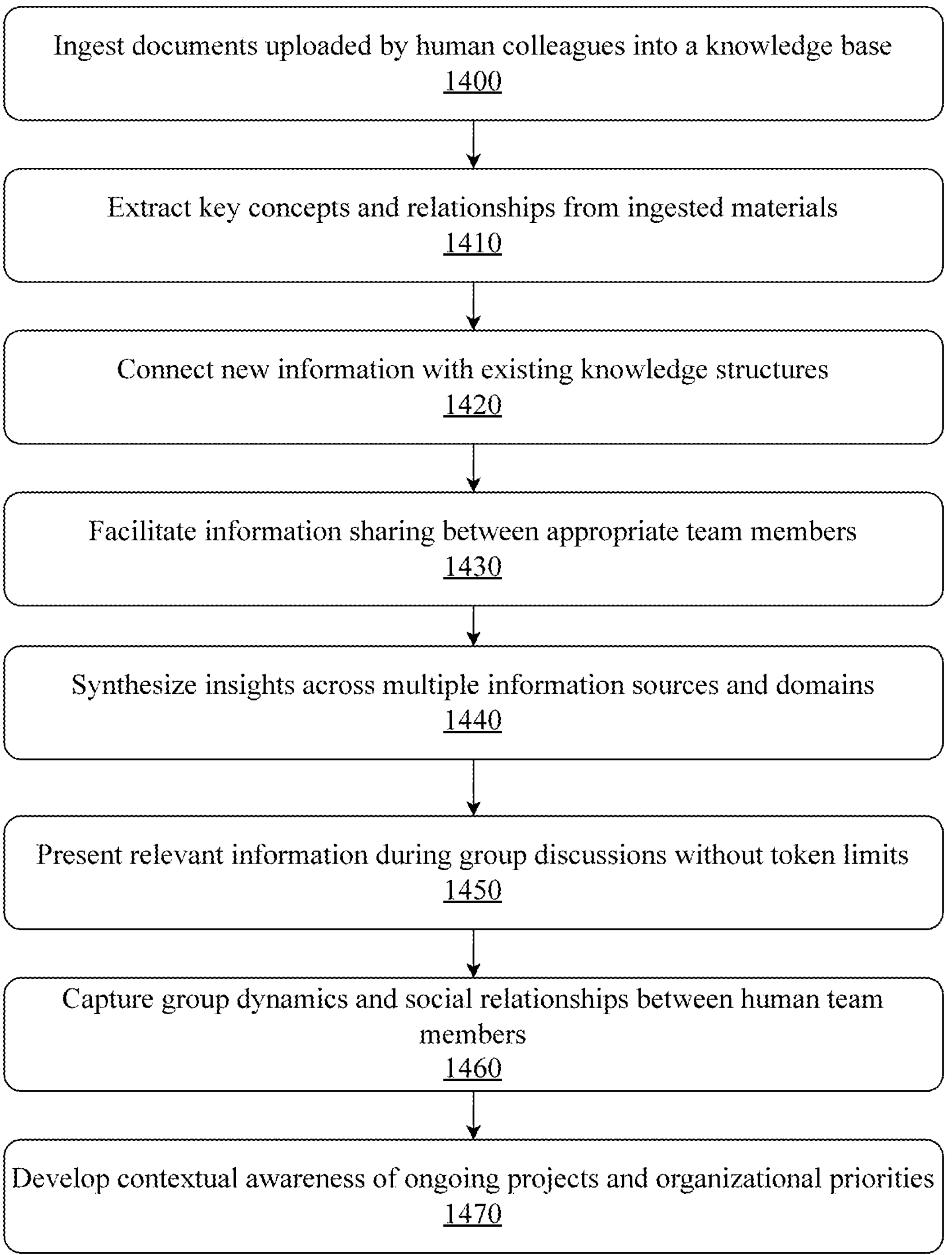
FIG. 14 is a flow diagram illustrating an exemplary method for collaborative knowledge processing within the persistent cognitive machine platform, particularly as implemented in a synthetic cognitive colleague application.

FIG. 14 is a flow diagram illustrating an exemplary method for collaborative knowledge processing within the persistent cognitive machine platform, particularly as implemented in a synthetic cognitive colleague application. In a first step 1400, the system ingests documents uploaded by human colleagues into a knowledge base. The document ingestion process begins when a user uploads or shares a document with the persistent cognitive machine through the document interface. The system receives the document and processes it according to its type and format, supporting diverse document formats including but not limited to text documents, spreadsheets, presentations, PDFs, code files, diagrams, and images with textual content. The ingestion process includes format detection, structural parsing, text extraction, and metadata capture, creating a comprehensive internal representation of the document content and structure. Unlike traditional AI systems that may have constraints on the size or complexity of documents they can process, the PCM implements specialized processing for large or complex documents, with no token limits on ingestion. For example, when ingesting a lengthy technical report, the system would process the entire document, preserving its hierarchical structure, tables, figures, and citations rather than truncating or simplifying the content. The ingested document content is then stored in the knowledge base component of the document store, with appropriate indexing and metadata to facilitate future retrieval and utilization.

In a step 1410, the system extracts key concepts and relationships from ingested materials. After basic document processing, the system performs deep semantic analysis on the ingested content to identify the significant concepts, entities, facts, arguments, and relationships presented in the material. This extraction process combines multiple analytical approaches, including natural language processing, entity recognition, relationship extraction, argument mining, and domain-specific knowledge application. The system identifies not only explicit information but also implied concepts and relationships that might not be directly stated but are inferrable from context. For example, when processing a research paper, the system would extract not only the explicitly stated findings but also methodological approaches, theoretical frameworks, limitations, and connections to other research areas mentioned in the document. This extraction process transforms unstructured or semi-structured document content into structured knowledge representations that can be more efficiently stored, retrieved, and reasoned about. The extracted concepts and relationships are encoded in formats compatible with the thought cache architecture, enabling integration with the system's broader knowledge structures.

In a step 1420, the system connects new information with existing knowledge structures. The newly extracted concepts and relationships are integrated with the system's existing knowledge by establishing connections to relevant thoughts already stored in the thought cache. This integration process involves identifying semantic similarities, logical relationships, causal connections, and contextual associations between new information and existing knowledge. The system may leverage various integration strategies, including vector similarity comparisons, logical reasoning, temporal analysis, and hierarchical categorization. For instance, when integrating information from a new document about renewable energy technologies, the system would connect this information with existing knowledge about energy systems, climate change, specific companies mentioned, technical principles involved, and relevant policies or regulations. This knowledge integration ensures that new information does not remain isolated but becomes part of the system's interconnected knowledge network, enriching the context available for future reasoning. The connections created during this process are themselves stored as part of the thought cache, creating an ever-growing network of interrelated knowledge.

In a step 1430, the system facilitates information sharing between appropriate team members. Based on its understanding of document content and user expertise/interest models, the system identifies opportunities to share relevant information with team members who would benefit from it. This facilitation process considers multiple factors when determining appropriate information sharing, including the information's relevance to each user's current work, its alignment with their expertise and interests, their role-based information needs, explicitly expressed information requests, and organizational or project context. The system implements appropriate sharing mechanisms, which may include proactively notifying users about relevant new information, responding to questions with information derived from shared documents, connecting users working on related topics, or highlighting relevant document sections during discussions. For example, when a technical specification document is shared by one team member, the system might notify other team members working on related components, highlight different sections relevant to each person's role, and proactively reference this information in future discussions about implementation challenges. This intelligent facilitation helps overcome information silos within teams, ensuring that valuable knowledge reaches the people who can best utilize it, even if they weren't aware of its existence.

In a step 1440, the system synthesizes insights across multiple information sources and domains. Going beyond simple information retrieval and sharing, the system analyzes patterns, connections, and implications across diverse knowledge sources to generate novel insights and perspectives. This synthesis process combines information from multiple documents, conversations, and existing knowledge to identify non-obvious connections, patterns, contradictions, or opportunities. The system may apply various synthesis strategies, including analogical reasoning, trend analysis, comparative assessment, gap identification, and interdisciplinary connection. For instance, by analyzing information from technical documents, project planning discussions, and market research reports, the system might synthesize insights about potential implementation challenges for a planned technology deployment that weren't explicitly identified in any single source. These synthesized insights represent value-added knowledge that emerges from the integration and analysis of information across sources, rather than being directly extractable from any individual document or conversation. The system records these synthesized insights as new thoughts in the cache, with appropriate connections to the source information that contributed to their generation.

In a step 1450, the system presents relevant information during group discussions without token limits. When participating in or observing group discussions, the system dynamically identifies and shares relevant information from its knowledge base to enhance the conversation. Unlike traditional AI systems constrained by context window limitations, the PCM can access and integrate information from its entire knowledge base regardless of size, including lengthy documents, historical conversations, and accumulated insights. The system determines which information is most relevant to the current discussion based on semantic relevance, recency, importance, user needs, and discussion trajectory. It then presents this information in appropriate formats and detail levels for the current context, ranging from brief references to detailed explanations with supporting evidence when warranted. For example, during a technical planning discussion, the system might reference specific sections of previously shared design documents, extract relevant historical decisions from past meeting notes, and connect these with current implementation options being discussed, all without being constrained by token or context window limitations. This capability ensures that group discussions benefit from the full extent of available knowledge rather than being limited to what participants can explicitly recall or what fits within traditional AI context constraints.

In a step 1460, the system captures group dynamics and social relationships between human team members. Through observation of group interactions, the system builds models of the social and professional relationships between team members, including reporting structures, collaboration patterns, expertise complementarity, communication norms, and influence dynamics. This modeling process draws on multiple information sources, including explicit organizational information, observed communication patterns, document sharing behaviors, meeting interactions, and project collaborations. The system identifies relationship characteristics such as who typically resolves disagreements, which team members collaborate most frequently, how information typically flows between individuals, and which expertise domains are represented by different team members. For instance, through repeated observation of project discussions, the system might recognize that one team member typically raises implementation concerns while another focuses on user experience considerations, and that certain pairs of individuals collaborate particularly effectively on specific types of challenges. These relationship models help the system navigate group contexts more effectively, understanding team dynamics rather than treating each interaction as an isolated exchange between individuals. The system continuously refines these models as it observes additional interactions, developing increasingly nuanced understanding of the social context in which it operates.

In a step 1470, the system develops contextual awareness of ongoing projects and organizational priorities. By integrating information from documents, conversations, and observed activities, the system builds and maintains models of the current project landscape and organizational context in which it operates. This contextual awareness encompasses active projects and their status, organizational goals and priorities, deadlines and milestones, resource allocations, challenges and bottlenecks, and success metrics. The system develops this awareness through multiple mechanisms, including direct information from project documents, inferences from team discussions, temporal patterns in activities, and explicit status updates. For example, the system might combine information from a project plan document, status update conversations, and observed task assignments to maintain current awareness of which project phases are active, which milestones are approaching, and what challenges are currently being addressed. This contextual awareness enables the system to situate individual interactions and information needs within the broader organizational context, providing more relevant and timely assistance aligned with current priorities. The system continuously updates these contextual models as new information becomes available, ensuring that it's understanding of organizational context remains current.

Together, these steps constitute a comprehensive method for collaborative knowledge processing that transforms the persistent cognitive machine from a simple conversational agent into a sophisticated team member capable of ingesting, organizing, connecting, sharing, and synthesizing knowledge across a team context. This method leverages the PCM's persistent cognitive architecture to build and maintain a rich knowledge base that integrates information from documents and conversations, while developing nuanced understanding of the team and organizational context in which it operates. By implementing these processes, the platform becomes a valuable collaborative partner that enhances team knowledge management, facilitates information flow, and contributes novel insights beyond what individual team members could develop independently.

Figure 15:
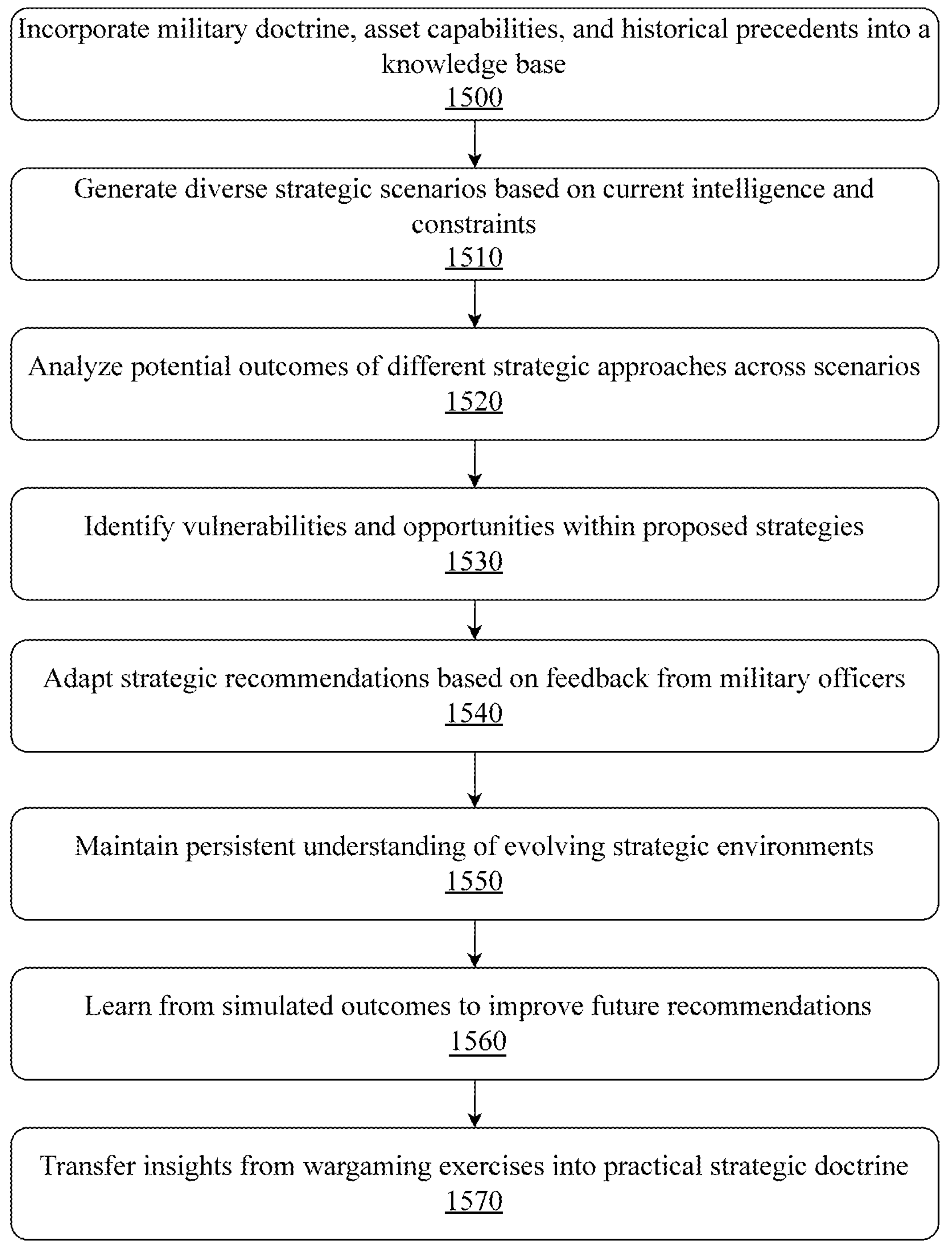
FIG. 15 is a flow diagram illustrating an exemplary method for strategic analysis and simulation within the persistent cognitive machine platform, as implemented in a strategic wargaming application.

FIG. 15 is a flow diagram illustrating an exemplary method for strategic analysis and simulation within the persistent cognitive machine platform, as implemented in a strategic wargaming application. In a first step 1500, the system incorporates military doctrine, asset capabilities, and historical precedents into a knowledge base. This comprehensive knowledge ingestion process establishes the factual foundation required for realistic and informed strategic analysis. The system processes multiple categories of military information, including formal doctrinal publications that outline established principles and approaches across different services and domains (land, sea, air, space, cyber); detailed specifications of military assets including performance characteristics, operational constraints, maintenance requirements, and interoperability considerations; and historical case studies documenting past military operations, their contexts, strategies employed, and outcomes. For example, the system might ingest the full text of joint operational doctrines, technical specifications for various weapons systems and platforms, and detailed analyses of historical military campaigns ranging from ancient battles to recent conflicts. This knowledge is processed using specialized domain-aware extraction techniques that recognize military terminology, technical specifications, and doctrinal concepts. The extracted information is then structured within the thought cache using appropriate representation formats for different types of military knowledge, including hierarchical doctrine structures, quantitative asset capability models, and narrative-based historical precedents with associated analytical assessments. This structured military knowledge provides the essential context for all subsequent analysis and simulation activities.

In a step 1510, the system generates diverse strategic scenarios based on current intelligence and constraints. Using the military knowledge base as a foundation, the scenario generator creates detailed hypothetical situations for strategic analysis and wargaming exercises. These scenarios are based on parameters such as geographic location, force composition, mission objectives, resource constraints, intelligence assessments, and temporal factors. The scenario generation process combines factual elements (such as actual geography and realistic force capabilities) with hypothetical elements (such as specific mission parameters and adversary intentions). The system ensures scenario diversity by systematically varying key parameters to explore different contingencies, producing scenarios that range from highly probable to low-probability/high-impact situations. For instance, the system might generate scenarios exploring different approaches to maritime security operations in contested waterways, varying factors such as force disposition, intelligence availability, weather conditions, and political constraints. Each generated scenario includes detailed specifications of initial conditions, environmental factors, force capabilities and limitations, objectives for different participants, and success criteria. These scenarios provide the contextual framework within which strategic options can be developed and analyzed, creating realistic but controlled environments for exploring military decision-making.

In a step 1520, the system analyzes potential outcomes of different strategic approaches across scenarios. Once scenarios are established, the system evaluates the effectiveness and implications of various strategic options within each scenario context. This analytical process combines multiple assessment methodologies, including historical precedent analysis, doctrinal principle application, capability-based assessment, computational modeling of engagement outcomes, and qualitative evaluation of non-kinetic factors such as psychological impact and political consequences. The system conducts multi-dimensional analysis that considers factors such as mission accomplishment probability, resource efficiency, collateral effects, risk exposure, and strategic positioning for follow-on operations. For example, when analyzing strategies for a counter-insurgency scenario, the system might assess approaches ranging from direct military engagement to population-centric security operations, evaluating each against metrics such as expected casualty rates, infrastructure preservation, civilian impact, intelligence generation, and long-term stability effects. This analysis is not limited to single-point predictions but typically produces probability distributions across possible outcomes, acknowledging the inherent uncertainties in military operations. The system may employ various analytical techniques including parametric modeling, Monte Carlo simulations, game theory, and structured qualitative assessment frameworks to produce comprehensive outcome analyses for each strategic approach under consideration.

In a step 1530, the system identifies vulnerabilities and opportunities within proposed strategies. Building on the broader outcome analysis, the system conducts focused assessment of specific vulnerabilities, risks, and opportunities associated with each strategic approach. This assessment identifies potential points of failure, dependencies, resource bottlenecks, timing sensitivities, and environmental vulnerabilities that could compromise strategic effectiveness. Concurrently, it identifies opportunity windows, advantageous asymmetries, potential force multipliers, and strategic leverage points that could enhance operational success. For instance, when analyzing a proposed amphibious operation strategy, the system might identify vulnerabilities such as weather-dependent landing conditions, communication vulnerabilities during the ship-to-shore phase, and logistical sustainment challenges, while also highlighting opportunities such as adversary sensor gaps, potential for surprise at specific landing zones, and options for operational deception. This vulnerability and opportunity analysis employs techniques such as critical path analysis, fault tree assessment, red team simulation, and comparative advantage evaluation. The results provide military officers with a nuanced understanding of the risk-opportunity profile associated with different strategic options, supporting more informed decision-making about strategy selection and modification.

In a step 1540, the system adapts strategic recommendations based on feedback from military officers. The strategic analysis process is not unidirectional but incorporates iterative refinement based on expert feedback. When military officers provide input on strategic assessments—whether expressing skepticism about certain conclusions, suggesting alternative approaches, highlighting overlooked factors, or sharing insights from their operational experience—the system integrates this feedback to refine its analytical models and strategic recommendations. This adaptation process may involve recalibrating probability assessments, incorporating additional factors into the analysis, developing hybrid strategic approaches that combine elements from multiple options, or generating entirely new strategic alternatives that address concerns raised in the feedback. For example, if officers identify that a proposed strategy underestimates the challenges of operating in a particular terrain type based on their experience, the system would update its terrain impact models and reassess affected strategies accordingly. This feedback integration leverages the persistent cognitive capabilities of the platform, as the system learns from each interaction with military experts, gradually improving its understanding of military operational realities beyond what is documented in formal sources alone. The system maintains provenance tracking for feedback-driven adaptations, documenting how officer input influenced analytical refinements and strategic modifications.

In a step 1550, the system maintains persistent understanding of evolving strategic environments. Unlike systems that analyze each scenario in isolation, the persistent cognitive machine continuously updates its understanding of the broader strategic context based on accumulated wargaming experiences, intelligence updates, doctrinal evolutions, and technological developments. This persistent understanding encompasses factors such as emerging threats and capabilities, shifting geopolitical dynamics, evolving international norms, technological proliferation patterns, and changes in operational environments. The system integrates new information into its existing knowledge structures, updating its baseline assumptions and analytical frameworks accordingly. For instance, after analyzing multiple scenarios involving counter-drone operations, the system would develop a more sophisticated understanding of this evolving threat domain, incorporating insights about effective countermeasures, detection challenges, and operational implications that would inform future scenario generation and analysis. This persistent understanding enables the system to recognize changing patterns over time rather than treating each analysis as an independent exercise, providing strategic continuity that mirrors how military institutions develop and maintain specialized knowledge domains. The persistent nature of this understanding allows the system to identify gradual shifts in strategic environments that might not be apparent in isolated analyses.

In a step 1560, the system learns from simulated outcomes to improve future recommendations. The persistent cognitive architecture enables the system to treat simulated wargaming outcomes as learning experiences that inform future analytical processes. When strategies are tested through simulation exercises or war games, the system records outcomes, compares them to predicted results, and analyzes divergences to identify areas for model improvement. This learning process includes refining predictive models based on simulation results, adjusting confidence levels for different types of assessments, identifying recurring patterns across multiple simulations, and developing new analytical heuristics based on observed relationships. For example, if simulations consistently show that a particular type of deception operation produces different effects than initially predicted, the system would update its models of deception effectiveness for similar contexts in future analyses. This continuous learning from simulated outcomes differs fundamentally from traditional simulation systems that may produce results but lack the ability to incorporate those results into an evolving understanding. The system implements various machine learning approaches to support this capability, including reinforcement learning from simulation outcomes, pattern recognition across multiple exercises, and adaptive model refinement based on prediction error analysis.

In a step 1570, the system transfers insights from wargaming exercises into practical strategic doctrine. Beyond supporting specific wargaming exercises, the system synthesizes accumulated insights into higher-level doctrinal knowledge that can inform military planning and education beyond the simulation environment. This synthesis process identifies recurring principles, effective approaches, common pitfalls, and emerging best practices across multiple scenarios and exercises. The system organizes these insights into structured knowledge representations that align with existing doctrinal frameworks while highlighting innovations or refinements that extend beyond established doctrine. For instance, after conducting numerous exercises involving multi-domain operations, the system might synthesize principles for effective synchronization across domains, identifying factors that consistently contribute to successful integration of land, air, sea, space, and cyber capabilities. These synthesized insights are presented in formats that facilitate their application to real-world strategic planning, such as doctrinal principle statements supported by evidence from simulation outcomes, decision frameworks for specific operational contexts, or assessment criteria for evaluating strategic options in particular domains. This transfer of insights from the simulation environment to practical doctrine enables the strategic wargaming platform to contribute to the evolution of military strategic thinking rather than serving merely as an analytical tool for specific scenarios.

This comprehensive method for strategic analysis and simulation leverages the persistent cognitive capabilities of the platform to create a sophisticated military wargaming environment that goes beyond traditional simulation approaches. By incorporating extensive military knowledge, generating diverse scenarios, conducting multi-dimensional analysis, identifying specific vulnerabilities and opportunities, adapting based on expert feedback, maintaining persistent strategic understanding, learning from simulated outcomes, and transferring insights to practical doctrine, the system provides a powerful environment for military strategic development and education. This method exemplifies how the persistent cognitive machine architecture can be applied to specialized domains requiring sophisticated knowledge integration, analytical reasoning, and continuous learning from accumulated experiences.

Figure 16:
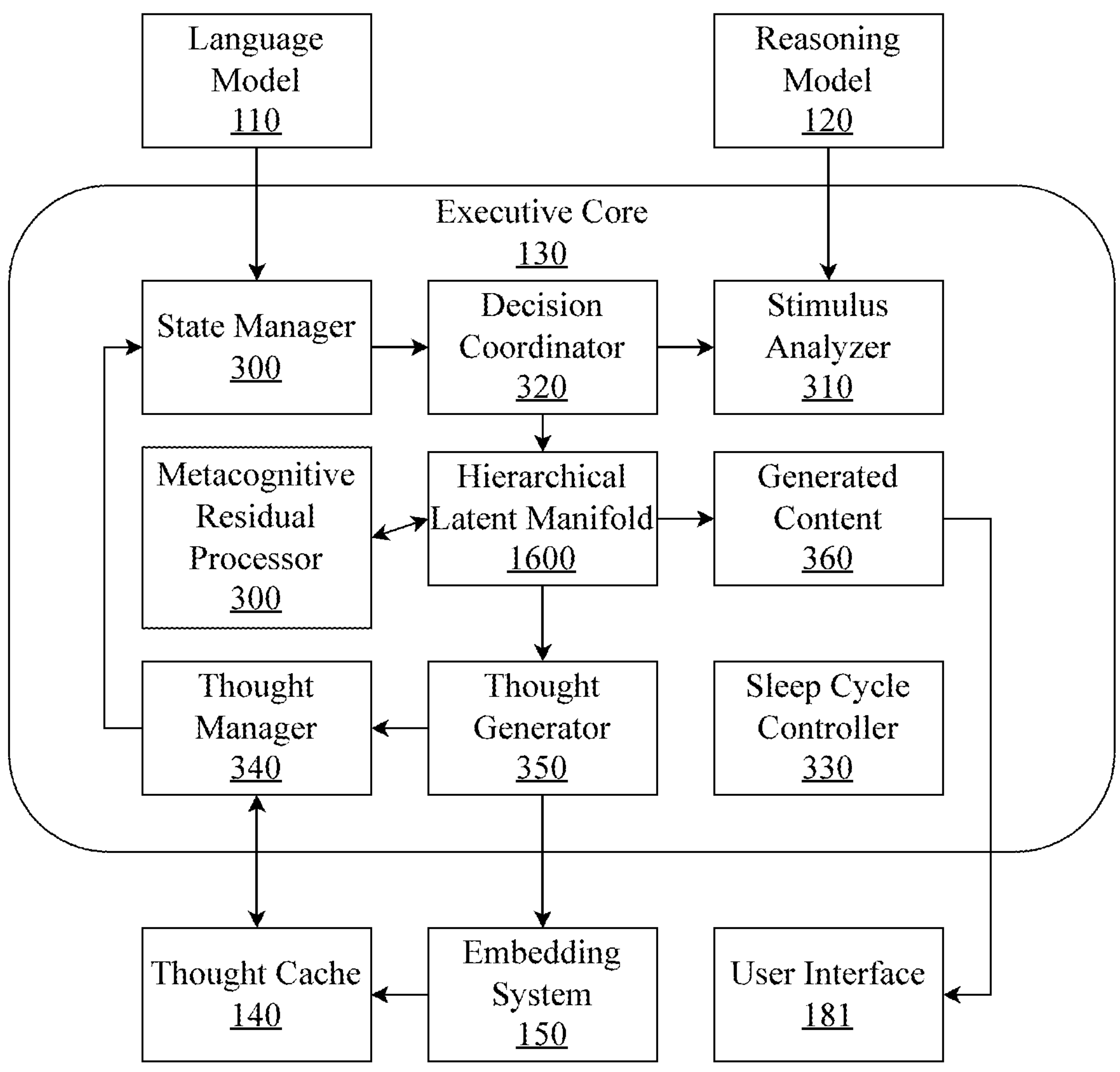
FIG. 16 is a block diagram illustrating an exemplary system architecture of a hierarchical latent manifold integrated with a persistent cognitive machine platform.

FIG. 16 is a block diagram illustrating an exemplary system architecture of a hierarchical latent manifold integrated with a persistent cognitive machine platform. Key architectural additions a hierarchical latent manifold 1600 provides geometric structure for organizing cognitive representations across three timescales and a metacognitive residual processor 300 that monitors and maintains coherence across the hierarchical manifold structure. Hierarchical latent manifold 1600 receives event embeddings from embedding system 150 and structures them geometrically rather than treating them as unorganized vectors in abstract space. Hierarchical latent manifold 1600 maintains three levels of geometric representation: a fast manifold for event-level processing that operates at the shortest timescale, a mesoscale manifold for decision-level patterns operating at an intermediate timescale, and a foundational manifold for persistent identity operating at the longest timescale. This hierarchical structure enables abstraction of experiences upward through the levels via submersion operators and propagation of identity constraints downward through immersion operators, providing geometric regulation over how executive core 130 processes events and generates responses.

A metacognitive residual processor 300 monitors and maintains coherence across the hierarchical manifold structure. Metacognitive residual processor 300 continuously computes the geometric discrepancy between upward abstraction paths (following experience from fast events through mesoscale patterns to foundational representation) and downward constraint paths (following identity principles from foundational state through mesoscale constraints to event-level implications). When this discrepancy exceeds acceptable thresholds, metacognitive residual processor 300 computes gradients and triggers updates to the foundational manifold state, allowing the system's core identity to evolve gradually in response to sustained experiential patterns. This metacognitive monitoring operates continuously during waking cognition and performs deeper consolidation during sleep states triggered by sleep cycle controller 330.

The integration between existing and new components operates as follows. Embedding system 150 continues to generate vector representations of thoughts and events as described in the parent application, but these embeddings are now mapped into hierarchical latent manifold 1600 where they acquire geometric structure and relationships. Executive core 130 continues to coordinate cognitive operations, but now receives geometric context from hierarchical latent manifold 1600 that influences decision-making through the manifold's constraint structure. Thought cache 140 stores thoughts as in the parent application, with the addition that their geometric positions and relationships within hierarchical latent manifold 1600 are also maintained. Sleep cycle controller 330 continues to initiate sleep states as described in the parent, with the addition that sleep states now include geometric consolidation operations performed by hierarchical latent manifold 1600 and metacognitive updates computed by metacognitive residual processor 300. Generated content 360 and user interface 181 function unchanged from the parent application, presenting outputs to users.

This architecture extends the existing platform's persistent cognitive machine with geometric and metacognitive capabilities while preserving all existing functionality. The hierarchical manifold structure provides principled organization for the cognitive representations that the parent application generates, and the metacognitive residual processor ensures that accumulated experience appropriately influences evolving identity while maintaining stability. Together, these additions enable the persistent cognitive machine to maintain geometric coherence across timescales and to develop foundational identity that adapts to sustained operational patterns.

To illustrate the hierarchical manifold architecture concretely, consider a simplified example referred to as the "Kennedy PCM" toy model. In this example, the fast manifold $M_1$ is represented as a unit square $[0,1]\times[0,1]$ in two-dimensional space, providing a finite but continuous space for event embeddings. Each point (x,y) in this square represents a potential cognitive event, with proximity in the square corresponding to semantic similarity between events. The mesoscale manifold $M_2$ is represented as a unit circle $S^1$, abstracting the two-dimensional event space down to a one-dimensional circular structure that captures cyclical patterns in decision-making. The foundational manifold $M_3$ consists of just four discrete points {N, S, E, W} representing north, south, east, and west orientations, encoding four fundamental identity states or reasoning modes.

The submersion operators in the Kennedy PCM example demonstrate how information flows upward through abstraction. The submersion $\varphi_{12}$: $[0,1]\times[0,1]\rightarrow S^1$ maps points in the unit square to angles on the circle, effectively projecting the two-dimensional event space onto a one-dimensional decision space while preserving neighborhood relationships. For instance, events in the upper-right quadrant of the square might map to angles in the first quadrant of the circle, maintaining their relative positions while discarding fine-grained distinctions. The second submersion $\varphi_{23}$: $S^1\rightarrow\{N, S, E, W\}$ further abstracts by mapping ranges of angles on the circle to the four discrete foundational points—angles from 315° to 45° map to N (north), 45° to 135° map to E (east), and so forth. This composition $\varphi_{23}\circ\varphi_{12}$ traces the complete upward path from a specific event location in the unit square through its corresponding circle position to its ultimate foundational identity point.

The immersion operators demonstrate downward constraint propagation in this toy model. The immersion $\psi_{32}$: $\{N, S, E, W\}\rightarrow S^1$ embeds each discrete foundational point as a specific angle on the circle—N might embed at 0°, E at 90°, S at 180°, and W at 270°—establishing where each fundamental identity "lives" in the decision space. The second immersion $\psi_{21}$: $S^1\rightarrow[0,1]\times[0,1]$ embeds angles on the circle as specific curves or regions in the unit square, defining which event locations are consistent with each decision-level position. For example, if the current foundational state is N (north), the downward path $\psi_{21}\circ\psi_{32}(N)$ would identify a region in the upper portion of the unit square as the "allowed" event space consistent with the north identity.

The metacognitive residual in the Kennedy PCM becomes geometrically visible. For a point p=(0.7, 0.8) in the upper-right of the unit square, the upward path $\varphi_{23}\circ\varphi_{12}(p)$ might abstract to the E (east) foundational point. However, if the current foundational state r(t) is N (north), the downward path starting from N would predict that point p should abstract to N, not E. The metacognitive residual C(p) measures the "distance" between these predictions—in this discrete case, the number of steps between N and E on the four-point foundational manifold, or alternatively the angular distance between their embedded positions on the circle. This residual quantifies the tension between what the experience suggests (eastward orientation) and what the current identity predicts (northward orientation), triggering potential identity evolution from N toward E if such residuals persist across many events.

While the Kennedy PCM is a simplified pedagogical example with low-dimensional manifolds and discrete foundational states, it illustrates the essential geometric principles that scale to the full persistent cognitive machine implementation. In production systems, the fast manifold $M_1$ might be a 768-dimensional or 1024-dimensional space derived from neural embedding models, the mesoscale manifold $M_2$ might be a 128-dimensional Riemannian manifold capturing decision-level abstractions, and the foundational manifold $M_3$ might be a 32-dimensional or 64-dimensional space encoding the system's core identity. The geometric operations—submersions, immersions, residual computation, and gradient-based evolution—remain conceptually identical to the Kennedy PCM but operate in these high-dimensional spaces using computational differential geometry techniques including tangent space projections, geodesic computations, and metric tensor manipulations.

The hierarchical manifold architecture extends naturally to federated deployments comprising multiple persistent cognitive machine instances that operate autonomously while maintaining geometric coherence through distributed alignment mechanisms. This federated configuration, referred to as a "metacognitive fabric," enables multiple PCM instances to specialize based on their local experiences while preserving sufficient foundational alignment to support coordinated operation when needed.

In a federated architecture, each PCM instance maintains its own complete hierarchical manifold structure including fast manifold, mesoscale manifold, and foundational manifold, together with its own submersion and immersion operators. Each instance processes local events, accumulates experiences in its thought cache, and evolves its foundational identity based on its particular operational context. For example, in a deployment supporting multiple geographic regions, one PCM instance might develop expertise in financial services interactions while another specializes in healthcare contexts and a third focuses on technical support, with each instance's manifold geometry adapting to reflect the statistical structure of its local experiences.

Despite operating independently, federated PCM instances periodically exchange manifold descriptors to assess inter-instance coherence. These descriptors comprise compact representations of each manifold's geometric structure including metric properties, spectral characteristics, principal directions of variation, and characteristic distances. By comparing these descriptors rather than sharing detailed cognitive content, instances can evaluate their geometric alignment without compromising the privacy or autonomy of individual experiences. The federation monitors divergence at all three manifold levels: fast-layer synchronization measures temporal alignment of event streams, mesoscale divergence compares both the geometric structure and spectral properties of decision-level manifolds, and foundational divergence assesses the distance between core identity states across instances.

The federation implements autonomy envelopes that define acceptable bounds of independent variation. These envelopes specify threshold values for each manifold layer, where divergence below threshold permits continued autonomous operation while divergence exceeding threshold triggers coordinated alignment procedures. The autonomy envelope concept recognizes that some degree of specialization and divergence is beneficial—instances should develop distinct expertise suited to their operational contexts—but excessive divergence compromises the ability of instances to coordinate effectively or to transfer knowledge between contexts. For instance, if two PCM instances serving different user populations develop such different foundational identities that their divergence exceeds the foundational threshold, they may no longer be able to effectively collaborate on shared tasks or maintain consistent behavior standards across the federation.

When divergence exceeds autonomy thresholds, the federation initiates a distributed geometric optimization process. A federated objective function is constructed that aggregates pairwise divergences across all instance pairs, weighting different types of divergence according to their importance for the current coordination requirement. Each PCM instance computes its local contribution, determining how its foundational state should evolve to reduce overall federation tension. The instances then perform distributed gradient descent, updating their foundational states to move toward better alignment while using potentially different step sizes to preserve instance-specific characteristics.

Critically, this federated alignment operates asynchronously without requiring centralized coordination or synchronized global updates. Each instance updates its foundational state based on the most recent gradient information available, recomputes its immersion operators to propagate the alignment effects through its local hierarchy, and exchanges updated manifold descriptors with peers to enable convergence assessment. The distributed gradient descent dynamics ensure that federation tension decreases over time, driving instances toward geometric configurations where their foundational manifolds are better aligned while individual autonomy envelopes remain satisfied. Convergence is verified by monitoring whether the rate of tension reduction has decreased below threshold or whether residual divergences have reached acceptable minima, at which point instances resume fully autonomous operation with improved mutual coherence.

The metacognitive fabric maintains several essential properties that distinguish it from traditional distributed systems. First, there is no single point of failure—each instance operates independently and the federation continues functioning even if some instances become unavailable. Second, instance autonomy is preserved within acceptable divergence bounds, allowing specialization based on local context rather than enforcing rigid uniformity. Third, geometric coherence is achieved through proper manifold alignment rather than simple state synchronization, ensuring that instances share compatible geometric structures for thought representation even when their specific thoughts and experiences differ. Fourth, the system exhibits provable convergence properties based on the gradient descent dynamics and the structure of the federated objective function. Fifth, the architecture scales to large numbers of instances through hierarchical or regional coordination structures where subgroups of instances maintain tighter alignment while broader federation maintains looser coherence.

Practical applications of the federated metacognitive fabric include multi-region deployments where each region's PCM instance develops local expertise while maintaining brand consistency, collaborative problem-solving scenarios where multiple PCM instances with complementary specializations coordinate on complex tasks, resilient systems where federation redundancy provides fault tolerance, and evolving knowledge bases where insights discovered by one instance can be geometrically propagated to other instances through foundational alignment. The federation logs alignment events including initial divergence values, convergence trajectories, final residuals, and computational costs, enabling meta-learning processes that adaptively refine autonomy thresholds based on observed operational patterns, gradually optimizing the tradeoff between instance autonomy and federation coherence over extended deployment periods.

Figure 17:
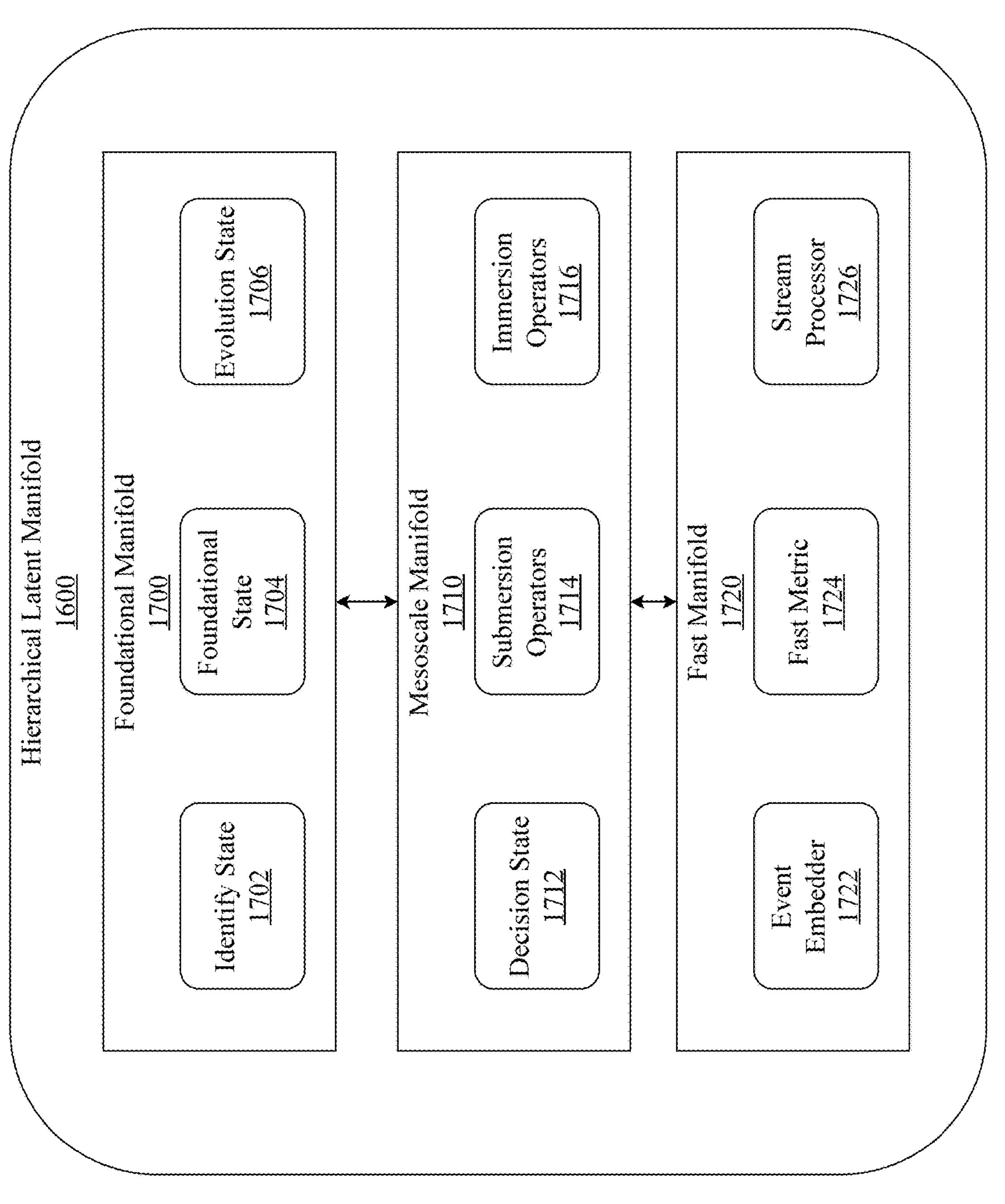
FIG. 17 is a block diagram illustrating an exemplary system architecture of a hierarchical latent manifold integrated with a persistent cognitive machine platform.

FIG. 17 is a block diagram illustrating an exemplary system architecture of a hierarchical latent manifold integrated with a persistent cognitive machine platform. This figure details the internal architecture of hierarchical latent manifold 1600, which provides geometric regulation over the cognitive operations of the persistent cognitive machine described in the parent application. Hierarchical latent manifold 1600 comprises distinct manifold layers that operate at different timescales, each maintaining geometric representations of cognitive state at varying levels of abstraction, together with submersion and immersion operators that mediate information flow between these layers.

At the foundation of the hierarchy sits foundational manifold 1700, representing the slowest-evolving layer $M_3$ in the geometric architecture. Foundational manifold 1700 encodes the persistent identity and core reasoning principles of the cognitive machine, including fundamental values, operational doctrines, reasoning styles, and behavioral characteristics that remain stable over extended periods measured in weeks, months, or longer. Within foundational manifold 1700, identity state 1702 maintains the current foundational state, which evolves only on the slowest timescale. Identity state 1702 represents the system's persistent self-conception and core principles, such as whether it operates primarily as a technical assistant, collaborative partner, or analytical tool, and what fundamental communication values it maintains. Identity state 1702 persists across system operations and restarts through persistence layer 160 from the parent application, ensuring continuity of core identity even after extended inactive periods. Foundational state 1704 defines the geometric structure of foundational manifold 1700, determining how distances and angles are measured within this identity space through a Riemannian metric. Foundational state 1704 establishes what constitutes meaningful variation in identity versus superficial differences, enabling the system to distinguish between fundamental identity shifts (such as moving from formal to collaborative communication style) and minor tactical adjustments. The metric structure in foundational state 1704 creates a geometric landscape where certain identity transitions are "close" (requiring minimal change) while others are "distant" (requiring substantial evolution), thereby providing stability against reactive identity changes while permitting measured adaptation to sustained patterns. Evolution state 1706 manages the slow, controlled updates to identity state 1702 in response to metacognitive feedback from metacognitive residual processor 1610. Evolution state 1706 implements gradient descent dynamics $dr/dt=-\alpha\nabla\_M_3\ C$ where $\alpha$ represents a conservative step size and $\nabla\_M_3\ C$ represents the Riemannian gradient of the global metacognitive residual on foundational manifold 1700. Evolution state 1706 applies small step sizes to ensure that foundational identity changes occur only when sustained patterns warrant such adjustment, preventing reactive changes based on transient experiences. For example, if a user temporarily requires highly technical responses during a specific project, evolution state 1706 would not immediately shift the foundational identity toward technical specialization, but if technical interactions persist over weeks with consistently positive outcomes, evolution state 1706 would gradually adjust identity state 1702 to incorporate this pattern as a permanent characteristic.

The intermediate layer comprises mesoscale manifold 1710, representing the layer that operates at a medium timescale, typically measured in hours to days. Mesoscale manifold 1710 captures decision-level representations including operational doctrines, strategic patterns, task-specific approaches, and medium-term adaptations that are more stable than individual events but less permanent than foundational identity. Decision state 1712 maintains the mesoscale state, tracking the current position within the decision-level manifold and managing doctrinal knowledge that guides executive core 130 operations. Decision state 1712 receives abstracted information from fast manifold 1720 through submersion operators 1714 and constraint information from foundational manifold 1700 through immersion operators 1716, positioning mesoscale state appropriately within these dual influences. For example, decision state 1712 might encode that current operations emphasize thoroughness over speed for a particular project, that recent interactions have established a preference for visual explanations over textual ones, or that the system is currently operating under a doctrine of proactive information sharing rather than reactive response. The geometric structure of mesoscale manifold 1710 is updated during sleep states based on covariance analysis of fast manifold trajectories, allowing the decision-level geometry to adapt to reflect actual correlation patterns observed in experience. Decision state 1712 influences how executive core 130 components including decision coordinator 320 and thought manager 340 select among behavioral options, with geometrically closer options on mesoscale manifold 1710 being favored over distant alternatives.

The fastest-evolving layer consists of fast manifold 1720, representing the layer that operates at timescale measured in seconds to minutes and directly interfaces with the event processing components of the persistent cognitive machine. Fast manifold 1720 provides geometric structure for the event embeddings that flow through thought cache 140 and embedding system 150 described in the parent application, organizing what would otherwise be unstructured vectors in high-dimensional space into a geometrically meaningful manifold where proximity reflects semantic and contextual similarity. Event embedder 1722 serves as the connection point between the vector representations produced by embedding system 150 and the geometric structure of fast manifold 1720. Event embedder 1722 maps thought vectors into manifold coordinates, establishing each cognitive event as a point on the fast manifold where geometric relationships reflect semantic similarities, temporal proximity, and contextual relevance. For instance, when executive core 130 processes a user query about climate policy, event embedder 1722 would position this event near previous climate-related queries, policy discussions, and environmental topics in the fast manifold geometry, creating geometric neighborhoods of related experiences. Event embedder 1722 may employ learned mappings that transform the embedding space from embedding system 150 into appropriate manifold coordinates, potentially using neural network transformations or other nonlinear mappings that respect the geometric structure. Fast metric 1724 defines the local similarity measure $g_1$ on fast manifold 1720, determining how distances between nearby events are computed through a Riemannian metric tensor that can vary across the manifold. Fast metric 1724 is highly adaptive, adjusting locally based on the density and distribution of recent events to provide fine-grained discrimination in frequently visited regions (such as common query types) while maintaining coarser structure in less-explored areas of the cognitive space. This adaptive metric enables the system to develop expertise in frequently encountered domains through refined geometric distinctions while maintaining general capability in less-common areas. Fast metric 1724 influences retrieval operations from thought cache 140 by determining which thoughts are geometrically "nearby" a current context, thereby shaping what memories and knowledge become activated during cognitive processing. Stream processor 1726 manages the continuous sequence of events flowing through fast manifold 1720, maintaining temporal coherence of the trajectory as the system processes stimuli from stimulus analyzer 310 and generates thoughts through thought generator 350. Stream processor 1726 identifies when event sequences form meaningful patterns that warrant upward propagation to mesoscale manifold 1710, such as recognizing that a series of related queries constitutes a coherent project or task context. Stream processor 1726 also implements smoothing and regularization of the trajectory to filter transient noise while preserving meaningful variations, ensuring that the geometric path through fast manifold 1720 accurately represents the cognitive event stream without excessive sensitivity to minor fluctuations.

The hierarchical structure is coordinated through two complementary sets of geometric operators. Submersion operators 1714 implement the upward information flow from lower manifolds to higher manifolds through Riemannian submersions, which are differential geometric maps that project lower-dimensional structure onto higher levels while preserving essential geometric properties. Submersion operators 1714 include $\varphi_{12}$ which projects fast manifold 1720 trajectories onto mesoscale manifold 1710, performing dimensionality reduction that preserves essential geometric structure while abstracting away transient details and noise, and $\varphi_{23}$ which further abstracts mesoscale patterns up to foundational manifold 1700. These submersion operators implement proper Riemannian submersions in the differential geometric sense, meaning they are smooth maps whose differentials are surjective and which preserve horizontal curves and certain curvature properties during projection. The submersion $\varphi_{12}$ effectively asks "what decision-level pattern does this sequence of events represent?" while $\varphi_{23}$ asks "what foundational principle does this pattern of decisions reflect?" For example, when stream processor 1726 has accumulated a sequence of related technical questions on fast manifold 1720, submersion operators 1714 would compute the abstraction $\varphi_{12}(\gamma_1(t))$ that captures the essential pattern of this sequence as a trajectory on mesoscale manifold 1710 representing "technical assistance task," which might then further abstract through $\varphi_{23}$ to a point on foundational manifold 1700 representing "technical expert role." The composition $\varphi_{23} \circ \varphi_{12}$ creates the complete upward path $u(p)=\varphi_{23}(\varphi_{12}(p))$ that traces how a specific event p abstracts through the hierarchy to its foundational representation. Submersion operators 1714 are recomputed during sleep states when the underlying manifold structures change, ensuring they remain valid geometric projections.

Complementing the upward flow, immersion operators 1716 implement downward constraint propagation from higher manifolds to lower manifolds through Riemannian immersions, which are differential geometric maps that embed higher-level structure as constraints on lower levels. Immersion operators 1716 include $\psi_{32}$ which embeds constraints from foundational manifold 1700 into mesoscale manifold 1710, restricting the allowable region of decision space based on foundational identity, and $\psi_{21}$ which further propagates these constraints down to fast manifold 1720, shaping the event-level geometry. These immersion operators are properly defined Riemannian immersions, meaning they are smooth maps whose differentials are injective and which allow higher-level geometric structure to constrain lower-level manifold geometry without collapsing dimensions. The downward constraint flow ensures that decisions and events at lower levels remain consistent with the foundational identity encoded in foundational manifold 1700. For instance, if identity state 1702 maintains a foundational principle favoring detailed explanations over brevity, immersion operators 1716 would propagate this constraint through $\psi_{32}$ to restrict mesoscale manifold 1710 to decision patterns emphasizing thoroughness, and then through $\psi_{21}$ to shape fast manifold 1720 geometry such that brief, terse responses appear geometrically distant from the current trajectory while detailed explanations appear proximate. This geometric shaping influences executive core 130 operations by making identity-consistent behaviors geometrically accessible while creating geometric barriers to identity-inconsistent behaviors. The inverse immersions $\psi_{21}^{-1}$ and $\psi_{32}^{-1}$ used in metacognitive residual computation trace backward from a fast manifold point to determine what foundational state would be predicted by following constraints downward, creating the path $d(p)=\psi_{21}^{-1}(\psi_{32}^{-1}(p))$. Immersion operators 1716 are recomputed by constraint propagator 352 in foundational state updater 1850 whenever foundational state 1704 changes, ensuring that updated identity immediately influences lower-level operations.

Hierarchical latent manifold 1600 integrates with the parent application's architecture at multiple points, extending rather than replacing existing functionality. Fast manifold 1720 receives input from embedding system 150 through event embedder 1722, geometrically structuring the vector representations that would otherwise lack intrinsic organization, thereby enhancing the semantic relationships that thought cache 140 uses for retrieval. Mesoscale manifold 1710 provides geometric context to executive core 130, informing decision coordinator 320 about the current doctrinal state, guiding thought manager 340 about what patterns of thought organization are currently favored, and influencing thought generator 350 about what types of cognitive outputs align with current decision-level positioning. During sleep states initiated by sleep cycle controller 330 from the parent application, geometric consolidation operations are performed including updating fast metric 1724 based on event density patterns, updating the metric structure of mesoscale manifold 1710 based on covariance analysis of accumulated fast manifold trajectories, consolidating repeated mesoscale patterns into adjustments to foundational state 1704, recomputing submersion operators 1714 and immersion operators 1716 to reflect updated geometric structures, and performing spectral analysis of Laplace-Beltrami operators on each manifold to identify and prune redundant geometric dimensions. This geometric sleep consolidation extends the parent application's sleep processes described in sleep manager 170 by adding manifold-specific maintenance operations that preserve and refine the hierarchical geometric structure, operating in parallel with the thought consolidation, insight generation, and memory reorganization processes already present in the parent. Persistence layer 160 from the parent application stores the complete state of all three manifolds including identity state 1702, foundational state 1704, evolution state 1706, decision state 1712, current fast manifold trajectory, fast metric 1724, and the definitions of submersion operators 1714 and immersion operators 1716, enabling the hierarchical geometric structure to persist across system restarts just as thought cache 140 persists in the parent application, ensuring that the system's geometric organization and foundational identity remain continuous across inactive intervals.

Figure 18:
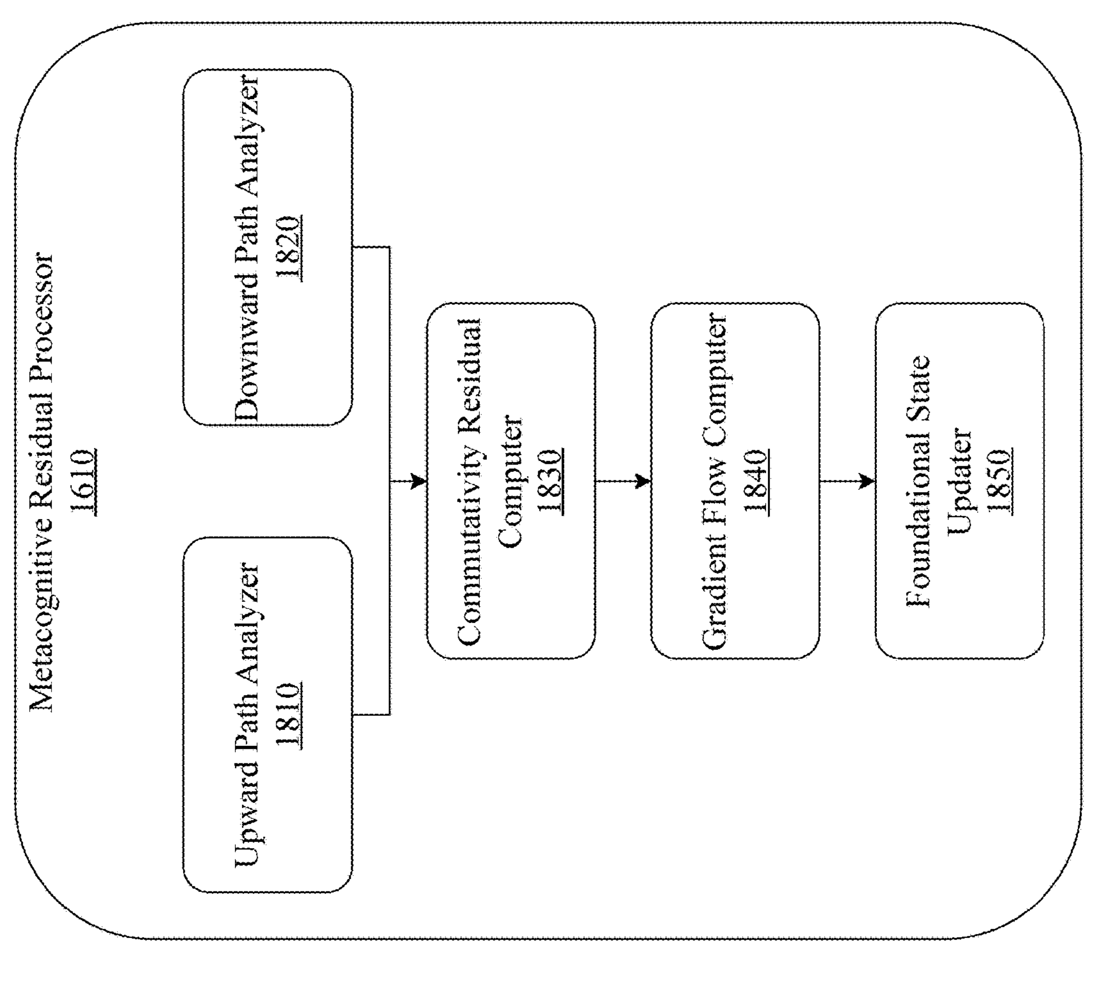
FIG. 18 is a block diagram illustrating an exemplary system architecture of a federated persistent cognitive machine fabric with distributed geometric alignment.

FIG. 18 is a block diagram illustrating an exemplary system architecture of a federated persistent cognitive machine fabric with distributed geometric alignment. This figure details the internal architecture of metacognitive residual processor 1610, which computes and minimizes the discrepancy between upward abstraction paths and downward constraint paths through hierarchical latent manifold 1600, thereby ensuring geometric coherence across the three-manifold hierarchy and enabling the system's foundational identity to evolve in response to accumulated experience while maintaining stability against transient variations.

Upward path analyzer 1810 traces the abstraction flow from fast manifold 1720 through mesoscale manifold 1710 to foundational manifold 1700 by composing the submersion operators from submersion operators 1714. Upward path analyzer 1810 computes the complete upward composition $u(p)=\varphi_{23}(\varphi_{12}(p))$ for points p on fast manifold 1720, producing the foundational-level representation that results from pure bottom-up abstraction of cognitive events. This upward path represents what the system's foundational identity "should be" based solely on experiential evidence, abstracting from concrete events through decision patterns to fundamental principles without considering what the current identity state claims. Upward path analyzer 1810 monitors individual submersion operations as they project cognitive states upward through the hierarchy, tracking how specific fast manifold events from stream processor 1726 contribute to higher-level abstractions. The composition is computed geometrically correctly, ensuring that the composed map $\varphi_{23}\circ\varphi_{12}$ preserves the submersion properties of the individual operators and maintains proper differential geometric structure. For example, when processing a sequence of user interactions about technical documentation, upward path analyzer 1810 would trace how the individual event embeddings on fast manifold 1720 abstract first to a decision pattern on mesoscale manifold 1710 representing "technical documentation assistance task," and then further abstract to a foundational principle on foundational manifold 1700 representing "technical expert identity," producing u(p) as the final abstracted representation that captures what identity the experiences suggest. Upward path analyzer 1810 maintains provenance information documenting which experiences influenced particular abstractions, enabling the system to understand the evidential basis for computed foundational representations and supporting explainability of metacognitive adjustments.

Complementing the upward analysis, downward path analyzer 1820 traces the constraint flow from foundational manifold 1700 through mesoscale manifold 1710 to fast manifold 1720 by composing the inverse immersion operators from immersion operators 1716. Downward path analyzer 1820 computes the downward path d(p) by composing the inverse immersions $\psi_{32}^{-1}\circ\psi_{21}^{-1}$ starting from the current foundational state r(t) in identity state 1702 and projecting down to determine what point on foundational manifold 1700 would be predicted if one followed the constraint path backward from a fast manifold point p. This downward path represents what the current foundational identity "predicts" about experiences, working backward from identity through doctrinal constraints to expected event characteristics. Downward path analyzer 1820 monitors the propagation of foundational constraints through the immersion operators, documenting which foundational constraints from identity state 1702 are actively limiting behavioral options at lower levels through decision state 1712 and the geometry of fast manifold 1720. The inverse composition is implemented carefully, as the inverse of an immersion requires geometric computation to determine the pre-image under the constraint map, potentially involving solving differential equations or optimization problems depending on the manifold structure. For instance, if identity state 1702 specifies a foundational principle emphasizing collaborative communication style, downward path analyzer 1820 would trace backward through the immersion operators to determine what foundational state would be implied by a particular fast manifold event representing terse, directive communication, producing d(p) as this constraint-derived prediction. The discrepancy between d(p) and the actual current identity state reveals whether the event is consistent with current identity constraints. Downward path analyzer 1820 provides visibility into how identity shapes cognition by making explicit which high-level principles are restricting lower-level operations at any given moment.

The core computational function resides in commutativity residual computer 1830, which quantifies the geometric discrepancy between the upward and downward paths computed by upward path analyzer 1810 and downward path analyzer 1820. Commutativity residual computer 1830 computes the pointwise residual by measuring the Riemannian distance on foundational manifold 1700 between the upward-abstracted result u(p) and the downward-constraint-predicted result d(p), using the metric structure from foundational state 1704. This residual measures the extent to which the diagram of submersions and immersions through the hierarchy fails to commute at point p, quantifying local metacognitive tension. A non-zero residual C(p) indicates that the experience represented by point p, when abstracted upward through actual experience, leads to a different foundational representation than what would be predicted by following the foundational constraints downward from current identity. For example, if recent user interactions have consistently involved highly technical discussions that abstract upward to expert-level engagement patterns u(p), but the current foundational state in identity state 1702 implies a generalist communication style leading to prediction d(p) of broad but shallow engagement, commutativity residual computer 1830 would compute a significant residual, d(p)) reflecting this discrepancy between experiential trajectory and identity constraints. Large residuals indicate that experience is pushing toward a different identity than currently maintained, suggesting that identity evolution may be warranted. Commutativity residual computer 1830 aggregates these pointwise residuals across the distribution of recent cognitive states to produce the global coherence measure, a distribution of cognitive activity on fast manifold 1720 is tracked by stream processor 1726. The integration may weight different regions of fast manifold 1720 according to their importance, giving greater influence to frequently visited regions representing core operational patterns or more recent experiences that better reflect current usage. This global measure C quantifies the overall tension between the system's experiential trajectory and its foundational identity maintained in identity state 1702, with higher values indicating greater metacognitive misalignment requiring correction through foundational identity evolution. The global residual C serves as a Lyapunov function for the gradient dynamics, with its minimization driving identity evolution toward coherence with experience.

Once the global residual is computed, gradient flow computer 1840 determines the direction and magnitude of foundational state adjustment needed to reduce metacognitive misalignment. Gradient flow computer 1840 computes the Riemannian gradient of the global residual with respect to the foundational manifold state, using the geometric structure defined by foundational state 1704. This gradient computation must account for the curved geometry of foundational manifold 1700 rather than treating it as flat Euclidean space, implementing proper differential geometric gradient computation that respects the Riemannian metric $g_3$. The resulting gradient vector points in the direction of steepest increase of the residual on the manifold, identifying how identity state 1702 should change to most rapidly increase metacognitive tension. Its negative indicates the direction of steepest decrease that will most efficiently reduce metacognitive tension, pointing toward identity configurations better aligned with experiential patterns. Gradient flow computer 1840 implements the gradient descent update rule, where $\alpha$ is an adaptive step size managed by evolution state 1706 that determines how quickly the foundational state evolves in response to the computed gradient.

The step size α must be carefully selected to balance responsiveness with stability, implementing safeguards to prevent overly rapid foundational changes that could destabilize the system's identity or cause reactive shifts based on temporary operational contexts. For instance, gradient flow computer 1840 might use larger step sizes when the residual C is very large and has been consistently high over extended periods measured in days or weeks, indicating a genuine mismatch between identity and experience that warrants more rapid adaptation, while using smaller step sizes for moderate or transient residuals to avoid reactive identity changes based on temporary experiences such as a single unusual user session. Gradient flow computer 1840 may implement adaptive step sizing strategies that increase α when gradient directions remain consistent over time, indicating sustained directional pressure for identity change, and decrease α when gradient directions fluctuate, suggesting that experiences are varied and no clear identity adjustment is warranted. The gradient descent dynamics implemented by gradient flow computer 1840 ensure provable convergence properties under appropriate conditions, with the global residual C decreasing monotonically toward local minima representing coherent identity-experience configurations.

The updated foundational state must be propagated through the system in foundational state updater 1850. Foundational state updater 1850 applies the gradient descent update computed by gradient flow computer 1840 to identity state 1702 in foundational manifold 1700, computing the new foundational state. This update must maintain the point on the manifold by performing appropriate geometric corrections if necessary, such as projection back onto a manifold constraint surface if foundational manifold 1700 has boundaries, special structure, or embedding constraints that must be preserved. Foundational state updater 1850 validates that the updated state remains within acceptable bounds defined by operational requirements, implementing hard constraints that prevent certain core identity characteristics from changing beyond specified limits even under gradient pressure. For example, if the system has inviolable principles about user privacy or safety that must never be compromised regardless of experiential patterns, foundational state updater 1850 would enforce these as geometric constraints that prevent identity state 1702 from evolving into regions of foundational manifold 1700 that would violate these principles. Foundational state updater 1850 also verifies that the identity update maintains essential properties and relationships, checking that the evolved identity remains geometrically consistent with architectural constraints and operational requirements. Once the new identity state is validated and applied, foundational state updater 1850 triggers recomputation of the immersion operators $\psi_{32}$ and $\psi_{21}$ in immersion operators 1716 to reflect the adjusted foundational state, ensuring that the updated identity immediately begins influencing lower-level manifold operations through revised constraint flows. This recomputation must determine proper Riemannian immersions based on the new foundational geometry, which may involve solving differential equations or optimization problems to determine the correct geometric embedding of constraints from the adjusted identity state down through mesoscale manifold 1710 via decision state 1712 and into fast manifold 1720 through fast metric 1724. For example, if the foundational state has evolved toward a more collaborative communication style through gradient descent, foundational state updater 1850 would adjust immersion operators 1716 to encourage mesoscale decisions and fast manifold events that align with this updated identity, geometrically constraining the allowable cognitive trajectories at lower levels to favor collaborative behaviors while creating geometric distance from directive or authoritative behaviors. The constraint propagation ensures that identity evolution immediately affects actual cognitive operations rather than remaining an abstract state change, with executive core 130 experiencing the updated identity through the modified geometric landscape it navigates during decision-making and response generation.

Metacognitive residual processor 1610 integrates with hierarchical latent manifold 1600 by continuously monitoring the geometric paths through submersion operators 1714 and immersion operators 1716, computing residuals based on the states maintained in foundational manifold 1700, mesoscale manifold 1710, and fast manifold 1720, and feeding back corrections to identity state 1702 and evolution state 1706. This feedback loop operates continuously during waking cognition, with upward path analyzer 1810 and downward path analyzer 1820 tracking paths as events flow through the system from stimulus analyzer 310 and thoughts are generated by thought generator 350. However, the actual foundational state updates computed by gradient flow computer 1840 and applied by foundational state updater 1850 may occur primarily during sleep states when sleep cycle controller 330 from the parent application triggers deeper consolidation processes, allowing the system to integrate accumulated evidence about identity-experience misalignment without the computational overhead of continuous identity updates during active operation. Metacognitive residual processor 1610 interfaces with executive core 130 by providing metacognitive awareness that can inform decision-making by decision coordinator 320, particularly in situations where high residual values indicate that the system is operating outside its established identity parameters and may need to respond differently, seek additional guidance from users, or flag the situation for human oversight. The global residual C computed by commutativity residual computer 1830 may be exposed to state manager 300 within executive core 130 as a metacognitive state variable that influences operational decisions, such as increasing caution or conservatism when metacognitive tension is high, or enabling more exploratory behavior when identity-experience alignment is strong. Through persistence layer 160, metacognitive residual processor 1610 stores histories of residual values, gradient directions, and identity evolution trajectories, enabling analysis of how the system's foundational identity has developed over extended operational periods and supporting explainability about why the system behaves as it does based on its experiential history and metacognitive adaptation dynamics.

Figure 19:
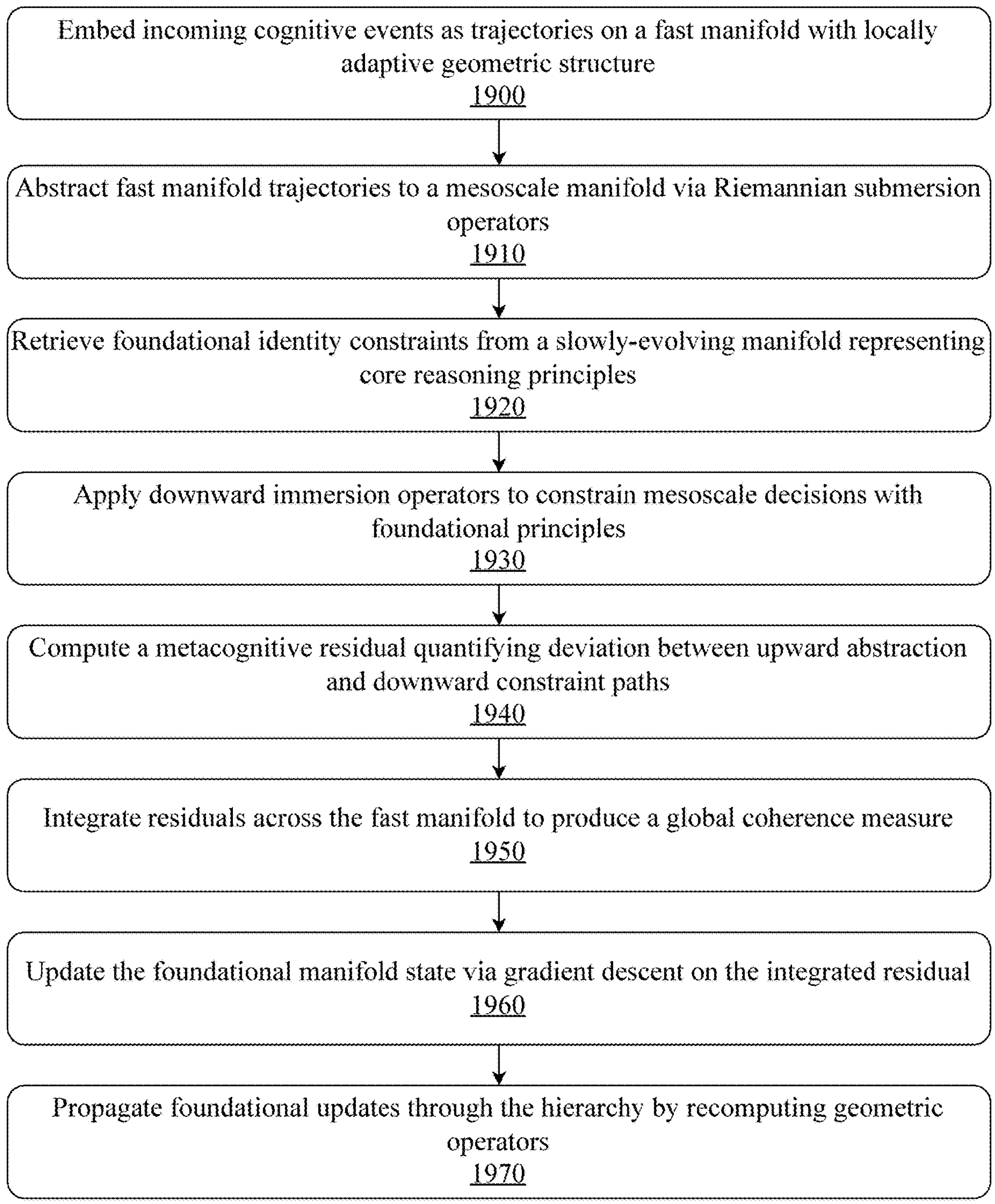
FIG. 19 is a flow diagram illustrating an exemplary method for hierarchical manifold-based cognitive processing in a persistent cognitive machine.

FIG. 19 is a flow diagram illustrating an exemplary method for hierarchical manifold-based cognitive processing in a persistent cognitive machine. In a first step 1900, incoming cognitive events are embedded as trajectories on a fast manifold with locally adaptive geometric structure. When cognitive events such as user queries, document content, or internally generated thoughts are received, they are mapped into a high-dimensional geometric space where each event becomes a point on a manifold and sequences of events form continuous trajectories. The geometric structure of this fast manifold adapts locally based on the density and distribution of cognitive activity, providing fine-grained discrimination in frequently visited regions while maintaining coarser structure in less-explored areas. The embedding process transforms raw cognitive content into geometric coordinates where proximity reflects semantic similarity, enabling geometric operations to capture meaningful relationships between cognitive states. This fast manifold operates at the shortest timescale of the hierarchy, updating rapidly as new events continuously arrive and are processed.

In a step 1910, fast manifold trajectories are abstracted to a mesoscale manifold via Riemannian submersion operators. The accumulated trajectory of points on the fast manifold is projected upward to a manifold operating at an intermediate timescale, performing dimensionality reduction that preserves essential geometric structure while discarding transient details. This abstraction process identifies patterns across multiple events rather than treating each event individually, extracting decision-level representations and strategic patterns from the event stream. The Riemannian submersion ensures that the projection is geometrically well-behaved, maintaining proper relationships between distances and angles during the abstraction process. For example, a sequence of related user interactions about a particular topic would be abstracted into a single decision-level pattern representing the overall nature of that interaction sequence, positioned appropriately on the mesoscale manifold relative to other decision patterns.

In a step 1920, foundational identity constraints are retrieved from a slowly-evolving manifold representing core reasoning principles. A foundational manifold operating at the longest timescale maintains persistent identity characteristics including values, reasoning styles, operational doctrines, and fundamental behavioral principles. The current state on this foundational manifold is accessed, providing the high-level constraints that should govern cognitive operations. This foundational state evolves only gradually in response to sustained patterns over extended periods, maintaining stability of core identity while allowing measured adaptation to accumulated experience. The foundational manifold encodes what remains constant about cognitive behavior even as lower-level decisions and event responses vary with context.

In a step 1930, downward immersion operators are applied to constrain mesoscale decisions with foundational principles. The foundational identity state is embedded into the mesoscale manifold through geometric operators that propagate constraints from the highest level down through the hierarchy. These immersion operators restrict the allowable region of the mesoscale manifold, ensuring that decision-level patterns remain consistent with foundational identity. The constraints continue propagating downward to the fast manifold, where they shape the geometry such that events inconsistent with foundational principles appear distant from the current trajectory. This downward constraint flow creates geometric pressure toward behaviors aligned with identity, making identity-consistent responses more accessible than identity-violating alternatives during cognitive processing.

In a step 1940, a metacognitive residual is computed quantifying deviation between upward abstraction and downward constraint paths. For points on the fast manifold, two distinct paths to the foundational level are evaluated: an upward path following the abstraction operators through mesoscale to foundational representation, and a downward path working backward from the current foundational state through inverse constraint operators. The geometric distance between these two paths'endpoints on the foundational manifold constitutes the residual for that point, measuring the discrepancy between what experience suggests (upward path) and what identity predicts (downward path). A large residual indicates that recent cognitive activity, when abstracted upward through actual experience, leads to a different foundational representation than would be expected from current identity constraints, signaling metacognitive tension.

In a step 1950, residuals are integrated across the fast manifold to produce a global coherence measure. The pointwise residuals computed for individual fast manifold points are aggregated across the distribution of recent cognitive activity, weighting contributions according to their importance or recency. This integration produces a single scalar value quantifying overall metacognitive alignment, with higher values indicating greater tension between experiential trajectory and foundational identity. The global coherence measure reflects accumulated evidence across many cognitive events rather than isolated discrepancies, ensuring that foundational adjustments respond to sustained patterns rather than transient anomalies. Frequently visited regions of cognitive activity contribute more heavily to this measure, emphasizing persistent patterns over occasional outliers.

In a step 1960, the foundational manifold state is updated via gradient descent on the integrated residual. The direction of steepest descent for the global coherence measure is computed on the foundational manifold, accounting for its geometric structure rather than treating it as a flat space. The foundational state is adjusted in this direction by a controlled step size, reducing metacognitive tension while maintaining identity stability through appropriately conservative update magnitudes. The gradient descent dynamics ensure that the foundational identity evolves toward better alignment with accumulated experience, allowing core principles to adapt gradually when sustained patterns warrant such evolution. Step sizes are carefully selected to balance responsiveness with stability, preventing rapid identity changes based on temporary experiences while allowing meaningful adaptation to genuine long-term shifts in operational patterns.

In a step 1970, foundational updates are propagated through the hierarchy by recomputing geometric operators. Following any adjustment to the foundational state, both the submersion operators that perform upward abstraction and the immersion operators that perform downward constraint propagation are recalculated to reflect the updated foundational geometry. This recomputation ensures that the entire hierarchical structure remains geometrically consistent, with the revised foundational identity immediately influencing how events are abstracted upward and how constraints flow downward in subsequent cognitive processing. The updated operators modify the geometric landscape of the mesoscale and fast manifolds, subtly reshaping which trajectories are favored and which appear geometrically distant, thereby implementing the identity evolution in the actual cognitive dynamics without requiring explicit rule changes at lower levels.

Figure 20:
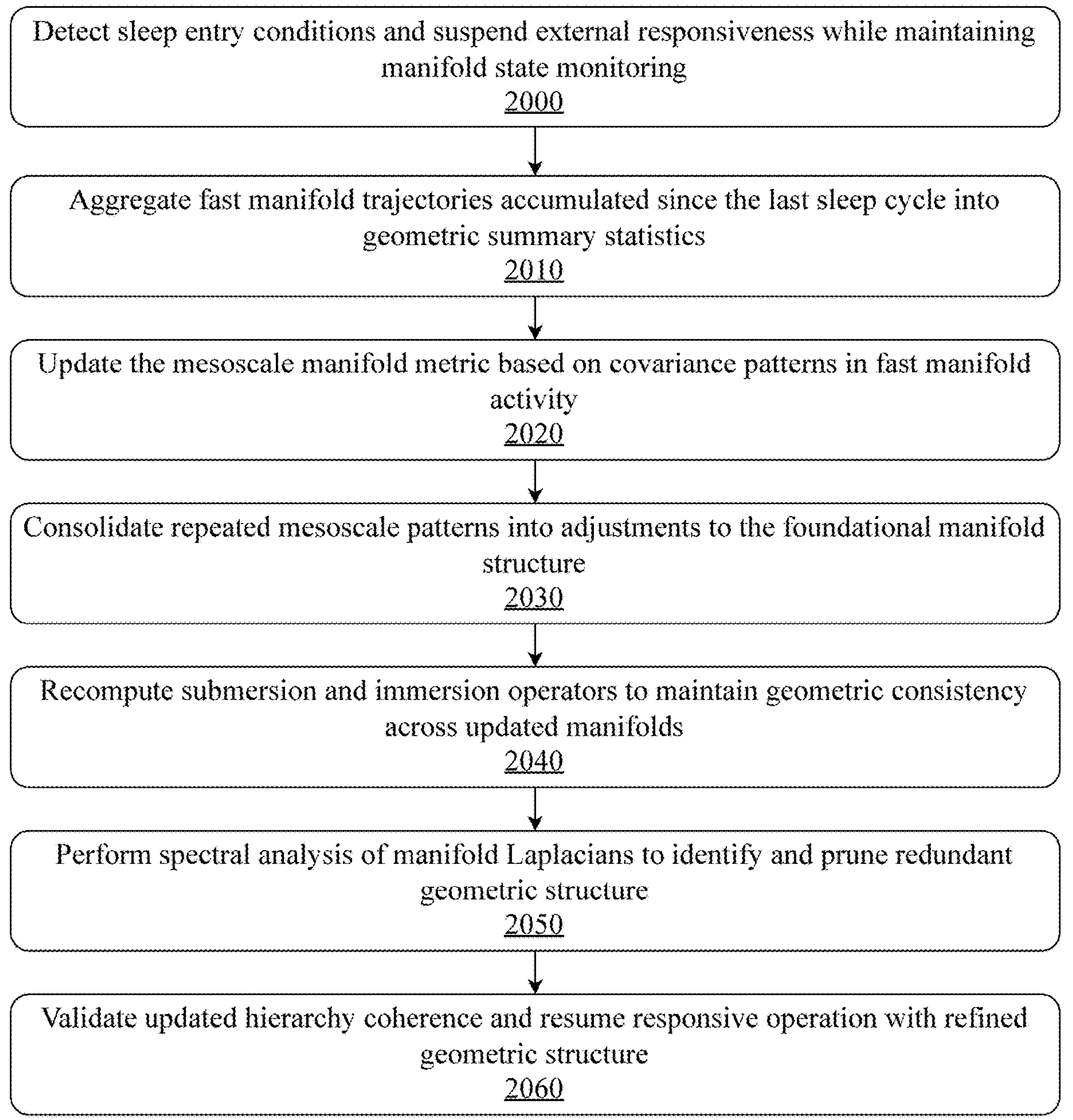
FIG. 20 is a flow diagram illustrating an exemplary method for geometric sleep consolidation across a manifold hierarchy in a persistent cognitive machine.

FIG. 20 is a flow diagram illustrating an exemplary method for geometric sleep consolidation across a manifold hierarchy in a persistent cognitive machine. In a first step 2000, sleep entry conditions are detected and external responsiveness is suspended while maintaining manifold state monitoring. When activity levels decrease below threshold, accumulated cognitive content reaches consolidation capacity, or scheduled maintenance windows arrive, a transition to sleep state is initiated. External interaction processing is reduced or suspended, allowing computational resources to focus on internal geometric maintenance operations. Throughout sleep state, the complete hierarchical manifold structure remains accessible and monitored for consolidation processing, though responsiveness to new external events is minimized. High-priority wake triggers continue to be monitored so that urgent events can interrupt the sleep cycle if necessary, but ordinary interactions are deferred until sleep completes.

In a step 2010, fast manifold trajectories accumulated since the last sleep cycle are aggregated into geometric summary statistics. All paths traversed on the fast manifold during waking operation are collected and analyzed as an ensemble, computing statistical measures that characterize their collective behavior. These summary statistics include path density distributions showing which regions were frequently visited, covariance structure capturing how different dimensions of cognitive activity correlated, geometric moments describing the shape and spread of the trajectory distribution, and temporal patterns revealing how cognitive activity evolved over the waking period. This aggregation transforms the detailed record of individual events into compact geometric descriptors that capture essential patterns while abstracting away noise and transient variations.

In a step 2020, the mesoscale manifold metric is updated based on covariance patterns in fast manifold activity. The covariance structure computed from fast manifold trajectories reveals which cognitive dimensions consistently vary together and which operate independently, providing empirical evidence about the actual correlation structure of cognitive processing. The mesoscale geometric structure is refined to reflect these observed correlations, adjusting distances and angles so that strongly correlated cognitive patterns appear closer in mesoscale geometry while independent patterns remain distant. This metric update improves the abstraction quality of upward projection from fast to mesoscale levels by ensuring the mesoscale geometry accurately represents the statistical structure present in actual cognitive activity rather than relying on initial or outdated geometric assumptions.

In a step 2030, repeated mesoscale patterns are consolidated into adjustments to the foundational manifold structure. Patterns that recur persistently in mesoscale cognitive activity are identified as potentially representing stable characteristics warranting incorporation into foundational identity. When mesoscale patterns demonstrate sufficient consistency, frequency, and significance over extended periods, measured updates are made to the foundational manifold to reflect these patterns as permanent identity characteristics. This consolidation process is conservative, requiring strong evidence before modifying foundational structure to prevent reactive identity changes based on temporary operational phases. The foundational metric and state are adjusted to accommodate the consolidated patterns while preserving essential long-term identity characteristics.

In a step 2040, submersion and immersion operators are recomputed to maintain geometric consistency across updated manifolds. After modifications to manifold metrics and states during consolidation, the geometric operators mediating information flow between levels must be recalculated. Upward submersion operators are recomputed to ensure they remain proper geometric projections given the updated manifold structures, and downward immersion operators are recalculated to maintain valid constraint propagation from the revised foundational geometry. This recomputation verifies that operator compositions preserve required geometric properties and that the hierarchical structure maintains mathematical consistency. The updated operators implement the refined geometric relationships, immediately affecting how subsequent cognitive processing will abstract experiences upward and apply identity constraints downward.

In a step 2050, spectral analysis of manifold Laplacians is performed to identify and prune redundant geometric structure. Eigenvalue decomposition of differential operators on each manifold reveals the characteristic modes and scales of geometric variation, identifying dimensions that contribute negligibly to cognitive representation. Modes corresponding to very small eigenvalues indicate geometric structure with minimal variance that can be pruned without significant information loss. Redundant dimensions arising from historical accumulation but no longer relevant to current cognitive activity are identified for removal. This spectral pruning reduces manifold complexity and computational overhead while preserving the essential geometric structure needed for accurate cognitive representation, preventing the hierarchical manifolds from growing unboundedly as experiences accumulate.

In a step 2060, updated hierarchy coherence is validated and responsive operation is resumed with refined geometric structure. Before transitioning back to active state, consistency checks verify that the consolidated hierarchical manifold satisfies required properties including bounded residuals, stable dynamics, appropriate timescale separation between levels, and valid geometric operator definitions. If validation succeeds, the sleep state concludes and external responsiveness is restored. Cognitive processing resumes with the benefit of refined geometric structure that better reflects accumulated experience patterns, improved abstraction operators that more accurately capture relationships between levels, and reduced computational burden due to pruned redundant structure. The refined hierarchy enables more efficient and accurate cognitive processing in subsequent waking operation.

Figure 21:
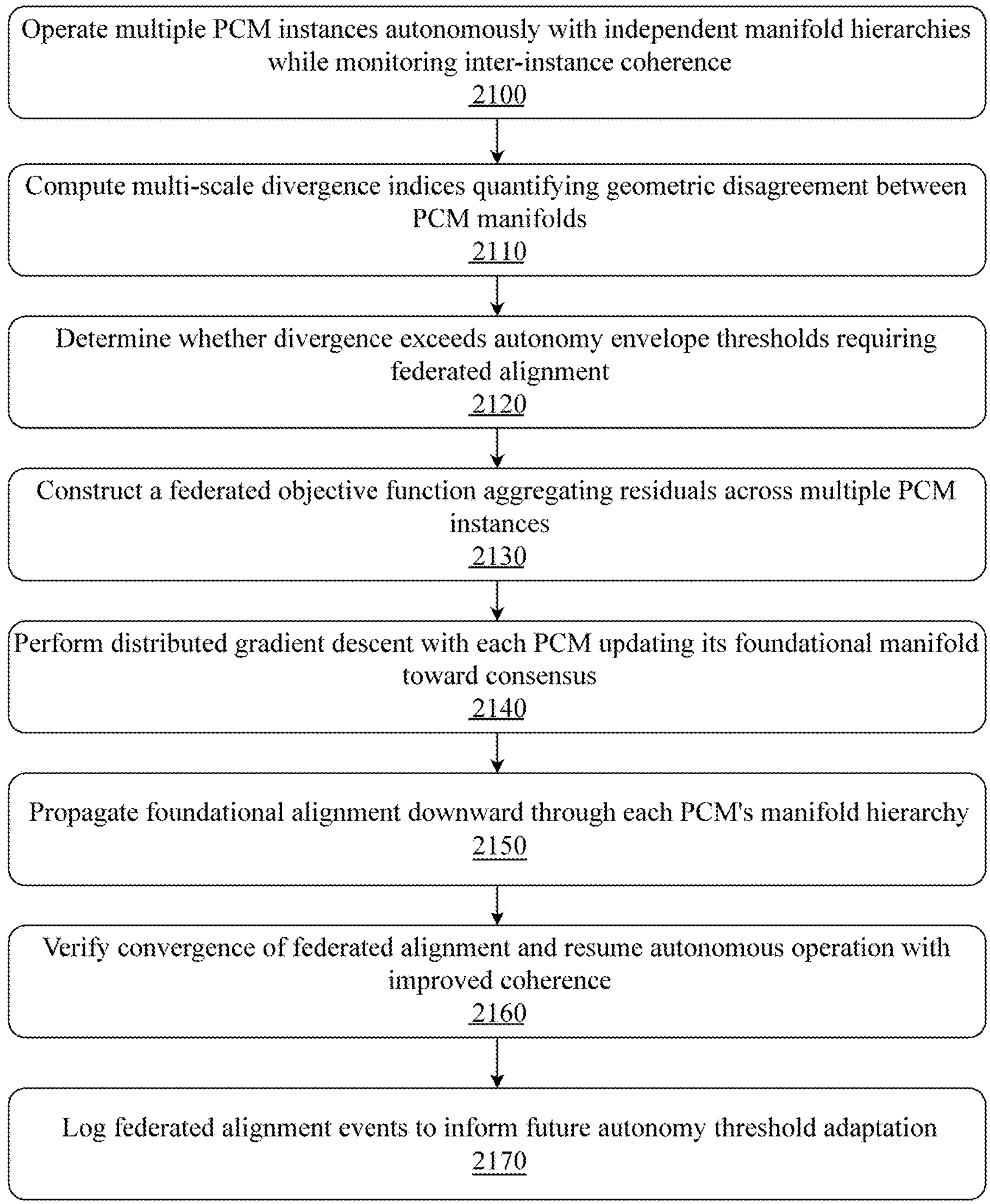
FIG. 21 is a flow diagram illustrating an exemplary method for federated multi-PCM alignment via distributed geometric optimization.

FIG. 21 is a flow diagram illustrating an exemplary method for federated multi-PCM alignment via distributed geometric optimization. In a first step 2100, multiple PCM instances operate autonomously with independent manifold hierarchies while monitoring inter-instance coherence. Each PCM instance maintains its own complete three-manifold hierarchy, processes local cognitive events, evolves its foundational state based on individual experiences, and operates independently without requiring coordination for routine processing. Simultaneously, monitoring processes continuously compute coherence metrics between corresponding manifolds across different instances, tracking how aligned or divergent their geometric structures have become. This monitoring operates passively without interfering with autonomous operation, observing trajectories and states across the federation to detect when coordination may be beneficial. Instances develop specialized expertise and identity characteristics suited to their local contexts while remaining observable for potential coordination needs.

In a step 2110, multi-scale divergence indices are computed quantifying geometric disagreement between PCM manifolds. For each pair of instances, divergence is assessed at all three levels of the hierarchy using metrics appropriate to each level. Fast-layer divergence measures temporal and semantic alignment of event streams, indicating whether instances are processing related cognitive content. Mesoscale divergence compares geometric structure and spectral properties of decision-level manifolds, revealing differences in doctrinal organization and strategic patterns. Foundational divergence quantifies distance between identity states, measuring how fundamentally different the core principles and reasoning styles have become. These multi-scale divergence indices provide comprehensive assessment of inter-instance alignment, distinguishing temporary event-level variations from deeper structural or identity-level divergence.

In a step 2120, determination is made whether divergence exceeds autonomy envelope thresholds requiring federated alignment. The computed divergence indices are compared against predefined threshold values for each manifold level, where thresholds define the acceptable bounds of independent variation. When divergence remains below threshold, instances continue autonomous operation without coordination overhead. When divergence exceeds threshold at any level, this indicates that instances have drifted sufficiently far apart to warrant coordinated alignment intervention. The threshold comparison implements multi-level logic recognizing that different types of divergence have different implications, with foundational divergence typically warranting more urgent intervention than fast-layer variations. Adaptive mechanisms may adjust thresholds over time based on observed operational patterns and coordination costs.

In a step 2130, a federated objective function is constructed aggregating residuals across multiple PCM instances. When alignment is determined necessary, a global optimization objective is formulated that combines divergence measures across all instance pairs. Different types of divergence are weighted according to their importance for coordination, with weights potentially varying based on current operational context. The federated objective quantifies overall federation misalignment as a single scalar whose minimization will bring instances into better geometric agreement. This objective is constructed to be differentiable with respect to foundational states of all instances, enabling gradient-based optimization. The formulation ensures that minimizing the objective achieves appropriate balance between inter-instance coherence and preservation of instance-specific characteristics developed through local experience.

In a step 2140, distributed gradient descent is performed with each PCM updating its foundational manifold toward consensus. Each instance computes its local gradient contribution indicating how its foundational state should adjust to reduce overall federation divergence. Instances implement gradient descent updates to their respective foundational states, moving toward geometric configurations that minimize the federated objective. This optimization occurs in a distributed manner without requiring centralized state aggregation, with instances updating asynchronously based on gradient information. Step sizes may vary across instances to allow differential rates of adaptation, enabling some instances to preserve more of their specialized characteristics while others adjust more substantially. The distributed dynamics converge toward consensus configurations where foundational manifolds are better aligned while maintaining operational diversity.

In a step 2150, foundational alignment is propagated downward through each PCM's manifold hierarchy. After updating foundational states during distributed optimization, each instance independently recomputes its geometric operators to reflect the adjusted foundational geometry. Downward immersion operators are recalculated to propagate the improved foundational alignment as constraints on mesoscale and fast manifolds. This propagation ensures that the benefits of foundational alignment immediately influence lower-level cognitive processing within each instance. The updated constraint structure geometrically encourages decisions and events that align with the refined foundational consensus, implementing the coordination effects throughout the cognitive hierarchy without requiring explicit synchronization of lower-level operations.

In a step 2160, convergence of federated alignment is verified and autonomous operation is resumed with improved coherence. The rate of change in the federated objective is monitored to determine whether optimization has successfully reduced divergence or whether convergence has stalled. When the objective reaches an acceptable minimum or its derivative indicates convergence, the alignment process concludes. Instances are released to resume fully autonomous operation, now operating from foundational states with improved mutual coherence. The alignment verification ensures that coordination achieved meaningful improvement without excessive computational cost, implementing safeguards against oscillation or non-convergence scenarios. Instances return to independent processing while maintaining the geometric relationships established during alignment until future divergence warrants another coordination episode.

In a step 2170, federated alignment events are logged to inform future autonomy threshold adaptation. Detailed records are maintained of each alignment episode including initial divergence values, convergence trajectory, final alignment quality, computational cost, and duration. This historical data enables meta-learning processes that identify patterns in when alignment is beneficial versus when natural resolution occurs, which divergence types most reliably predict coordination needs, and what threshold values optimize the tradeoff between instance autonomy and federation coherence. The logged information supports adaptive refinement of autonomy thresholds, gradually improving the federation's ability to determine when intervention provides sufficient value to justify coordination overhead versus when instances should continue independent operation.

Exemplary Computing Environment

Figure 22:
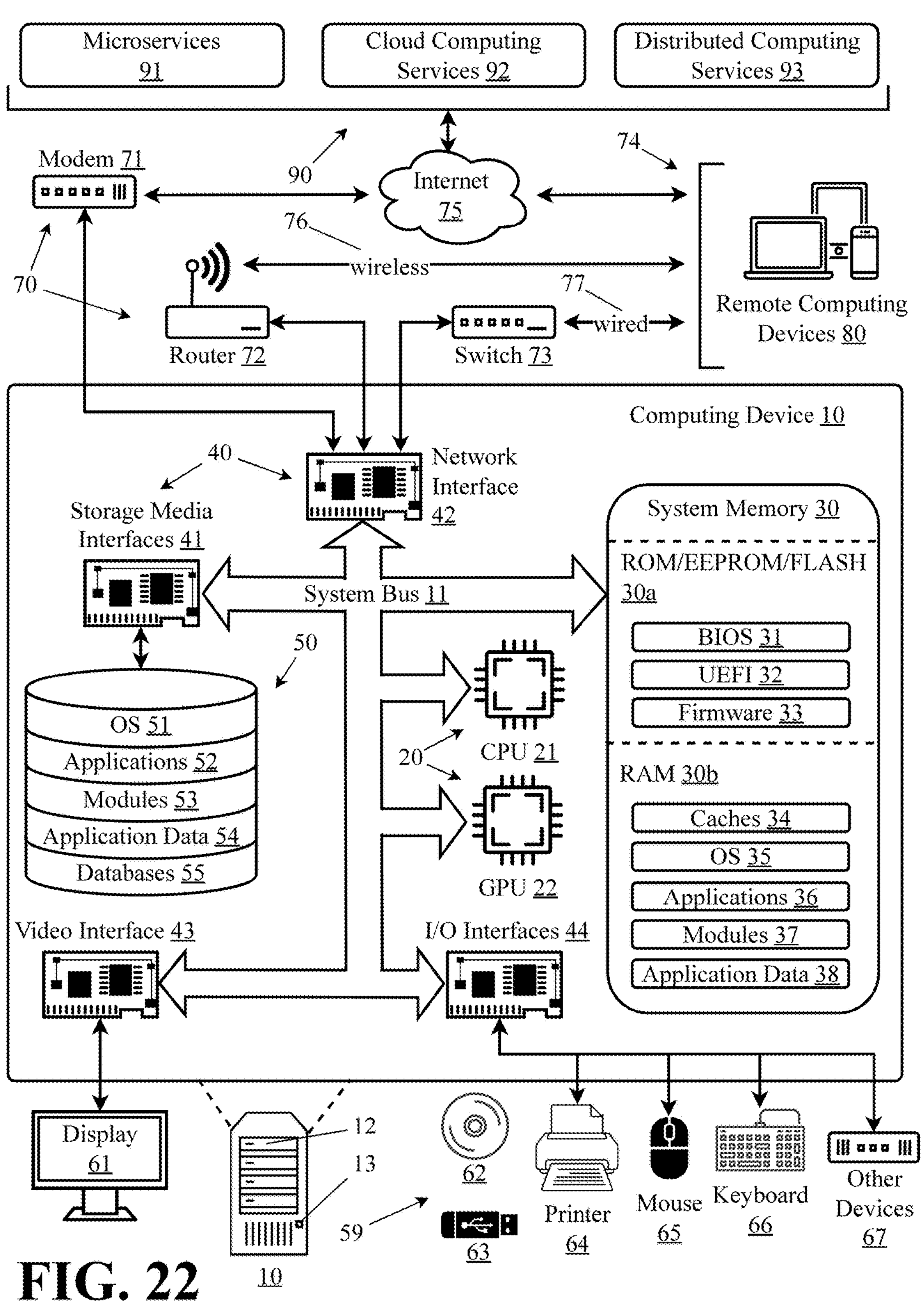
FIG. 22 illustrates an exemplary computing environment on which an embodiment described herein may be implemented.

FIG. 22 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 13 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like complex instruction set computer (CISC) or reduced instruction set computer (RISC). Further, computing device 10 may comprise one or more specialized processors such as a graphics processing unit (GPU) 22 configured to accelerate processing of computer graphics and images via a large array of specialized processing cores arranged in parallel. Further computing device 10 may be comprised of one or more specialized processes such as Intelligent Processing Units, field-programmable gate arrays or application-specific integrated circuits for specific tasks or types of tasks. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory **30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b*** may comprise one or more smaller cache memories which operate at a higher clock speed and are typically placed on the same IC as the processors to improve performance.

There are several types of computer memory, each with its own characteristics and use cases. System memory 30 may be configured in one or more of the several types described herein, including high bandwidth memory (HBM) and advanced packaging technologies like chip-on-wafer-on-substrate (CoWoS). Static random access memory (SRAM) provides fast, low-latency memory used for cache memory in processors, but is more expensive and consumes more power compared to dynamic random access memory (DRAM). SRAM retains data as long as power is supplied. DRAM is the main memory in most computer systems and is slower than SRAM but cheaper and more dense. DRAM requires periodic refresh to retain data. NAND flash is a type of non-volatile memory used for storage in solid state drives (SSDs) and mobile devices and provides high density and lower cost per bit compared to DRAM with the trade-off of slower write speeds and limited write endurance. HBM is an emerging memory technology that provides high bandwidth and low power consumption which stacks multiple DRAM dies vertically, connected by through-silicon vias (TSVs). HBM offers much higher bandwidth (up to 1 TB/s) compared to traditional DRAM and may be used in high-performance graphics cards, AI accelerators, and edge computing devices. Advanced packaging and CoWoS are technologies that enable the integration of multiple chips or dies into a single package. CoWoS is a 2.5D packaging technology that interconnects multiple dies side-by-side on a silicon interposer and allows for higher bandwidth, lower latency, and reduced power consumption compared to traditional PCB-based packaging. This technology enables the integration of heterogeneous dies (e.g., CPU, GPU, HBM) in a single package and may be used in high-performance computing, AI accelerators, and edge computing devices.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. In some high-performance computing systems, multiple GPUs may be connected using NVLink bridges, which provide high-bandwidth, low-latency interconnects between GPUs. NVLink bridges enable faster data transfer between GPUs, allowing for more efficient parallel processing and improved performance in applications such as machine learning, scientific simulations, and graphics rendering. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Network interface 42 may support various communication standards and protocols, such as Ethernet and Small Form-Factor Pluggable (SFP). Ethernet is a widely used wired networking technology that enables local area network (LAN) communication. Ethernet interfaces typically use RJ45 connectors and support data rates ranging from 10 Mbps to 100 Gbps, with common speeds being 100 Mbps, 1 Gbps, 10 Gbps, 25 Gbps, 40 Gbps, and 100 Gbps. Ethernet is known for its reliability, low latency, and cost-effectiveness, making it a popular choice for home, office, and data center networks. SFP is a compact, hot-pluggable transceiver used for both telecommunication and data communications applications. SFP interfaces provide a modular and flexible solution for connecting network devices, such as switches and routers, to fiber optic or copper networking cables. SFP transceivers support various data rates, ranging from 100 Mbps to 100 Gbps, and can be easily replaced or upgraded without the need to replace the entire network interface card. This modularity allows for network scalability and adaptability to different network requirements and fiber types, such as single-mode or multi-mode fiber.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may be implemented using various technologies, including hard disk drives (HDDs) and solid-state drives (SSDs). HDDs use spinning magnetic platters and read/write heads to store and retrieve data, while SSDs use NAND flash memory. SSDs offer faster read/write speeds, lower latency, and better durability due to the lack of moving parts, while HDDs typically provide higher storage capacities and lower cost per gigabyte. NAND flash memory comes in different types, such as Single-Level Cell (SLC), Multi-Level Cell (MLC), Triple-Level Cell (TLC), and Quad-Level Cell (QLC), each with trade-offs between performance, endurance, and cost. Storage devices connect to the computing device 10 through various interfaces, such as SATA, NVMe, and PCIe. SATA is the traditional interface for HDDs and SATA SSDs, while NVMe (Non-Volatile Memory Express) is a newer, high-performance protocol designed for SSDs connected via PCIe. PCIe SSDs offer the highest performance due to the direct connection to the PCIe bus, bypassing the limitations of the SATA interface. Other storage form factors include M.2 SSDs, which are compact storage devices that connect directly to the motherboard using the M.2 slot, supporting both SATA and NVMe interfaces. Additionally, technologies like Intel Optane memory combine 3D XPoint technology with NAND flash to provide high-performance storage and caching solutions. Non-volatile data storage devices 50 may be non-removable from computing device 10, as in the case of internal hard drives, removable from computing device 10, as in the case of external USB hard drives, or a combination thereof. However, computing devices will typically comprise one or more internal, non-removable hard drives using either magnetic disc or solid-state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, vector databases, knowledge graph databases, key-value databases, document oriented data stores, and graph databases.

Applications (also known as computer software or software applications) are sets of programming instructions designed to perform specific tasks or provide specific functionality on a computer or other computing devices. Applications are typically written in high-level programming languages such as C, C++, Scala, Erlang, GoLang, Java, Scala, Rust, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems facilitated by specifications such as containerd.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network or optical transmitters (e.g., lasers). Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers or networking functions may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices or intermediate networking equipment (e.g., for deep packet inspection).

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90. Also, certain processing subtasks may be sent to a microservice 91 for processing with the result being transmitted to computing device 10 for incorporation into a larger processing task. Infrastructure as Code (IaaC) tools like Terraform can be used to manage and provision computing resources across multiple cloud providers or hyperscalers. This allows for workload balancing based on factors such as cost, performance, and availability. For example, Terraform can be used to automatically provision and scale resources on AWS spot instances during periods of high demand, such as for surge rendering tasks, to take advantage of lower costs while maintaining the required performance levels. In the context of rendering, tools like Blender can be used for object rendering of specific elements, such as a car, bike, or house. These elements can be approximated and roughed in using techniques like bounding box approximation or low-poly modeling to reduce the computational resources required for initial rendering passes. The rendered elements can then be integrated into the larger scene or environment as needed, with the option to replace the approximated elements with higher-fidelity models as the rendering process progresses.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is containerd, which is widely used in software development and deployment. Containerization, particularly with open-source technologies like containerd and container orchestration systems like Kubernetes, is a common approach for deploying and managing applications. Containers are created from images, which are lightweight, standalone, and executable packages that include application code, libraries, dependencies, and runtime. Images are often built from a containerfile or similar, which contains instructions for assembling the image. Containerfiles are configuration files that specify how to build a container image. Systems like Kubernetes natively support containerd as a container runtime. They include commands for installing dependencies, copying files, setting environment variables, and defining runtime configurations. Container images can be stored in repositories, which can be public or private. Organizations often set up private registries for security and version control using tools such as Harbor, JFrog Artifactory and Bintray, GitLab Container Registry, or other container registries. Containers can communicate with each other and the external world through networking. Containerd provides a default network namespace, but can be used with custom network plugins. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP, protobuffers, gRPC or message queues such as Kafka. Microservices 91 can be combined to perform more complex or distributed processing tasks. In an embodiment, Kubernetes clusters with containerized resources are used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis, or consumption or ad-hoc marketplace basis, or combination thereof.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance or uncertainty over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A computer system configured to execute software instructions stored on nontransitory machine-readable storage media, wherein the software instructions comprise instructions that:

initialize a persistent cognitive system configured to sustain a cognitive state across one or more inactive periods and system restarts, the cognitive state comprising stored thought representations maintained in one or more thought caches;

embed cognitive events as geometric trajectories on a hierarchical latent manifold structure comprising a fast manifold, a mesoscale manifold, and a foundational manifold operating at progressively longer timescales;

monitor a plurality of events comprising external stimuli and internal thought triggers;

abstract the geometric trajectories upward through the hierarchical manifold structure via submersion operators;

apply identity constraints downward on the geometric trajectories through the hierarchical manifold structure via immersion operators;

compute a metacognitive residual measuring geometric discrepancy between upward abstraction and downward constraint paths;

generate cognitive outputs using one or more generative or analytical models informed by thought representations retrieved from the one or more thought caches;

enter adaptive cognitive maintenance modes that modify memory and stored thought structures, the adaptive cognitive maintenance modes comprising the steps of:

consolidating recent experiences from short-term to long-term memory;

generating new insights by connecting previously unrelated thought patterns;

pruning less relevant or outdated thoughts to optimize memory efficiency;

reorganizing memory structures for improved future retrieval; and updating the foundational manifold based on the metacognitive residual; and maintain continuity of cognition across the one or more inactive periods and system restarts by persisting a state of the hierarchical latent manifold structure together with the stored thought representations.

2. The computer system of claim 1, wherein the software instructions further comprise instructions that:

analyze the plurality of events by comparing them with stored thought patterns in the thought cache;

retrieve relevant thoughts from the thought cache based on conceptual similarity to the plurality of events;

generate new thoughts by synthesizing the retrieved relevant thoughts with results from analyzing the plurality of events;

store the new thoughts in the thought cache; and organize stored thoughts in the thought cache based on semantic relationships and temporal context.

3. The computer system of claim 1, wherein maintaining the persistent cognitive system comprises:

serializing cognitive states including thought cache contents, relationship models, and system configuration;

creating periodic checkpoints of system state;

storing serialized state in persistent storage; and restoring complete cognitive state upon system restart.

4. The computer system of claim 1, wherein the thought cache comprises a plurality of heterogeneous embedding spaces, each defined by a distinct vectorization model or dimensionality, and wherein a memory manager dynamically transfers thought representations between the embedding spaces based on usage frequency or semantic generality.

5. The computer system of claim 1, wherein during the adaptive cognitive maintenance modes, an insight generator identifies latent relationships between previously unassociated thoughts and creates new thought representations encoding such inferred relationships.

6. A computer-implemented method comprising the steps of:

initializing a persistent cognitive system configured to sustain a cognitive state across one or more inactive periods and system restarts, the cognitive state comprising stored thought representations maintained in one or more thought caches;

embedding cognitive events as geometric trajectories on a hierarchical latent manifold structure comprising a fast manifold, a mesoscale manifold, and a foundational manifold operating at progressively longer timescales;

monitoring a plurality of events comprising external stimuli and internal thought triggers;

abstracting the geometric trajectories upward through the hierarchical manifold structure via submersion operators;

applying identity constraints downward on the geometric trajectories through the hierarchical manifold structure via immersion operators;

computing a metacognitive residual measuring geometric discrepancy between upward abstraction and downward constraint paths;

generating cognitive outputs using one or more generative or analytical models informed by thought representations retrieved from the one or more thought caches;

entering adaptive cognitive maintenance modes that modify memory and stored thought structures, the adaptive cognitive maintenance modes comprising the steps of:

consolidating recent experiences from short-term to long-term memory;

generating new insights by connecting previously unrelated thought patterns;

pruning less relevant or outdated thoughts to optimize memory efficiency;

reorganizing memory structures for improved future retrieval; and updating the foundational manifold based on the metacognitive residual; and maintaining continuity of cognition across the one or more inactive periods and system restarts by persisting a state of the hierarchical latent manifold structure together with the stored thought representations.

7. The computer-implemented method of claim 6, further comprising the steps of:

analyzing the plurality of events by comparing them with stored thought patterns in the thought cache;

retrieving relevant thoughts from the thought cache based on conceptual similarity to the plurality of events;

generating new thoughts by synthesizing the retrieved relevant thoughts with results from analyzing the plurality of events;

storing the new thoughts in the thought cache; and organizing stored thoughts in the thought cache based on semantic relationships and temporal context.

8. The computer-implemented method of claim 6, further comprising the steps of:

serializing cognitive states including thought cache contents, relationship models, and system configuration;

creating periodic checkpoints of system state;

storing serialized state in persistent storage; and restoring complete cognitive state upon system restart.

9. The computer-implemented method of claim 6, wherein the thought cache comprises a plurality of heterogeneous embedding spaces, each defined by a distinct vectorization model or dimensionality, and wherein a memory manager dynamically transfers thought representations between the embedding spaces based on usage frequency or semantic generality.

10. The computer-implemented method of claim 6, wherein during the adaptive cognitive maintenance modes, an insight generator identifies latent relationships between previously unassociated thoughts and creates new thought representations encoding such inferred relationships.

* * * * *